US012218780B2

United States Patent
Yue et al.

(10) Patent No.: US 12,218,780 B2
(45) Date of Patent: Feb. 4, 2025

(54) METHODS AND APPARATUS FOR MULTI-DOMAIN CONVERSIONS OF HIGH DIMENSIONAL CHANNEL STATISTICS

(71) Applicant: Huawei Technologies Co., Ltd., Shenzhen (CN)

(72) Inventors: Guosen Yue, Edison, NJ (US); Xiao-Feng Qi, Westfield, NJ (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 17/866,705

(22) Filed: Jul. 18, 2022

(65) Prior Publication Data

US 2022/0393909 A1 Dec. 8, 2022

Related U.S. Application Data

(63) Continuation of application No. PCT/US2020/047754, filed on Aug. 25, 2020.

(60) Provisional application No. 63/024,684, filed on May 14, 2020.

(51) Int. Cl.
*H04L 25/02* (2006.01)
*H04W 24/08* (2009.01)

(52) U.S. Cl.
CPC ........ *H04L 25/021* (2013.01); *H04L 25/0204* (2013.01); *H04L 25/022* (2013.01); *H04W 24/08* (2013.01)

(58) Field of Classification Search
CPC . H04B 7/0691; H04L 25/0204; H04L 25/021; H04L 25/022; H04W 24/08
See application file for complete search history.

(56) References Cited

U.S. PATENT DOCUMENTS

| 9,768,928 B1* | 9/2017 | Yue | H04W 4/025 |
| 2005/0136943 A1* | 6/2005 | Banerjee | H04B 17/21 375/E1.032 |
| 2015/0004962 A1* | 1/2015 | Weisbart | H04W 24/02 455/422.1 |
| 2018/0175984 A1 | 6/2018 | Yue et al. | |

(Continued)

FOREIGN PATENT DOCUMENTS

WO 2019197030 A1 10/2019

OTHER PUBLICATIONS

Khalilsarai, et al., "FDD Massive MIMO via UL/DL Channel Covariance Extrapolation and Active Channel Sparsification," IEEE Transactions on Wireless Communications, vol. 18, No. 3, Jan. 2019, pp. 121-135.

(Continued)

*Primary Examiner* — Stephen J Clawson
(74) *Attorney, Agent, or Firm* — Slater Matsil, LLP

(57) ABSTRACT

A method includes calculating first high dimensional channel characteristics of a first frequency band in accordance with measurements of the first frequency band; estimating a power angle delay spectrum (PADS) in accordance with the first high dimensional channel characteristics of the first frequency band; determining a domain conversion matrix for a second frequency band in accordance with the PADS; and generating second high dimensional channel characteristics of the second frequency band in accordance with the domain conversion matrix and the first high dimensional channel characteristics of the first frequency band.

24 Claims, 14 Drawing Sheets

(56) References Cited

U.S. PATENT DOCUMENTS

2018/0358688 A1* 12/2018 Yue .................. H04W 72/21
2021/0021310 A1* 1/2021 Miretti ............... H04B 7/0639
2021/0234604 A1* 7/2021 Raghavan ............. H04L 5/001

OTHER PUBLICATIONS

Miretti, et al., "FDD Massive MIMO Channel Spatial Covariance Conversion Using Projection Methods," Fraunhofer Heinrich Hertz Institute, 2018, pp. 3608-3612.
Xie, et al., "Channel Estimation for TDD/FDD Massive MIMO Systems With Channel Covariance Computing," IEEE Transactions on Wireless Communications, vol. 17, No. 6, Jun. 2018, pp. 4206-4218.
Ying-Chang, et al., "Downlink Channel Covariance Matrix (DCCM) Estimation and it's Applications in Wireless DS-CDMA Systems," IEEE Journal on Selected Areas in Communications, vol. 19, No. 2, Feb. 1, 2001.

* cited by examiner

METHODS AND APPARATUS FOR MULTI-DOMAIN CONVERSIONS OF HIGH DIMENSIONAL CHANNEL STATISTICS

This application is a continuation of and claims the benefit of priority to PCT/US20/47754, filed Aug. 25, 2020, which claims the benefit of priority to U.S. Provisional Application No. 63/024,684, filed on May 14, 2020, entitled "Apparatus and Methods for Multi-Domain Conversions of High Dimensional Channel Statistics," each of which are hereby incorporated herein by reference in their entirety.

TECHNICAL FIELD

The present disclosure relates generally to methods and apparatus for digital communications, and, in particular embodiments, to methods and apparatus for multi-domain conversion of high dimensional channel statistics.

BACKGROUND

Massive multiple input multiple output (MIMO) is a promising technique for increasing system capacity. Massive MIMO has been adopted as a feature for fifth generation (5G) communication systems and beyond. Orthogonal frequency division multiplexing (OFDM) has been widely used as the waveform for wideband wireless transmissions in many systems, including WiFi (IEEE 802.11 series of wireless technical standards), and fourth generation (4G) and fifth generation (5G) wireless systems as promulgated by 3GPP. Massive MIMO and OFDM have been proposed for combination in advanced wireless communications systems to leverage their respective capabilities.

The physical channel includes both spatial (e.g., channel paths with angle of arrival (AoA) or angle of departure (AoD)) information and time (e.g., delay) information. The spatial and time information are captured implicitly in antenna and frequency domain observations of MIMO-OFDM communication systems. Furthermore, high dimensional channel signatures, such as spatial-frequency covariance, capture the key components of the channel characteristics, including the power angle delay profiles or spectrum.

Channel reciprocity is used in time division duplex (TDD) communication systems to allow channel information (such as instantaneous channel state information or statistical channel including high dimensional channel statistics) of a first link to be used for a second link. In general, a physical wireless channel has one or more channel paths, each such path may have a different angle of arrival (at the receiving end of the wireless channel) or angle of departure (at the transmitting end of the wireless channel), and different delays. Hence, the wireless channel may be represented in both spatial and delay domains. Unlike the spatial channel covariance or time domain covariance that only captures one dimension of channel information (e.g., space or time), high dimensional channel statistics are high order channel statistics that capture the channel statistical information on both spatial and delay domains. With some transmission waveforms and multiple antennas, e.g., OFDM and MIMO, it is possible to obtain the channel information in both the spatial and frequency domains. An example of high dimensional channel statistics is spatial-frequency channel covariance with each entry being a correlation between a first antenna on a first frequency component and a second antenna on a second frequency component.

As an example, channel information of an uplink that is derived from measurements of transmissions on the uplink may be used as channel information of a corresponding downlink because the uplink and the downlink occur in the same frequency band. However, in frequency division duplex (FDD) communication systems, channel reciprocity does not hold for some types of channel information for links with different carrier frequencies.

Therefore, there is a need for methods and apparatus for multiple domain conversion of high dimensional channel statistics.

SUMMARY

According to a first aspect, a method implemented by a device is provided. The method comprising: calculating, by the device, high dimensional channel characteristics of a first frequency band in accordance with measurements of the first frequency band; estimating, by the device, a power angle delay spectrum (PADS) in accordance with the high dimensional channel characteristics of the first frequency band; determining, by the device, a domain conversion matrix for a second frequency band in accordance with the estimated PADS; and generating, by the device, high dimensional channel characteristics of a second frequency band in accordance with the domain conversion matrix and the high dimensional channel characteristics of the first frequency band.

In a first implementation form of the method according to the first aspect, determining the domain conversion matrix comprising determining the domain conversion matrix in accordance with at least one of an antenna structure of the device, a carrier frequency of the first frequency band, a carrier frequency of the second frequency band, and configured frequency spacing of the first and second frequency bands.

In a second implementation form of the method according to the first aspect or any preceding implementation form of the first aspect, estimating the PADS being in accordance with the antenna structure of the device, and the carrier frequency of the first frequency band.

In a third implementation form of the method according to the first aspect or any preceding implementation form of the first aspect, estimating the PADS comprising projecting the PADS onto a subspace of a Hilbert space defined by basis functions in accordance with the antenna structure of the device and the carrier frequency of the first frequency band.

In a fourth implementation form of the method according to the first aspect or any preceding implementation form of the first aspect, estimating the PADS comprising generating a set of weights of a set of basis functions defined in accordance with the antenna structure of the device, and the carrier frequency of the first frequency band.

In a fifth implementation form of the method according to the first aspect or any preceding implementation form of the first aspect, generating the high dimensional channel characteristics of the second frequency band, the generating comprising: obtaining, by the device, a product of the domain conversion matrix and the estimated PADS; and reforming, by the device, the high dimensional channel characteristics of the second frequency band from the product.

In a sixth implementation form of the method according to the first aspect or any preceding implementation form of the first aspect, the domain conversion matrix determining comprising determining the domain conversion matrix for each configured antenna lag, the determining being in accordance with an antenna structure of the device, a carrier frequency of the first frequency band, a carrier frequency of the second frequency band, and configured frequency lags of the first and second frequency bands.

In a seventh implementation form of the method according to the first aspect or any preceding implementation form of the first aspect, generating the high dimensional channel characteristics of the second frequency band, the generating comprising: obtaining, by the device, subblock matrices for each configured frequency lag as a product of the domain conversion matrix and the estimated PADS; reforming, by the device, subblocks of the high dimensional channel characteristics of the second frequency band from the subblock matrices; and reconstructing, by the device, the high dimensional channel characteristics of the second frequency band from the reformed subblocks.

In an eighth implementation form of the method according to the first aspect or any preceding implementation form of the first aspect, the domain conversion matrix determining comprising determining the domain conversion matrix for each configured antenna lag, the determining being in accordance with at least one of an antenna structure of a first antenna panel, an antenna structure of a second antenna panel, a carrier frequency of the first frequency band, a carrier frequency of the second frequency band, and configured frequency lags of the first and second frequency bands.

In a ninth implementation form of the method according to the first aspect or any preceding implementation form of the first aspect, the generating the high dimensional channel characteristics of the second frequency band comprising: obtaining, by the device, subblock matrices for each configured frequency lag at the second antenna panel as a product of the domain conversion matrix and the estimated PADS; reforming, by the device, subblocks of the high dimensional channel characteristics of the second frequency band from the subblock matrices; and reconstructing, by the device, the high dimensional channel characteristics of the second frequency band from the reformed subblocks.

In a tenth implementation form of the method according to the first aspect or any preceding implementation form of the first aspect, the domain conversion matrix determining comprising determining the domain conversion matrix for each configured antenna lag, the determining being in accordance with at least one of an antenna structure of a first antenna panel, an antenna structure of a second antenna panel, a facing direction of the first antenna panel, a facing direction of the second antenna panel, a carrier frequency of the first frequency band, a carrier frequency of the second frequency band, and configured frequency lags of the first and second frequency bands.

In an eleventh implementation form of the method according to the first aspect or any preceding implementation form of the first aspect, the generating of the high dimensional channel characteristics of the second frequency band comprising: obtaining, by the device, subblock matrices for each configured frequency lag at the second antenna panel with the facing direction of the second antenna panel as a product of the domain conversion matrix and the estimated PADS; reforming, by the device, subblocks of the high dimensional channel characteristics of the second frequency band from the subblock matrices; and reconstructing, by the device, the high dimensional channel characteristics of the second frequency band from the reformed subblocks. In a twelfth implementation form of the method according to the first aspect or any preceding implementation form of the first aspect, the high dimensional channel characteristics comprising space-frequency covariance.

In a thirteenth implementation form of the method according to the first aspect or any preceding implementation form of the first aspect, the first frequency band and the second frequency band being one and the same.

In a fourteenth implementation form of the method according to the first aspect or any preceding implementation form of the first aspect, the first frequency band and the second frequency band being different bands.

In a fifteenth implementation form of the method according to the first aspect or any preceding implementation form of the first aspect, the first frequency band being used for uplink transmissions and the second frequency band being used for downlink transmissions.

According to a second aspect, a device is provided. The device comprising: one or more processors; and a non-transitory memory storage comprising instructions that, when executed by the one or more processors, cause the device to: calculate high dimensional channel characteristics of a first frequency band in accordance with measurements of the first frequency band; estimate a PADS in accordance with the high dimensional channel characteristics of the first frequency band; determine a domain conversion matrix for a second frequency band in accordance with the estimated PADS; and generate high dimensional channel characteristics of a second frequency band in accordance with the domain conversion matrix and the high dimensional channel characteristics of the first frequency band.

In a first implementation form of the device according to the second aspect, the instructions further cause the device to determine the domain conversion matrix in accordance with an antenna structure of the device, a carrier frequency of the first frequency band, a carrier frequency of the second frequency band, and configured frequency spacing of the first and second frequency bands.

In a second implementation form of the device according to the second aspect or any preceding implementation form of the second aspect, the PADS being estimated in accordance with the antenna structure of the device, and the carrier frequency of the first frequency band.

In a third implementation form of the device according to the second aspect or any preceding implementation form of the second aspect, the instructions further cause the device to project the PADS onto a subspace of a Hilbert space defined by basis functions in accordance with the antenna structure of the device, and the carrier frequency of the first frequency band.

In a fourth implementation form of the device according to the second aspect or any preceding implementation form of the second aspect, the instructions further cause the device to: obtain a product of the domain conversion matrix and the estimated PADS; and reform the high dimensional channel characteristics of the second frequency band from the product.

In a fifth implementation form of the device according to the second aspect or any preceding implementation form of the second aspect, the instructions further cause the device to determine the domain conversion matrix for each configured antenna lag, the domain conversion matrix being determined in accordance with an antenna structure of the device, a carrier frequency of the first frequency band, a carrier frequency of the second frequency band, and configured frequency lags of the first and second frequency bands.

In a sixth implementation form of the device according to the second aspect or any preceding implementation form of the second aspect, the instructions further cause the device to: obtain subblock matrices for each configured frequency lag as a product of the domain conversion matrix and the estimated PADS; reform subblocks of the high dimensional channel characteristics of the second frequency band from the subblock matrices; and reconstruct the high dimensional channel characteristics of the second frequency band from the reformed subblocks.

In a seventh implementation form of the device according to the second aspect or any preceding implementation form of the second aspect, the instructions further cause the device to determine the domain conversion matrix for each configured antenna lag, the domain conversion matrix being determined in accordance with an antenna structure of a first antenna panel, an antenna structure of a second antenna panel, a carrier frequency of the first frequency band, a carrier frequency of the second frequency band, and configured frequency lags of the first and second frequency bands.

In an eighth implementation form of the device according to the second aspect or any preceding implementation form of the second aspect, the instructions further cause the device to: obtain subblock matrices for each configured frequency lag at the second antenna panel as a product of the domain conversion matrix and the estimated PADS; reform subblocks of the high dimensional channel characteristics of the second frequency band from the subblock matrices; and reconstruct the high dimensional channel characteristics of the second frequency band from the reformed subblocks.

In a ninth implementation form of the device according to the second aspect or any preceding implementation form of the second aspect, the instructions further cause the device to determine the domain conversion matrix for each configured antenna lag, the domain conversion matrix being determined in accordance with an antenna structure of a first antenna panel, an antenna structure of a second antenna panel, a facing direction of the first antenna panel, a facing direction of the second antenna panel, a carrier frequency of the first frequency band, a carrier frequency of the second frequency band, and configured frequency lags of the first and second frequency bands.

In a tenth implementation form of the device according to the second aspect or any preceding implementation form of the second aspect, the instructions further cause the device to: obtain subblock matrices for each configured frequency lag at the second antenna panel with the facing direction of the second antenna panel as a product of the domain conversion matrix and the estimated PADS; reform subblocks of the high dimensional channel characteristics of the second frequency band from the subblock matrices; and reconstruct the high dimensional channel characteristics of the second frequency band from the reformed subblocks.

In an eleventh implementation form of the device according to the second aspect or any preceding implementation form of the second aspect, high dimensional channel characteristics comprising space-frequency covariance.

In a twelfth implementation form of the device according to the second aspect or any preceding implementation form of the second aspect, the first frequency band and the second frequency band being one and the same.

In a thirteenth implementation form of the device according to the second aspect or any preceding implementation form of the second aspect, the first frequency band and the second frequency band being different bands.

In a fourteenth implementation form of the device according to the second aspect or any preceding implementation form of the second aspect, the first frequency band being used for uplink transmissions and the second frequency band being used for downlink transmissions.

According to a third aspect, a non-transitory computer-readable media is provided. The non-transitory computer-readable media storing computer instructions for communicating over multiple frequency bands, that when executed by one or more processors, cause the one or more processors to perform the steps of: calculating high dimensional channel characteristics of a first frequency band in accordance with measurements of the first frequency band; estimating a PADS in accordance with the high dimensional channel characteristics of the first frequency band; determining a domain conversion matrix for a second frequency band in accordance with the estimated PADS; and generating high dimensional channel characteristics of a second frequency band in accordance with the domain conversion matrix and the high dimensional channel characteristics of the first frequency band.

In a first implementation form of the non-transitory computer-readable media according to the third aspect, wherein the computer instructions further cause the one or more processors to perform the steps of: projecting the PADS onto a subspace of a Hilbert space defined by basis functions in accordance with an antenna structure of the device, and a carrier frequency of the first frequency band.

In a second implementation form of the non-transitory computer-readable media according to the third aspect or any preceding implementation form of the third aspect, wherein the computer instructions further cause the one or more processors to perform the steps of: obtaining a product of the domain conversion matrix and the estimated PADS; and reforming the high dimensional channel characteristics of the second frequency band from the product.

In a third implementation form of the non-transitory computer-readable media according to the third aspect or any preceding implementation form of the third aspect, wherein the computer instructions further cause the one or more processors to perform the steps of: determining the domain conversion matrix for each configured antenna lag, the determining being in accordance with an antenna structure of the device, a carrier frequency of the first frequency band, a carrier frequency of the second frequency band, and configured frequency lags of the first and second frequency bands.

In a fourth implementation form of the non-transitory computer-readable media according to the third aspect or any preceding implementation form of the third aspect, wherein the computer instructions further cause the one or more processors to perform the steps of: obtaining subblock matrices for each configured frequency lag as a product of the domain conversion matrix and the estimated PADS; reforming subblocks of the high dimensional channel characteristics of the second frequency band from the subblock matrices; and reconstructing the high dimensional channel characteristics of the second frequency band from the reformed subblocks.

In a fifth implementation form of the non-transitory computer-readable media according to the third aspect or any preceding implementation form of the third aspect, wherein the computer instructions further cause the one or more processors to perform the steps of: determining the domain conversion matrix for each configured antenna lag, the determining being in accordance with an antenna structure of a first antenna panel, an antenna structure of a second antenna panel, a carrier frequency of the first frequency band, a carrier frequency of the second frequency band, and configured frequency lags of the first and second frequency bands.

In a sixth implementation form of the non-transitory computer-readable media according to the third aspect or any preceding implementation form of the third aspect, wherein the computer instructions further cause the one or more processors to perform the steps of: obtaining subblock matrices for each configured frequency lag at the second antenna panel as a product of the domain conversion matrix and the estimated PADS; reforming subblocks of the high dimensional channel characteristics of the second frequency band from the subblock matrices; and reconstructing the high dimensional channel characteristics of the second frequency band from the reformed subblocks.

In a seventh implementation form of the non-transitory computer-readable media according to the third aspect or any preceding implementation form of the third aspect, wherein the computer instructions further cause the one or more processors to perform the steps of: determining the domain conversion matrix for each configured antenna lag, the determining being in accordance with an antenna structure of a first antenna panel, an antenna structure of a second antenna panel, a facing direction of the first antenna panel, a facing direction of the second antenna panel, a carrier frequency of the first frequency band, a carrier frequency of the second frequency band, and configured frequency lags of the first and second frequency bands.

In an eighth implementation form of the non-transitory computer-readable media according to the third aspect or any preceding implementation form of the third aspect, wherein the computer instructions further cause the one or more processors to perform the steps of: obtaining subblock matrices for each configured frequency lag at the second antenna panel with the facing direction of the second antenna panel as a product of the domain conversion matrix and the estimated PADS; reforming subblocks of the high dimensional channel characteristics of the second frequency band from the subblock matrices; and reconstructing the high dimensional channel characteristics of the second frequency band from the reformed subblocks.

An advantage of a preferred embodiment is that computationally efficient multiple domain conversions of channel statistics are provided, enabling the conversion of channel statistics in both the frequency and spatial domains.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
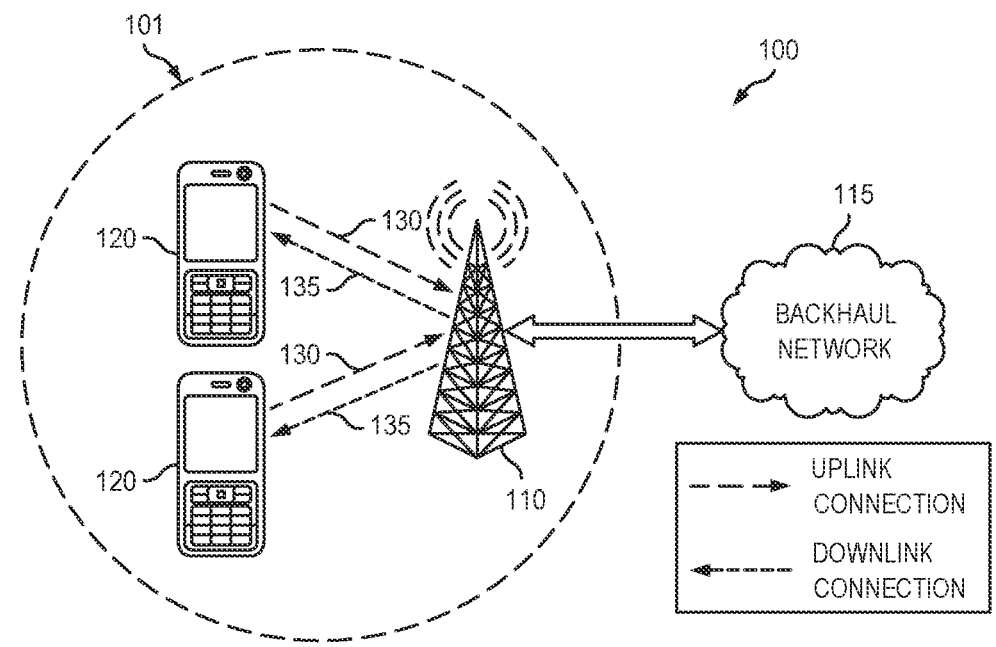
FIG. 1 illustrates an example communications system.

FIG. 1 illustrates an example communications system 100. Communications system 100 includes an access node 105 serving user equipments (UEs), such as UEs 120. In a first operating mode, communications to and from a UE passes through access node 105. In a second operating mode, communications to and from a UE do not pass through access node 105, however, access node 105 typically allocates resources used by the UE to communicate when specific conditions are met. Communication between a UE and access node pair occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, tablets, laptop PCs, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

As discussed previously, in time division duplex (TDD) communication systems, channel information for a first channel may be obtained through channel measurements of a second channel due to channel reciprocity. As an example, channel information for a downlink channel may be obtained through channel measurements of a corresponding uplink channel due to channel reciprocity. However, the reciprocity that applies for instantaneous channel state information (CSI) does not hold in frequency division duplex (FDD) communication systems where training and measurements of the first channel, along with information feedback is required.

Due to the large number of antennas present in massive multiple input multiple output (MIMO) communication systems, the computational complexity associated with downlink channel training and the feedback overhead associated with information feedback is very large. The computational complexity is further exacerbated in computationally limited UEs, which may be incapable of providing computational resources needed to train, or generate the channel information and feedback information.

Furthermore, in the case of wideband transmissions, inter-symbol interference (ISI) becomes a critical issue because, due to multipath channel fading, the transmitted signal arrives at the receiver at different times on different paths. Orthogonal frequency division multiplexing (OFDM) has been adopted in 4G and 5G communication systems to combat ISI and simplify receiver design. Because multipath fading introduces frequency selectivity, there is significant channel variance on different frequency subbands. With only spatial channel covariance, channel training has to be processed independently along with the frequency domain, which leads to increased training complexity and overhead. Because the channel spatial covariance only includes channel statistics related to the spatial (or equivalently, angular) domain, a key component of channel characteristics is missed, namely, delays over different channel paths.

According to an example embodiment, methods and apparatus are provided that utilize high dimensional (HiDi) channel characteristics to capture both spatial (angular) and delay information of a channel. As an example, a spatial-frequency covariance matrix is transformed from the power angle delay spectrum rather than the power angle spectrum for the spatial channel covariance matrix. Information regarding the radio environment of a gNB or the coverage of the gNB may help improve the network performance (e.g., spectrum access, user handover, radio resource management, and so on). HiDi provides an improved radio environment map because it captures multi-dimensional channel characteristics.

In an embodiment, the conversion of the spatial-frequency covariance on the downlink based on the uplink observation allows for improving the downlink channel training or cross subband channel filtering in FDD communication systems. However, besides FDD communication systems, the conversion of the spatial-frequency covariance may be applied to any communication system that operates on multiple frequency bands with the same antenna array aperture, as long as the carrier frequency spacing between any two bands is not too great. Additionally, assumption that the power angle delay spectrum on these frequency bands is the same (or approximately the same) remains valid. The ability to obtain HiDi channel statistics of a first frequency band by converting HiDi channel statistics of a second frequency band benefits the system design on the first frequency band by enabling efficient wideband channel training, beam management, and so on, without requiring the determination of the HiDi channel statistics of the first frequency band through training.

Figure 2A:
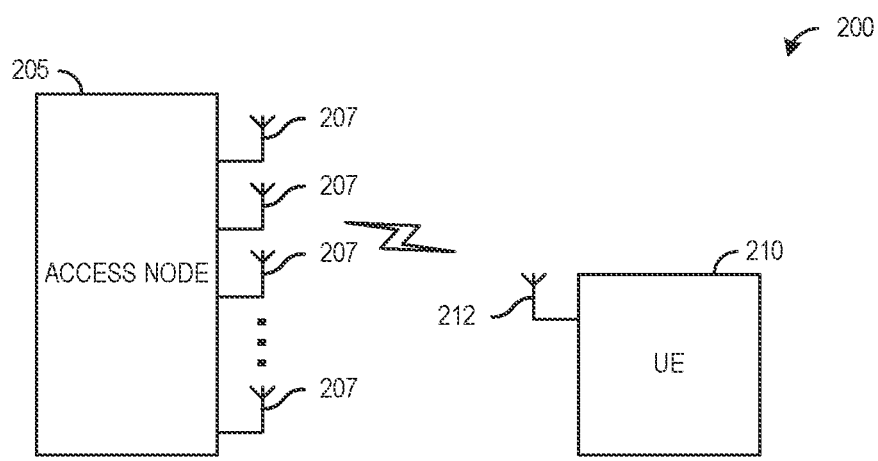
FIG. 2A illustrates a communication system used in presenting a signal model utilized in the discussion presented herein.

FIG. 2A illustrates a communication system 200 used in presenting a signal model utilized in the discussion presented herein. Communication system 200 includes an access node 205 and a UE 210. Access node 205 includes an antenna array with M antennas 207, while UE 210 includes a single receive antenna 212. For a discrete spatial channel model, assuming that there are L channel paths, the channel response at the antenna array (denoted $h(t)=[h_i(t), \ldots, h_M(t)]^T$) may be expressed as $$h(t) = \sum_{l=1}^{L} c_l(t) a(\theta_l, \phi_l) \delta(t - \tau_l), \quad (1)$$

where $a(\theta_l, \phi_l) = [a_1(\theta_l, \phi_l), \ldots, a_M(\theta_l, \phi_l)]^T$ is a normalized beam vector on the channel from the angle of arrival (AoA) $\theta$ based on the antenna location and $$a_m(\theta, \phi) = e^{-\frac{j2\pi}{\lambda} k(\theta,\phi)^T u_m},$$

$k(\theta, \phi) = [\sin(\theta)\sin(\phi), \cos(\theta)\sin(\phi), \cos(\phi)]^T$, $\theta \in [-\pi, \pi]$, $\phi \in [0, \pi]$, and $u_m$ is in the three-dimensional (3-D) spatial coordinates of antenna in.

Figure 2B:
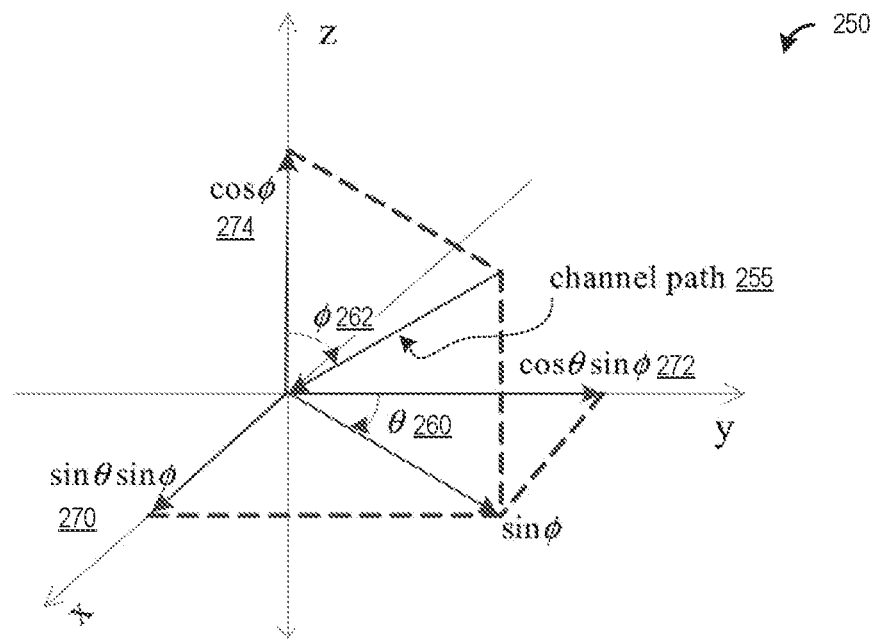
FIG. 2B illustrates a diagram of a 3-D vector of a channel path.

FIG. 2B illustrates a diagram 250 of a 3-D vector of a channel path 255. Channel path 255 may be represented in angular form with angles θ 260 and φ 262 or in Cartesian coordinate form as $\sin\theta \sin\phi$ 270 (in the X axis), $\cos\theta \sin\phi$ 272 (in the Y axis), and $\cos\phi$ 274 (in the Z axis).

If a two-dimensional (2-D) antenna array is considered, then $k(\theta)=[\sin(\theta), \cos(\theta)]^T$ and $u_m$ is the 2-D spatial coordinates of antenna in. Additionally, in Equation (1), $c_l(t)$, $\theta_l$, $\phi_l$, and $\tau_l$ are the instantaneous complex channel gain, the horizontal and vertical AoA, and the delay of the l-th path, respectively, and $\delta(\cdot)$ is the delta function with $\delta(0)=1$ and 0 otherwise. Then $\mathbb{E}\{c_l(t)\}=p_l$. The channel statistics can be specified as the power angle delay profiles, i.e., $\{p_l, \theta_l, \phi_l, \tau_l\}_{l=1}^{L}$. Without including the large scale channel parameters, e.g., pathloss or receive signal-to-noise ratio (SNR) in general, it is assumed that $\Sigma_l p_l = 1$.

In the discussion presented herein, the focus is on 2-D systems. However, the example embodiments presented are operable with 3-D systems for any planar antenna array. Therefore, the focus on 2-D systems should not be construed as being limiting to the spirit of the example embodiments.

Considering wideband systems with OFDM modulation, after FFT at the receiver, the fading channel in the frequency domain on subcarrier k is expressible as $$h[k](t) = Fh(t) = \sqrt{\frac{1}{N_F}} \sum_{l=1}^{L} c_l(t) a(\theta_l) e^{-j2\pi k f_{sc} \tau_l}, \quad (2)$$

where $f_{sc}$ is the subcarrier spacing and $N_F$ is the Fast Fourier Transfer (FFT) size.

Given the instantaneous channel in the frequency domain, channel measurements may be taken at different subcarriers $k_1, k_2, \ldots, k_N$, i.e., $h[k_1], \ldots, h[k_N]$. The channel measurements may be vectorized as $$h \triangleq [h[k_1]^T, \ldots, h[k_N]^T]^T. \quad (3)$$

A first version of the spatial-frequency covariance (a form of HiDi channel statistics) is expressible as $$R_{SF} = \mathbb{E}\{\tilde{h}\tilde{h}^H\} = \begin{bmatrix} \mathbb{E}\{h[k_1]h[k_1]^H\} & \mathbb{E}\{h[k_1]h[k_2]^H\} & \ldots & \mathbb{E}\{h[k_1]h[k_N]^H\} \\ \mathbb{E}\{h[k_2]h[k_1]^H\} & \mathbb{E}\{h[k_2]h[k_2]^H\} & \ldots & \mathbb{E}\{h[k_2]h[k_N]^H\} \\ \vdots & \vdots & \ddots & \vdots \\ \mathbb{E}\{h[k_N]h[k_1]^H\} & \mathbb{E}\{h[k_N]h[k_2]^H\} & \ldots & \mathbb{E}\{h[k_N]h[k_N]^H\} \end{bmatrix}. \quad (4)$$

From Equation (2), each subblock $\mathbb{E}\{h[k_i]h[k_j]^H\}$ in Equation (4) is expressible as $$\mathbb{E}\{h[k_i]h[k_j]^H\} = \mathbb{E}\left\{\sum_{l_1=1}^{L} c_{l_1} a(\theta_{l_1}) e^{-j2\pi k_i f_{sc}\tau_{l_1}} \sum_{l_2=1}^{L} c_{l_2}^* a(\theta_{l_2})^H e^{j2\pi k_j f_{sc}\tau_{l_2}}\right\} \quad (5)$$

$$= \mathbb{E}\left\{\sum_{l=1}^{L} |c_l|^2 a(\theta_l) a(\theta_l)^H e^{-j2\pi(k_i-k_j)f_{sc}\tau_l}\right\}$$

$$= \sum_{l=1}^{L} p_l a(\theta_l) a(\theta_l)^H e^{-j2\pi(k_i-k_j)f_{sc}\tau_l},$$

where the second equality follows the assumption that the complex channel gain of each path $c_l$ is independent.

From Equation (5), $\mathbb{E}\{h[k_i]h[k_j]^H\}$ depends only on the difference of the subcarriers, i.e., $\Delta_{k_{ij}}=k_i-k_j$, instead of the absolute values of $k_i$ or $k_j$. Hence, when $k_i=k_j$, $\Delta_{k_{ij}}=0$. Then, $$\mathbb{E}\{h[k_i]h[k_i]^H\} = \sum_{l=1}^{L} p_l a(\theta_l) a(\theta_l)^H, \forall i, \quad (6)$$

which reduces to the wideband spatial covariance R.

Based on the above observation, it is possible to rewrite Equation (4) and define a new version of spatial-frequency covariance. The channel on a frequency subcarrier k, $$k + \Delta_{k_1}, \ldots, k_{\Delta_{k_{N_{SF-1}}}},$$

i.e., $h[k]$, $h[k+\Delta_{k_1}]$, ..., $$h[k], h[k+\Delta_{k_1}], \ldots, h[k+\Delta_{k_{N_{SF}-1}}],$$

is selected, where $\{\Delta_{k_i}\}$ are the frequency lags considered in the spatial-frequency covariance. Furthermore, the following are set: $\Delta_{k_i} \neq \Delta_{k_j}$ and $\Delta_{k_i} \neq 0$, $\forall$ i, j.

The spatial channels on these subcarriers with different frequency lags are vectorized to obtain $$\check{h} \triangleq \left[ h[k]^T, h[k+\Delta_{k_1}]^T \ldots, h[k+\Delta_{k_{N_{SF}-1}}]^T \right]^T. \quad (7)$$

The new spatial-frequency covariance matrix, defined as $$R_{SF} = \mathbb{E}\{\check{h}\check{h}^H\} = \quad (8)$$

$$\begin{bmatrix} \mathbb{E}\{h[k]h[k]^H\} & \mathbb{E}\{h[k]h[k+\Delta_{k_1}]^H\} & \cdots & \mathbb{E}\{h[k]h[k+\Delta_{k_{N_{SF}-1}}]^H\} \\ \mathbb{E}\{h[k+\Delta_{k_1}]h[k]^H\} & \mathbb{E}\{h[k+\Delta_{k_1}]h[k+\Delta_{k_1}]^H\} & \cdots & \mathbb{E}\{h[k+\Delta_{k_1}]h[k+\Delta_{k_{N_{SF}-1}}]^H\} \\ \vdots & \vdots & \ddots & \vdots \\ \mathbb{E}\{h[k+\Delta_{k_{N_{SF}-1}}]h[k]^H\} & \mathbb{E}\{h[k+\Delta_{k_{N_{SF}-1}}]h[k+\Delta_{k_1}]^H\} & \cdots & \mathbb{E}\{h[k+\Delta_{k_{N_{SF}-1}}]h[k+\Delta_{k_{N_{SF}-1}}]^H\} \end{bmatrix} =$$

$$\begin{bmatrix} R_0 & R_{\Delta_{k_1}}^H & \cdots & R_{\Delta_{k_{N_{SF}-1}}}^H \\ R_{\Delta_{k_1}} & R_0 & \cdots & R_{\Delta_{k_{N_{SF}-2}}}^H \\ \vdots & \vdots & \ddots & \vdots \\ R_{\Delta_{k_{N_{SF}-1}}} & R_{\Delta_{k_{N_{SF}-2}}} & \cdots & R_0 \end{bmatrix},$$

where $N_{SF}$ is the number of frequency lags in the covariance including the zero lag and $$R_{\Delta_{k_i}} = \mathbb{E}\{h[k+\Delta_{k_i}]h[k]^H\} = \sum_{l=1}^{L} p_l a(\theta_l) a(\theta_l)^H e^{-j2\pi\Delta_{k_i} f_{sc} \tau_l}. \quad (9)$$

From Equation (9), the new spatial-frequency covariance matrix is not dependent on an arbitrary subcarrier k, but on all frequency lags $\Delta_{k_i}$, with the first frequency lag being zero lag.

Also the path power $p_l$ is a function of the path angle and delay. For the continuous case, a continuous function representing power angle delay spectrum $\rho(\theta, \tau)$ is used. Then the block entries of spatial-frequency covariance matrix as the function of $\rho(\theta, \tau)$ are expressible as $$R_{\Delta_{k_i}} = \int_0^{+\infty} \int_{-\pi}^{\pi} \rho(\theta, \tau) a(\theta) a(\theta)^H e^{-j2\pi\Delta_{k_i} f_{sc} \tau} d\theta d\tau, i = 0, \cdots, N_{SF} - 1. \quad (10)$$

Naturally, $\int_0^{+\infty} \int_{-\pi}^{\pi} \rho(\theta, \tau) d\theta d\tau < +\infty$ due to the total channel power constraint. In practice, it is assumed that there is a largest delay spread threshold on the channel delay, denoted as $\tau_{DS}$. Later, an asymptotic result is obtained by takin $\tau_{DS}$ to $\infty$. For a given $\tau_{DS}$, $$R_{\Delta_{k_i}} = \int_0^{\tau_{DS}} \int_{-\pi}^{\pi} \rho(\theta, \tau) a(\theta) a(\theta)^H e^{-j2\pi\Delta_{k_i} f_{sc} \tau} d\theta d\tau. \quad (11)$$

$R_{SF}$ is a Hermitian. For the uplink (UL) and the downlink (DL) in FDD communication systems, $$R_{\Delta_{k_i}}^{UL} = \int_0^{\tau_{DS}} \int_{-\pi}^{\pi} \rho(\theta, \tau) a^{UL}(\theta) a^{UL}(\theta)^H e^{-j2\pi\Delta_{k_i} f_{sc} \tau} d\theta d\tau \quad (12)$$

$$R_{\Delta_{k_i}}^{DL} = \int_0^{\tau_{DS}} \int_{-\pi}^{\pi} \rho(\theta, \tau) a^{DL}(\theta) a^{DL}(\theta)^H e^{-j2\pi\Delta_{k_i} f_{sc} \tau} d\theta d\tau, \quad (13)$$

where the entries for $a^{UL}(\theta)$ and $a^{DL}(\theta)$ are expressible as $$a_m^{UL}(\theta) = e^{-\frac{j2\pi}{\lambda^{UL}} k(\theta)^T u_m}$$

and

-continued $$a_m^{DL}(\theta) = e^{-\frac{j2\pi}{\lambda^{DL}} k(\theta)^T u_m},$$

respectively.

According to an example embodiment, methods and apparatus for obtaining the spatial-frequency covariance matrix $R_{SF}$ of a FDD communication system are provided. The spatial-frequency covariance matrix may be determined in accordance with measurements of the channels made at difference subcarriers.

Figure 3:
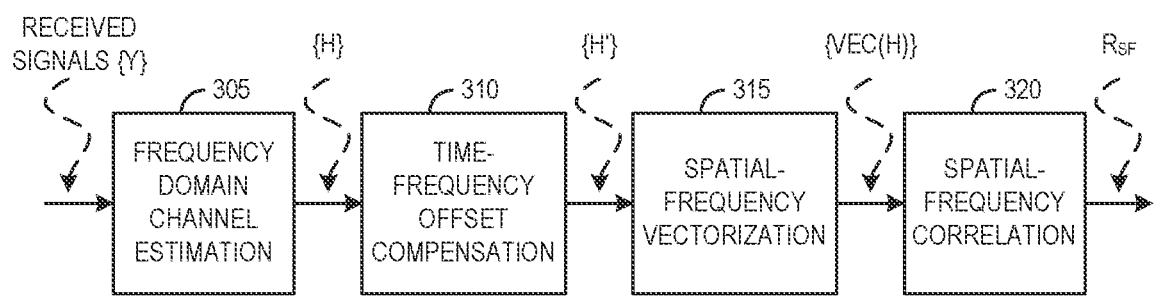
FIG. 3 illustrates an example process for generating the spatial-frequency covariance of a communication system.

FIG. 3 illustrates an example process 300 for generating the spatial-frequency covariance of a communication system. Process 300 may be used in FDD or multiband communication systems. Process 300 may also be used as input for TDD systems. Process 300 includes a frequency domain channel estimation unit 305, a time-frequency offset compensation unit 310, a spatial-frequency vectorization unit 315, and a spatial-frequency correlation unit 320. Frequency domain channel estimation unit 305 is configured to derive channel estimates (in the frequency domain) of the channels of the communication system from received signals. Time-frequency offset compensation unit 310 is configured to provide compensation for the time offsets present in the channel estimates. Spatial-frequency vectorization unit 315 is configured to vectorize the time compensated channel estimates. Spatial-frequency correlation unit 320 is configured to correlate the vectorized channel estimates to determine the spatial-frequency covariance.

Figure 4:
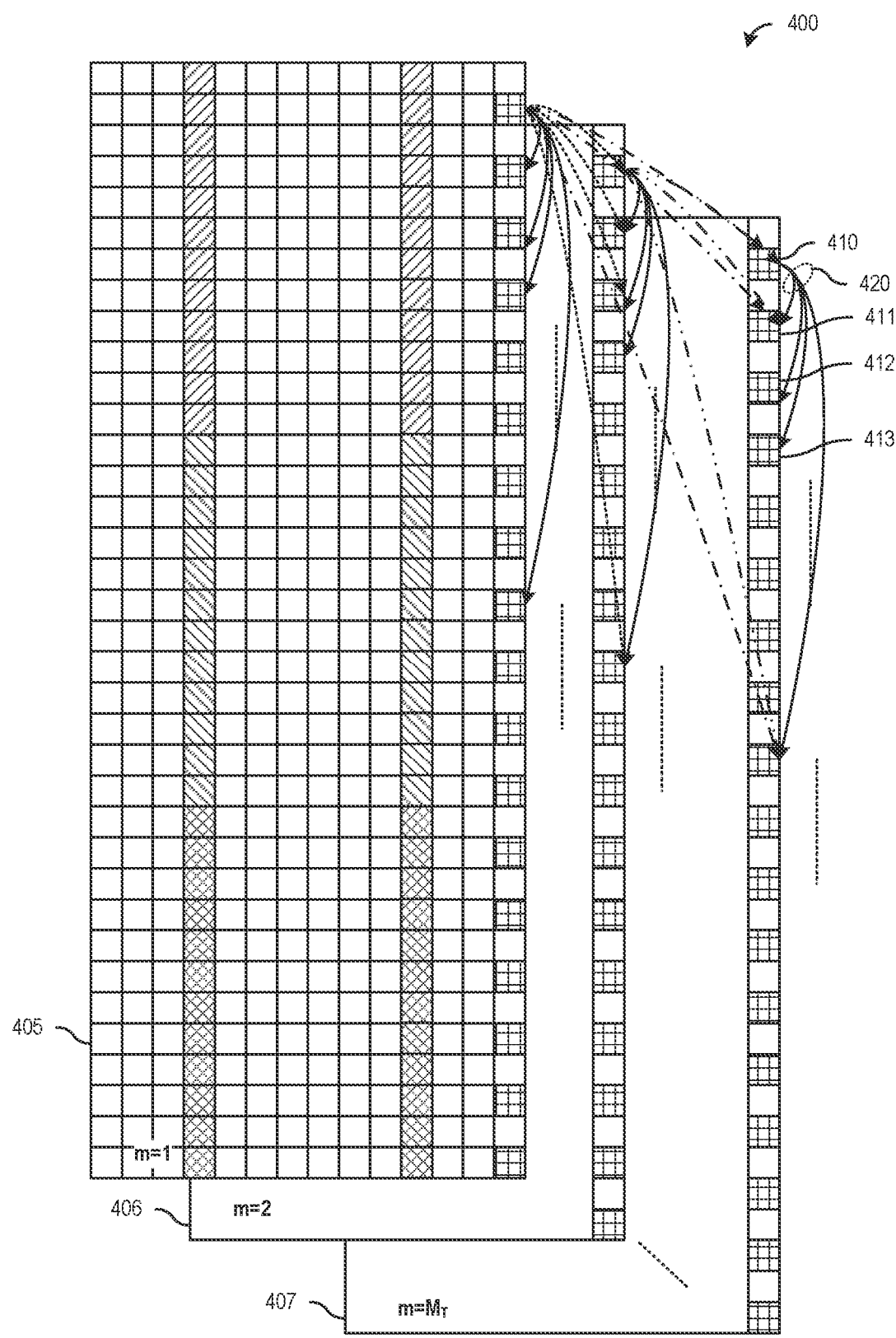
FIG. 4 illustrates an exemplary space-frequency frame structure of a communication system as a function of time and the illustration of space-frequency covariance.

FIG. 4 illustrates an exemplary space-frequency frame structure 400 of a communication system as a function of time and frequency. FIG. 4 also illustrates space-frequency covariance. Space-frequency diagram 400 displays MT distinct time-frequency frames 405-407, one for each of the MT transmit antennas. Also illustrated in FIG. 4 are time-frequency resources used for estimating the channels, such as resources 410-413 of time-frequency frame 407, as well as similar resources of time-frequency frames 405 and 406. The space-frequency covariance, including the cross correlations, for the resources on different subcarriers and different antennas are illustrated in FIG. 4 as arrowed lines (for example, arrowed lines 420 and similar arrowed lines of time-frequency frames 405 and 406). The resources used for estimating the channels are pilot signals that are usually separated by a constant number of subcarriers. The space-frequency covariance depends on the frequency difference between subcarriers and not arbitrary subcarrier locations. As an example resource 410 is spaced one subcarrier away from resource 411, which is spaced one subcarrier away from resource 412, and so on.

According to an embodiment, a conversion of the spatial-frequency covariance for a first frequency band to the spatial-frequency covariance for a second frequency band is provided. The ability to convert an existing spatial-frequency covariance to another spatial-frequency covariance may eliminate training requirements, thereby reducing computational requirements and communication overhead, and improve overall communication performance. As an example, in a FDD communication system, the spatial-frequency covariance for an uplink channel may be obtained using uplink transmissions and computations. However, because the instantaneous channel for the downlink is not known, UE measurements and feedback are needed to determine the spatial-frequency covariance in the downlink. Being able to convert the spatial-frequency covariance for the uplink channel from uplink measurement into the spatial-frequency covariance for the downlink channel without UE measurement and feedback would facilitate the efficient channel training and reduce training and feedback overhead. As another example, the spatial-frequency covariance for a first frequency band may be converted from the spatial-frequency covariance for a second frequency band, again with similar savings in computational resources and communication overhead.

Although the discussion focuses on spatial and frequency domain conversion, the example embodiments presented herein are also operable with single domain conversion. As an example, in a situation where the first frequency band and the second frequency band are the same, then spatial-frequency domain conversion becomes only spatial domain conversion (because the frequency domain does not change). Therefore, the discussion of spatial-frequency domain conversion should not be construed as being limiting to the scope of the example embodiments.

Figure 5:
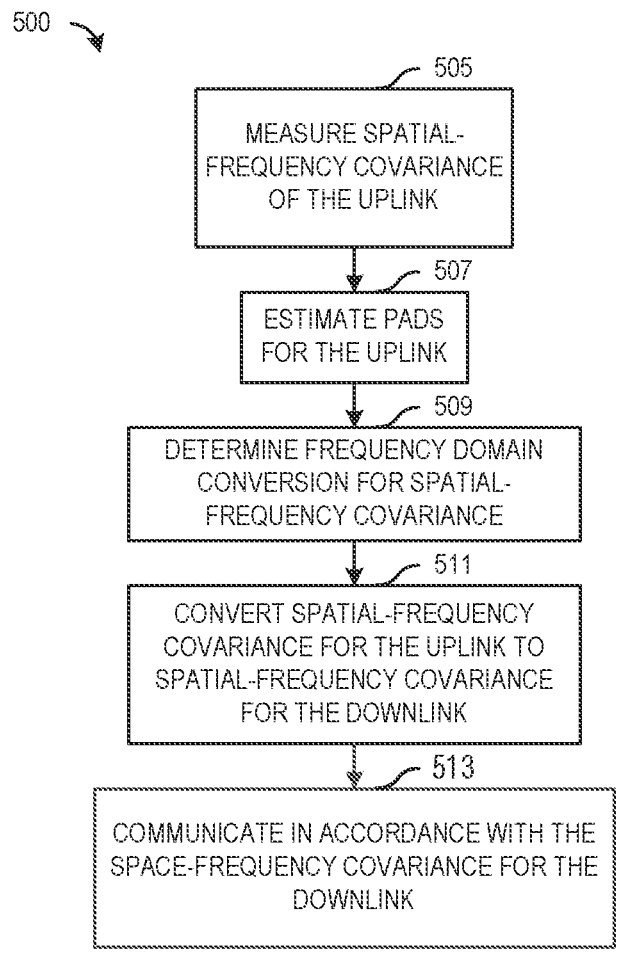
FIG. 5 illustrates a flow diagram of example operations occurring in a device converting spatial-frequency covariance $R_{SF}$ according to example embodiments presented herein.

FIG. 5 illustrates a flow diagram of example operations 500 occurring in a device converting spatial-frequency covariance $R_{SF}$. Operations 500 may be indicative of operations occurring in a device as the device converts the spatial-frequency covariance. The device may be an access node. The device may also be a UE (or other similar devices). The device may alternatively be a separate device configured for generating spatial-frequency covariance for communicating devices utilizing information provided by the communicating devices. As an example, the device may be a device located in the communication system dedicated to receiving channel information from communicating devices and converting spatial-frequency covariance for the communicating devices.

Operations 500 begin with the device obtaining a spatial-frequency covariance of the uplink $R_{SF}^{UL}$ (block 505). The device may make channel measurements and generate the spatial-frequency covariance based on transmissions occurring in the uplink. As an example, the device may include an implementation of process 300 of FIG. 3 to generate spatial-frequency covariance. Alternatively, the device may receive channel measurements or frequency domain channel estimates from a communicating device and the device generates the spatial-frequency covariance based on the channel measurements or the frequency domain channel estimates. As an example, the device may include an implementation of process 300 of FIG. 3 to generate spatial-frequency covariance from the received channel measurements or the frequency domain channel estimates.

The device estimates the power angle delay spectrum (PADS) for the uplink (block 507). In an embodiment, a technique based on a projection onto the Hilbert space is utilized to estimate the PADS. Without specifying any one particular carrier frequency band, the spatial-frequency covariance is vectorized and is expressible as $$r=\text{vec}([\Re\{\{R_{SF}\}, \Im\{R_{SF}\}]),$$

where vec (X) denotes a vectorizing operation that vectorizes the matrix X into a vector. The n-th entry of r, $r_n$, is then expressible as $$r_n=\int_0^{\tau_{DS}}\int_{-\pi}^{\pi}\rho(\theta,\tau)g_n(\theta,\tau)d\theta d\tau, n=1,\ldots,N, \quad (14)$$

where $g_n(\theta, \tau)$ is the entry of vectorized angular and delay term $$ca(\theta)a(\theta)^H e^{-j2\pi\Delta k_i f_{sc}\tau}$$

corresponds to $r_n$, with real and imaginary parts separated, i.e., the mapping from $[-\pi, \pi]\times[0, \tau_{DS}]\to \mathbb{R}$, c is the normalization factor which is defined as $c = \frac{1}{\sqrt{2\pi\tau_{DS}}}$, and N is total number of entries $r^{UL}$, i.e., N=2 $(M^2-M)N_{SF}$. The normalization is a scaling factor, which may not affect the results for any given $\tau_{DS}$ because the normalization simply scales the PADS with a common factor. The normalization will be scaled back with the conversion. However, the normalization is important to form the solution when $\tau_{DS}$ goes to infinity.

A Hilbert space $\mathcal{H}$ of a real function in $L^2$ space with inner product is defined, and is expressible as $$\langle f,g \rangle = \int_0^{\tau_{DS}}\int_{-\pi}^{\pi}f(\theta,\tau)g(\theta,\tau)d\theta d\tau. \quad (15)$$

The L-2 norm is then defined as $$\|f\|^2 \triangleq \langle f, f \rangle = \int_0^{\tau_{DS}}\int_{-\pi}^{\pi}f^2(\theta,\tau)d\theta d\tau. \quad (16)$$

Equation (14) may be rewritten as $$r_n=\langle \rho, g_n \rangle, n=1,\ldots,N. \quad (17)$$

Then, for the uplink, $$r_n^{UL}=\langle \rho, g_n^{UL} \rangle, n=1,\ldots,N \quad (18)$$

where $g_n^{UL}$ is the entry of $$ca^{UL}(\theta)a^{UL}(\theta)^H e^{-j2\pi\Delta k_i f_{sc}\tau}$$

corresponding to $r_n^{UL}$.

Therefore, the problem becomes: for a given $\{r_n^{UL}\}$ and $\{g_n^{UL}(\theta, \tau)\}$, the PADS $\rho(\theta, T)$ is estimated. The solution involves solving a linear equation array if the PADS $\rho$ is a discrete vector of the quantized pair $(\theta, \tau)$. However, $\{\rho(\theta, \tau)\}$ is a continuous function of the 2-D variables $(\theta, \tau)$, and the problem becomes intractable with conventional methods.

In order to solve the PADS estimation in Equation (18), the problem may be reformulated and solve the problem with the projection method in Hilbert space. First, without loss of generality, it is assumed that $g_n^{UL}(\theta, \tau)$, $n=1, \ldots, N'$ are the linearly independent vector subset of all $g_n^{UL}(\theta, \tau)$, $n=1, \ldots, N$. Then the subspace V of $\rho \in \mathcal{H}$ specified by $\{g_n^{UL}(\theta, \tau)\}_{n=1}^{N'}$ is defined as $$V \triangleq \bigcap_{n=1}^{N} V_n \quad (19)$$

$$V_n \triangleq \{\rho \in \mathcal{H} : \langle \rho, g_n^{UL} \rangle = r_n^{UL}\}, n = 1 \ldots, N'.$$

To obtain the estimation of PADS $\rho(\theta, T)$, the minimum norm criterion is considered, i.e., $$\hat{\rho}(\theta, \tau) = \underset{\rho \in V}{\operatorname{argmin}} \|\rho\|^2, \quad (20)$$

where the subspace V is defined in Equation (19). The solution of Equation (20) will be the orthogonal projection of PADS $\rho(\theta, \tau)$ on the orthogonal subspace of the linear variety V, which will be the projection to the subspace V. The estimate of PADS is then expressible as $$\hat{\rho}(\theta, \tau) = \sum_{n=1}^{N'} \alpha_n g_n^{UL}(\theta, \tau), \quad (21)$$

where $\{\alpha_n\}$ are the solution of linear equations, which are expressible as $$\begin{aligned}
\langle g_1^{UL}, g_1^{UL} \rangle \alpha_1 + \langle g_1^{UL}, g_2^{UL} \rangle \alpha_2 + \ldots + \langle g_1^{UL}, g_{N'}^{UL} \rangle \alpha_{N'} &= r_1^{UL} \\
&\vdots \\
\langle g_{N'}^{UL}, g_1^{UL} \rangle \alpha_1 + \langle g_{N'}^{UL}, g_2^{UL} \rangle \alpha_2 + \ldots + \langle g_{N'}^{UL}, g_{N'}^{UL} \rangle \alpha_{N'} &= r_{N'}^{UL}
\end{aligned} \quad (22)$$

If $\alpha = [\alpha_1, \ldots, \alpha_{N'}]^T$, the linear array of Equation (22) may be rewritten as $$G\alpha = r^{UL}, \quad (23)$$

where G is defined as $$G = \begin{bmatrix} \langle g_1^{UL}, g_1^{UL} \rangle & \cdots & \langle g_1^{UL}, g_{N'}^{UL} \rangle \\ \vdots & \ddots & \vdots \\ \langle g_{N'}^{UL}, g_1^{UL} \rangle & \cdots & \langle g_{N'}^{UL}, g_{N'}^{UL} \rangle \end{bmatrix}. \quad (24)$$

The above linear equations (Equation (24)) are guaranteed to have at least one solution. From Equation (21), it is seen that the PADS can be represented as the weighted sum of independent basis functions of angles and delays, $g_n^{UL}(\theta, \tau)$, with weights $\alpha_n$, $n=1, \ldots, N'$. In mathematics, a basis function is an element of a particular basis for a function space. The basis functions may enable the representation of a more complex function based on the simpler basis functions. Every continuous function in the function space may be represented as a linear function of basis functions, just as every vector in a vector space may be represented as a linear combination of basis vectors. From equations (22)-(24), estimating PADS becomes estimating the weights $\alpha$. As explained before, $g_n(\theta, \tau)$ is the entry of vectorized angular and delay function of $$ca(\theta)a(\theta)^H e^{-j2\pi\Delta_{k_i} f_{sc}\tau}$$

with real and imaginary parts separated. Therefore, the basis functions $g_n(\theta, \tau)$, $n=1, \ldots, N'$, depend on the antenna structure, e.g. antenna positions, the carry frequency of the frequency band, and frequency lags $\Delta_{k_i}$. In general, the basis functions do not change over the UEs. However, when the UE changes or the channel statistics for the UE changes, the power angle delay spectrum of the UE may still be represented as a linear combination in Equation (21) with the same basis functions $g_n(\theta, T)$ but with different coefficients or weights $\alpha_n$.

The device determines a frequency domain conversion for the spatial-frequency covariance (block 509). In order to obtain the spatial-frequency covariance in the downlink, it is assumed that the same PADS 92 $(\theta, \tau)$ applies. After obtaining the estimated PADS $\hat{\rho}(\theta, \tau)$, by using Equation (21), for example, the following is obtained for the downlink $$\hat{r}_n^{DL} = \langle \hat{\rho}, g_n^{DL} \rangle = \sum_{n'=1}^{N'} \alpha_{n'} \langle g_{n'}^{UL}, g_n^{DL} \rangle, \quad (25)$$

where $\hat{r}_n^{DL}$ is the estimate of n-th entry of $r^{DL}$ and $r^{DL} = \text{vec}([\Re\{R_{SF}\}, \Im\{R_{SF}\}])$. Then, the vectorized spatial-frequency covariance in the downlink is expressible as $$\hat{r}^{DL} = Q\alpha, \quad (26)$$

where Q is the frequency domain conversion for the HiDi channel statistics and is expressible as $$Q = \begin{bmatrix} \langle g_1^{UL}, g_1^{DL} \rangle & \cdots & \langle g_{N'}^{UL}, g_1^{DL} \rangle \\ \vdots & \ddots & \vdots \\ \langle g_1^{UL}, g_N^{DL} \rangle & \cdots & \langle g_{N'}^{UL}, g_N^{DL} \rangle \end{bmatrix}. \quad (27)$$

The device converts the spatial-frequency covariance of the uplink to spatial-frequency covariance of the downlink (block 511). The device may convert the spatial-frequency covariance of the uplink to the spatial-frequency covariance of the downlink by reforming the spatial-frequency covariance of the downlink from the vectorized spatial-frequency covariance in the uplink. As an example, the reforming of the spatial-frequency covariance in the downlink may proceed in a manner that is in reverse of the way that the vectorized spatial-frequency covariance in the uplink is formed. The device communicates in accordance with the spatial-frequency covariance of the downlink (block 513). As an example, the device uses the spatial-frequency covariance of the downlink to perform training and facilitate downlink transmissions to other devices.

Although the discussion presented herein focuses on converting the spatial-frequency covariance in the downlink from the spatial-frequency covariance in the uplink, the example embodiments presented herein are operable for converting the spatial-frequency covariance of a first frequency band to the spatial-frequency covariance of a second frequency band. The conversion of the spatial-frequency covariance from the uplink spatial-frequency covariance to the downlink spatial-frequency covariance may be viewed as a special case of the first frequency band and the second frequency band, where the first frequency band is the uplink and the second frequency band is the downlink. Therefore, the discussion of uplink and downlink should not be construed as being limiting to the scope of the example embodiments.

Figure 6A:
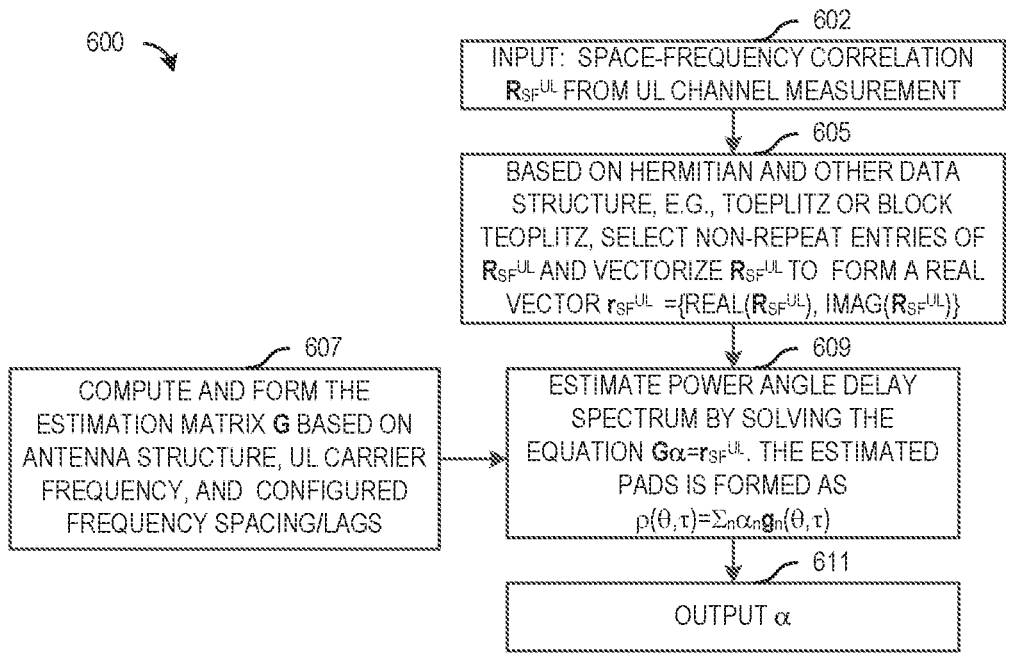
FIG. 6A illustrates a flow diagram of example operations occurring in a device estimating the power angle delay spectrum (PADS) for the uplink according to example embodiments presented herein.

FIG. 6A illustrates a flow diagram of example operations 600 occurring in a device estimating the PADS for the uplink. Operations 600 may be indicative of operations occurring in a device as the device estimates the PADS for the uplink. Operations 600 may be an example implementation of block 507 of FIG. 5. Although the discussion focuses on uplink and downlink, the example embodiments are operable for any two frequency bands. In such a situation, the uplink would be a first frequency band and the downlink would be a second frequency band.

Input to operations 600 may include the spatial-frequency covariance $R_{SF}^{UL}$, which may be determined in accordance with measurements of the uplink (block 602). Operations 600 begin with the device selecting non-repeating entries of $R_{SF}^{UL}$ and vectorizing $R_{SF}^{UL}$ to form a real vector $r_{SF}^{UL}$ (block 605). The selection may be based on hermitian or other data structure, such as Toeplitz or block Teoplitz structures. As an example, the real vector $r_{SF}^{UL}$ is expressible as $$r_{SF}^{UL} = \text{Vec}\{\Re\{R_{SF}^{UL}\}, \Im\{R_{SF}^{UL}\}\}.$$

The device forms an estimation matrix G (block 607). The estimation matrix G may be formed in accordance with parameters of the communication system, including the antenna structure (such as aperture, spacing, polarization, etc.), carrier frequency of the uplink, configured frequency spacings or lags, and so on). As an example, estimation matrix G may be formed as shown in Equation (24).

The device estimates the PADS (block 609). The estimation of the PADS may be performed in accordance with the real vector $r_{SF}^{UL}$ and the estimation matrix G, and may include solving Equation (23), for example. The estimated PADS is as expressed as Equation (21). The device outputs the estimation output α (block 611). The device outputs the weights α of the estimated PADS, for example.

Figure 6B:
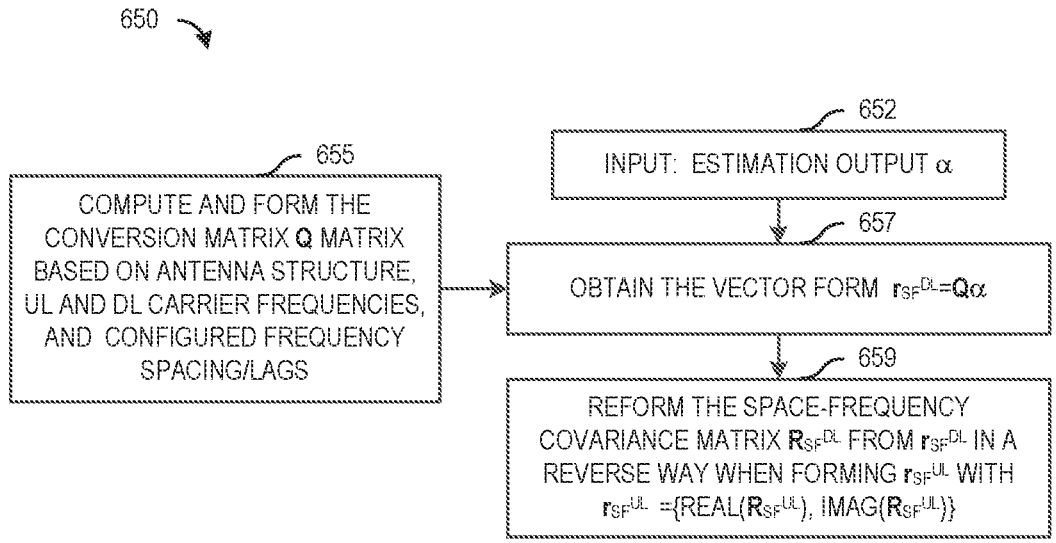
FIG. 6B illustrates a flow diagram of example operations occurring in a device converting the spatial-frequency covariance for the uplink $R_{SF}^{UL}$ to the spatial-frequency covariance for the downlink $R_{SF}^{DL}$ according to example embodiments presented herein.

FIG. 6B illustrates a flow diagram of example operations 650 occurring in a device converting the spatial-frequency covariance for the uplink RD to the spatial-frequency covariance for the downlink $R_{SF}^{DL}$. Operations 650 may be indicative of operations occurring in a device as the device converts the spatial-frequency covariance for the uplink $R_{SF}^{DL}$ to the spatial-frequency covariance for the downlink RD. Operations 650 may be an example implementation of blocks 509 and 511 of FIG. 5. Although the discussion focuses on uplink and downlink, the example embodiments are operable for any two frequency bands. In such a situation, the uplink would be a first frequency band and the downlink would be a second frequency band.

Input to operations 650 may include the estimation output α, such as produced by a device performing block 611 of FIG. 6A (block 652). Operations 650 begin with the device forming a conversion matrix Q (block 655). The conversion matrix may be formed in accordance with parameters of the communication system, including the antenna structure (such as aperture, spacing, polarization, etc.), carrier frequency of the uplink and the downlink, configured frequency spacings or lags, and so on). As an example, the conversion matrix Q may be formed as shown in Equation (27).

The device obtains the vectorized form of the spatial-frequency covariance for the downlink $r_{SF}^{DL}$ (block 657). The vectorized form of the spatial-frequency covariance being obtained by multiplying the estimation output α (provided as input to operations 650) and the conversion matrix Q formed in block 655, and may be expressible as $r^{DL} = Q\alpha$, for example. The device reforms the spatial-frequency covariance matrix $R_{SF}^{DL}$ (block 659). The $R_{SF}^{DL}$ may be reformed from the vectorized form of the spatial-frequency covariance for the downlink $r_{SF}^{DL}$. The $R_{SF}^{DL}$ may be formed in a reverse manner from forming the spatial-frequency covariance for the uplink $r_{SF}^{UL}$ with $r_{SF}^{UL} = \text{Vec}\{\Re\{R_{SF}^{DL}\}, \Im\{R_{SF}^{UL}\}\}$, such as in block 605 of FIG. 6A, for example. As an example, RD may be formed using a reversal of the process used to determine $r_{SF}^{UL} = \text{Vec}\{\Re\{R_{SF}^{UL}\}, \Im\{R_{SF}^{UL}\}\}$. In other words, given that $r_{SF}^{UL}$ is known, $R_{SF}^{DL}$ may be determined.

It is also possible to obtain solutions for general array configurations. If it is defined that $$\varphi_{m,m'}'(\theta) \triangleq k(\theta)^T u_m - k(\theta)^T u_{m'},$$

men $g_n^{UL}(\theta, \tau)$ as an entry of $$\text{vec}\left(\Re\left\{ca(\theta)a(\theta)^H e^{-j2\pi\Delta_{k_i}f_{sc}\tau}\right\}, \Im\left\{ca(\theta)a(\theta)^H e^{-j2\pi\Delta_{k_i}f_{sc}\tau}\right\}\right)$$

may be represented as $$g_n^{UL}(\theta, \tau) = \frac{1}{\sqrt{2\pi\tau_{DS}}} \cos\left(\frac{2\pi}{\lambda^{UL}}\varphi_{m,m'}'(\theta) + 2\pi\Delta_{k_i}f_{sc}\tau\right) \quad (28)$$

for the real term, and $$g_n^{UL}(\theta, \tau) = -\frac{1}{\sqrt{2\pi\tau_{DS}}} \sin\left(\frac{2\pi}{\lambda^{UL}}\varphi_{m,m'}'(\theta) + 2\pi\Delta_{k_i}f_{sc}\tau\right) \quad (29)$$

for the imaginary term.

So there is one-one mapping between n and four tuple {m, m', i, $I_{R/I}$} where $I_{R/I}$ indicates whether it is an entry corresponding to the real term or imaginary term. An explicit expression for the mapping is not defined, rather it is simply defined as n=M(m, m', i, $I_{R/I}$) for the purpose of general presentation. Also for any given finite $\tau_{DS}$, the normalization factor does not impact the results as it just scales every entry of G and Q matrices with the same value. However, as will be seen below, it is critical to obtain the asymptotic results when the case $\tau_{DS} \to \infty$ is considered.

Due to separation of the real and imaginary parts, the matrix G in Equation (24) can be expressed as $$G = \begin{bmatrix} G_{\Re\Re} & G_{\Re\Im} \\ G_{\Im\Re} & G_{\Im\Im} \end{bmatrix}. \quad (30)$$

The entries in $G_{\mathfrak{R}\mathfrak{R}}$ are expressible as $$[G_{\mathfrak{R}\mathfrak{R}}]_{n_1,n_2} = \langle g_{n_1}^{UL}, g_{n_2}^{UL}\rangle = \frac{1}{2\pi\tau_{DS}}\int_0^{\tau_{DS}}\int_{-\pi}^{\pi}[F_{\mathfrak{R}\mathfrak{R}}]_{n_1,n_2}(\theta,\tau)d\theta d\tau, \quad (31)$$

where $$[F_{\mathfrak{R}\mathfrak{R}}]_{n_1,n_2}(\theta,\tau) =$$
$$\cos\left(\frac{2\pi}{\lambda^{UL}}\varphi_{m_1,m_1'}(\theta)+2\pi\Delta_{k_{i_1}}f_{sc}\tau\right)\cos\left(\frac{2\pi}{\lambda^{UL}}\varphi_{m_2,m_2'}(\theta)+2\pi\Delta_{k_{i_2}}f_{sc}\tau\right) =$$
$$\frac{1}{2}\Big\{\cos(2\pi(\Delta_{k_{i_1}}-\Delta_{k_{i_2}})f_{sc}\tau)\cos\left(\frac{2\pi}{\lambda^{UL}}(\varphi_{m_1,m_1'}(\theta)-\varphi_{m_2,m_2'}(\theta))\right) -$$
$$\sin(2\pi(\Delta_{k_{i_1}}-\Delta_{k_{i_2}})f_{sc}\tau)\sin\left(\frac{2\pi}{\lambda^{UL}}(\varphi_{m_1,m_1'}(\theta)-\varphi_{m_2,m_2'}(\theta))\right) +$$
$$\cos(2\pi(\Delta_{k_{i_1}}+\Delta_{k_{i_2}})f_{sc}\tau)\cos\left(\frac{2\pi}{\lambda^{UL}}(\varphi_{m_1,m_1'}(\theta)+\varphi_{m_2,m_2'}(\theta))\right) -$$
$$\sin(2\pi(\Delta_{k_{i_1}}+\Delta_{k_{i_2}})f_{sc}\tau)\sin\left(\frac{2\pi}{\lambda^{UL}}(\varphi_{m_1,m_1'}(\theta)+\varphi_{m_2,m_2'}2(\theta))\right)\Big\}.$$

Therefore, the entries of $G_{\mathfrak{R}\mathfrak{R}}$ are expressible as $$[G_{\mathfrak{R}\mathfrak{R}}]_{n_1,n_2} = \frac{1}{2}\Big\{\operatorname{sinc}(2\pi(\Delta_{k_{i_1}}-\Delta_{k_{i_2}})f_{sc}\tau_{DS})F_{m_1,m_1',m_2,m_2'}^{c-}(\lambda^{UL}) + \quad (32)$$

$$\frac{1-\cos(2\pi(\Delta_{k_{i_1}}-\Delta_{k_{i_2}})f_{sc}\tau_{DS})}{2\pi(\Delta_{k_{i_1}}-\Delta_{k_{i_2}})f_{sc}\tau_{DS}}F_{m_1,m_1',m_2,m_2'}^{s-}(\lambda^{UL}) +$$

$$\operatorname{sinc}(2\pi(\Delta_{k_{i_1}}+\Delta_{k_{i_2}})f_{sc}\tau_{DS})F_{m_1,m_1',m_2,m_2'}^{c+}(\lambda^{UL}) +$$

$$\frac{1-\cos(2\pi(\Delta_{k_{i_1}}+\Delta_{k_{i_2}})f_{sc}\tau_{DS})}{2\pi(\Delta_{k_{i_1}}+\Delta_{k_{i_2}})f_{sc}\tau_{DS}}F_{m_1,m_1',m_2,m_2'}^{s+}(\lambda^{UL})\Big\},$$

where $$\mathcal{F}_{m_1,m_1',m_2,m_2'}^{c-}(\lambda) = \frac{1}{2\pi}\int_{-\pi}^{\pi}\cos\left(\frac{2\pi}{\lambda}(\varphi_{m_1,m_1'}(\theta)-\varphi_{m_2,m_2'}(\theta))\right)d\theta,$$

$$\mathcal{F}_{m_1,m_1',m_2,m_2'}^{s-}(\lambda) = \frac{1}{2\pi}\int_{-\pi}^{\pi}\sin\left(\frac{2\pi}{\lambda}(\varphi_{m_1,m_1'}(\theta)-\varphi_{m_2,m_2'}(\theta))\right)d\theta,$$

$$\mathcal{F}_{m_1,m_1',m_2,m_2'}^{c+}(\lambda) = \frac{1}{2\pi}\int_{-\pi}^{\pi}\cos\left(\frac{2\pi}{\lambda}(\varphi_{m_1,m_1'}(\theta)+\varphi_{m_2,m_2'}(\theta))\right)d\theta,$$

$$\mathcal{F}_{m_1,m_1',m_2,m_2'}^{s+}(\lambda) = \frac{1}{2\pi}\int_{-\pi}^{\pi}\sin\left(\frac{2\pi}{\lambda}(\varphi_{m_1,m_1'}(\theta)+\varphi_{m_2,m_2'}(\theta))\right)d\theta.$$

Similarly, $$[F_{\mathfrak{R}\mathfrak{I}}]_{n_1,n_2}(\theta,\tau) \stackrel{\Delta}{=} \quad (34)$$
$$-\cos\left(\frac{2\pi}{\lambda^{UL}}\varphi_{m_1,m_1'}(\theta)+2\pi\Delta_{k_{i_1}}f_{sc}\tau\right)\sin\left(\frac{2\pi}{\lambda^{UL}}\varphi_{m_2,m_2'}(\theta)+2\pi\Delta_{k_{i_2}}f_{sc}\tau\right)$$

$$[F_{\mathfrak{I}\mathfrak{R}}]_{n_1,n_2}(\theta,\tau) \stackrel{\Delta}{=} \quad (35)$$
$$-\sin\left(\frac{2\pi}{\lambda^{UL}}\varphi_{m_1,m_1'}(\theta)+2\pi\Delta_{k_{i_1}}f_{sc}\tau\right)\cos\left(\frac{2\pi}{\lambda^{UL}}\varphi_{m_2,m_2'}(\theta)+2\pi\Delta_{k_{i_2}}f_{sc}\tau\right)$$

$$[F_{\mathfrak{I}\mathfrak{I}}]_{n_1,n_2}(\theta,\tau) \stackrel{\Delta}{=} \quad (36)$$
$$\sin\left(\frac{2\pi}{\lambda^{UL}}\varphi_{m_1,m_1'}(\theta)+2\pi\Delta_{k_{i_1}}f_{sc}\tau\right)\sin\left(\frac{2\pi}{\lambda^{UL}}\varphi_{m_2,m_2'}(\theta)+2\pi\Delta_{k_{i_2}}f_{sc}\tau\right).$$

Then $$[G_{\mathfrak{R}\mathfrak{I}}]_{n_1,n_2} = \frac{1}{2\pi\tau_{DS}}\int_0^{\tau_{DS}}\int_{-\pi}^{\pi}[F_{\mathfrak{R}\mathfrak{I}}]_{n_1,n_2}(\theta,\tau)d\theta d\tau = \quad (37)$$

$$\frac{1}{2}\Big\{-\frac{1-\cos(2\pi(\Delta_{k_{i_1}}-\Delta_{k_{i_2}})f_{sc}\tau_{DS})}{2\pi(\Delta_{k_{i_1}}-\Delta_{k_{i_2}})f_{sc}\tau_{DS}}\mathcal{F}_{m_1,m_1',m_2,m_2'}^{c-}(\lambda^{UL}) +$$

$$\operatorname{sinc}(2\pi(\Sigma_{k_{i_1}}-\Delta_{k_{i_2}})f_{sc}\tau_{DS})\mathcal{F}_{m_1,m_1',m_2,m_2'}^{s-}(\lambda^{UL})$$

$$\frac{1-\cos(2\pi(\Delta_{k_{i_1}}+\Delta_{k_{i_2}})f_{sc}\tau_{DS})}{2\pi(\Delta_{k_{i_1}}+\Delta_{k_{i_2}})f_{sc}\tau_{DS}}\mathcal{F}_{m_1,m_1',m_2,m_2'}^{c+}(\lambda^{UL}) -$$

$$\operatorname{sinc}(2\pi(\Delta_{k_{i_1}}+\Delta_{k_{i_2}})f_{sc}\tau_{DS})\mathcal{F}_{m_1,m_1',m_2,m_2'}^{s+}(\lambda^{UL})\Big\},$$

$$[G_{\mathfrak{I}\mathfrak{R}}]_{n_1,n_2} = \frac{1}{2\pi\tau_{DS}}\int_0^{\tau_{DS}}\int_{-\pi}^{\pi}[F_{\mathfrak{I}\mathfrak{R}}]_{n_1,n_2}(\theta,\tau)d\theta d\tau =$$

$$\frac{1}{2}\Big\{\frac{1-\cos(2\pi(\Delta_{k_{i_1}}-\Delta_{k_{i_2}})f_{sc}\tau_{DS})}{2\pi(\Delta_{k_{i_1}}-\Delta_{k_{i_2}})f_{sc}\tau_{DS}}\mathcal{F}_{m_1,m_1',m_2,m_2'}^{c-}(\lambda^{UL}) - \operatorname{sinc}(2\pi(\Delta_{k_{i_1}}-\Delta_{k_{i_2}})f_{sc}\tau_{DS})\mathcal{F}_{m_1,m_1',m_2,m_2'}^{s-}(\lambda^{UL})\frac{1-\cos(2\pi(\Delta_{k_{i_1}}+\Delta_{k_{i_2}})f_{sc}\tau_{DS})}{2\pi(\Delta_{k_{i_1}}+\Delta_{k_{i_2}})f_{sc}\tau_{DS}}$$

$$\mathcal{F}_{m_1,m_1',m_2,m_2'}^{c+}(\lambda^{UL}) - \operatorname{sinc}(2\pi(\Delta_{k_{i_1}}+\Delta_{k_{i_2}})f_{sc}\tau_{DS})\mathcal{F}_{m_1,m_1',m_2,m_2'}^{s+}(\lambda^{UL})\Big\},$$

$$[G_{\mathfrak{I}\mathfrak{I}}]_{n_1,n_2} = \frac{1}{2\pi\tau_{DS}}\int_0^{\tau_{DS}}\int_{-\pi}^{\pi}[F_{\mathfrak{I}\mathfrak{I}}]_{n_1,n_2}(\theta,\tau)d\theta d\tau =$$

$$\frac{1}{2}\Big\{\operatorname{sinc}(2\pi(\Delta_{k_{i_1}}-\Delta_{k_{i_2}})f_{sc}\tau_{DS})\mathcal{F}_{m_1,m_1',m_2,m_2'}^{c-}(\lambda^{UL}) +$$

$$\frac{1-\cos(2\pi(\Delta_{k_{i_1}}-\Delta_{k_{i_2}})f_{sc}\tau_{DS})}{2\pi(\Delta_{k_{i_1}}-\Delta_{k_{i_2}})f_{sc}\tau_{DS}}\mathcal{F}_{m_1,m_1',m_2,m_2'}^{s-}(\lambda^{UL}) -$$

$$\operatorname{sinc}(2\pi(\Delta_{k_{i_1}}+\Delta_{k_{i_2}})f_{sc}\tau_{DS})\mathcal{F}_{m_1,m_1',m_2,m_2'}^{c+}(\lambda^{UL}) -$$

$$\frac{1-\cos(2\pi(\Delta_{k_{i_1}}+\Delta_{k_{i_2}})f_{sc}\tau_{DS})}{2\pi(\Delta_{k_{i_1}}+\Delta_{k_{i_2}})f_{sc}\tau_{DS}}\mathcal{F}_{m_1,m_1',m_2,m_2'}^{s+}(\lambda^{UL})\Big\}.$$

(33)

For some special entries when $$\Delta_{k_{i_1}} = \Delta_{k_{i_2}},$$

the following are valid $$\operatorname{sinc}(2\pi(\Delta_{k_{i_1}}-\Delta_{k_{i_2}})f_{sc}\tau_{DS}) = 1, \quad (38)$$

$$\frac{1-\cos(2\pi(\Delta_{k_{i_1}}-\Delta_{k_{i_2}})f_{sc}\tau_{DS})}{2\pi(\Delta_{k_{i_1}}-\Delta_{k_{i_2}})f_{sc}\tau_{DS}} = 0, \quad (39)$$

and when $$\Delta_{k_{i_1}} = \Delta_{k_{i_2}} = 0,$$

the following are valid $$\operatorname{sinc}(2\pi(\Delta_{k_{i_1}}+\Delta_{k_{i_2}})f_{sc}\tau_{DS}) = 1, \quad (40)$$

$$\frac{1-\cos(2\pi(\Delta_{k_{i_1}}+\Delta_{k_{i_2}})f_{sc}\tau_{DS})}{2\pi(\Delta_{k_{i_1}}+\Delta_{k_{i_2}})f_{sc}\tau_{DS}} = 0. \quad (41)$$

In order to obtain the conversion matrix Q, again due to separation of the real and imaginary components, the block matrix is rewritten as $$Q = \begin{bmatrix} Q_{\mathcal{RR}} & Q_{\mathcal{RJ}} \\ Q_{\mathcal{JR}} & Q_{\mathcal{JJ}} \end{bmatrix}. \quad (42)$$

The first entries in $Q_{\mathcal{RR}}$ are expressible as $$[Q_{\mathcal{RR}}]_{n_1,n_2} = \langle g_{n_1}^{UL}, g_{n_2}^{DL} \rangle = \frac{1}{2\pi\tau_{DS}} \int_0^{\tau_{DS}} \int_{-\pi}^{\pi} [\tilde{F}_{\mathcal{RR}}]_{n_1,n_2}(\theta,\tau) d\theta d\tau, \quad (43)$$

where $$[\tilde{F}_{\mathcal{RR}}]_{n_1,n_2}(\theta,\tau) =$$
$$\cos\left(\frac{2\pi}{\lambda^{UL}}\varphi_{m_1,m_1'}(\theta) + 2\pi\Delta_{k_{i_1}}f_{sc}\tau\right)\cos\left(\frac{2\pi}{\lambda^{DL}}\varphi_{m_2,m_2'}(\theta) + 2\pi\Delta_{k_{i_2}}f_{sc}\tau\right) =$$
$$\frac{1}{2}\left\{\cos(2\pi(\Delta_{k_{i_1}} - \Delta_{k_{i_2}})f_{sc}\tau)\cos\left(\frac{2\pi}{\lambda^{UL}}\varphi_{m_1,m_1'}(\theta) - \frac{2\pi}{\lambda^{DL}}\varphi_{m_2,m_2'}(\theta)\right) - \right.$$
$$\sin(2\pi(\Delta_{k_{i_1}} - \Delta_{k_{i_2}})f_{sc}\tau)\sin\left(\frac{2\pi}{\lambda^{UL}}\varphi_{m_1,m_1'}(\theta) - \frac{2\pi}{\lambda^{UL}}\varphi_{m_2,m_2'}(\theta)\right) +$$
$$\cos(2\pi(\Delta_{k_{i_1}} + \Delta_{k_{i_2}})f_{sc}\tau)\cos\left(\frac{2\pi}{\lambda^{UL}}\varphi_{m_1,m_1'}(\theta) + \frac{2\pi}{\lambda^{UL}}\varphi_{m_2,m_2'}(\theta)\right) -$$
$$\left.\sin(2\pi(\Delta_{k_{i_1}} + \Delta_{k_{i_2}})f_{sc}\tau)\sin\left(\frac{2\pi}{\lambda^{UL}}\varphi_{m_1,m_1'}(\theta) + \frac{2\pi}{\lambda^{UL}}\varphi_{m_2,m_2'}(\theta)\right)\right\}.$$

The entries in $Q_{\mathcal{RR}}$ are expressible as $$[Q_{\mathcal{RR}}]_{n_1,n_2} = \frac{1}{2}\left\{\mathrm{sinc}(2\pi(\Delta_{k_{i_1}} - \Delta_{k_{i_2}})f_{sc}\tau_{DS})Q_{m_1,m_1',m_2,m_2'}^{c-}(\lambda^{UL},\lambda^{DL}) + \right.$$
$$\frac{1-\cos(2\pi(\Delta_{k_{i_1}} - \Delta_{k_{i_2}})f_{sc}\tau_{DS})}{2\pi(\Delta_{k_{i_1}} - \Delta_{k_{i_2}})f_{sc}\tau_{DS}}Q_{m_1,m_1',m_2,m_2'}^{s-}(\lambda^{UL},\lambda^{DL}) +$$
$$\mathrm{sinc}(2\pi(\Delta_{k_{i_1}} + \Delta_{k_{i_2}})f_{sc}\tau_{DS})Q_{m_1,m_1',m_2,m_2'}^{c+}(\lambda^{UL},\lambda^{DL}) +$$
$$\left.\frac{1-\cos(2\pi(\Delta_{k_{i_1}} + \Delta_{k_{i_2}})f_{sc}\tau_{DS})}{2\pi(\Delta_{k_{i_1}} + \Delta_{k_{i_2}})f_{sc}\tau_{DS}}Q_{m_1,m_1',m_2,m_2'}^{s+}(\lambda^{UL},\lambda^{DL})\right\},$$

where $$Q_{m_1,m_1',m_2,m_2'}^{c-}(\lambda_1,\lambda_2) = \frac{1}{2\pi}\int_{-\pi}^{\pi}\cos\left(\frac{2\pi}{\lambda_1}\varphi_{m_1,m_1'}(\theta) - \frac{2\pi}{\lambda_2}\varphi_{m_2,m_2'}(\theta)\right)d\theta, \quad (45)$$

$$Q_{m_1,m_1',m_2,m_2'}^{s-}(\lambda_1,\lambda_2) = \frac{1}{2\pi}\int_{-\pi}^{\pi}\sin\left(\frac{2\pi}{\lambda_1}\varphi_{m_1,m_1'}(\theta) - \frac{2\pi}{\lambda_2}\varphi_{m_2,m_2'}(\theta)\right)d\theta,$$

$$Q_{m_1,m_1',m_2,m_2'}^{c+}(\lambda_1,\lambda_2) = \frac{1}{2\pi}\int_{-\pi}^{\pi}\cos\left(\frac{2\pi}{\lambda_1}\varphi_{m_1,m_1'}(\theta) + \frac{2\pi}{\lambda_2}\varphi_{m_2,m_2'}(\theta)\right)d\theta,$$

$$Q_{m_1,m_1',m_2,m_2'}^{s+}(\lambda_1,\lambda_2) = \frac{1}{2\pi}\int_{-\pi}^{\pi}\sin\left(\frac{2\pi}{\lambda_1}\varphi_{m_1,m_1'}(\theta) + \frac{2\pi}{\lambda_2}\varphi_{m_2,m_2'}(\theta)\right)d\theta.$$

The following are defined $$[\tilde{F}_{\mathcal{RJ}}]_{n_1,n_2}(\theta,\tau) = \quad (46)$$
$$-\cos\left(\frac{2\pi}{\lambda^{UL}}\varphi_{m_1,m_1'}(\theta) + 2\pi\Delta_{k_{i_1}}f_{sc}\tau\right)\sin\left(\frac{2\pi}{\lambda^{DL}}\varphi_{m_2,m_2'}(\theta) + 2\pi\Delta_{k_{i_2}}f_{sc}\tau\right)$$

$$[\tilde{F}_{21}]_{n_1,n_2}(\theta,\tau) = -\sin\left(\frac{2\pi}{\lambda^{UL}}\varphi_{m_1,m_1'}(\theta) + 2\pi\Delta_{k_{i_1}}f_{sc}\tau\right)$$
$$\cos\left(\frac{2\pi}{\lambda^{DL}}\varphi_{m_2,m_2'}(\theta) + 2\pi\Delta_{k_{i_2}}f_{sc}\tau\right)$$

$$[\tilde{F}_{\mathcal{JJ}}]_{n_1,n_2}(\theta,\tau) = \sin\left(\frac{2\pi}{\lambda^{UL}}\varphi_{m_1,m_1'}(\theta) + 2\pi\Delta_{k_{i_1}}f_{sc}\tau\right)$$
$$\sin\left(\frac{2\pi}{\lambda^{DL}}\varphi_{m_2,m_2'}(\theta) + 2\pi\Delta_{k_{i_2}}f_{sc}\tau\right).$$

Similarly, the other three subblock matrices of Q are expressible as $$[Q_{\mathcal{RJ}}]_{n_1,n_2} = \frac{1}{2\pi\tau_{DS}}\int_0^{\tau_{DS}}\int_{-\pi}^{\pi}[\tilde{F}_{\mathcal{RJ}}]_{n_1,n_2}(\theta,\tau)d\theta d\tau = \quad (47)$$
$$\frac{1}{2}\left\{-\frac{1-\cos(2\pi(\Delta_{k_{i_1}} - \Delta_{k_{i_2}})f_{sc}\tau_{DS})}{2\pi(\Delta_{k_{i_1}} - \Delta_{k_{i_2}})f_{sc}\tau_{DS}}Q_{m_1,m_1',m_2,m_2'}^{c-}(\lambda^{UL},\lambda^{DL}) + \right.$$
$$\mathrm{sinc}(2\pi(\Delta_{k_{i_1}} - \Delta_{k_{i_2}})f_{sc}\tau_{DS})Q_{m_1,m_1',m_2,m_2'}^{s-}(\lambda^{UL},\lambda^{DL}) +$$
$$\frac{1-\cos(2\pi(\Delta_{k_{i_1}} + \Delta_{k_{i_2}})f_{sc}\tau_{DS})}{2\pi(\Delta_{k_{i_1}} + \Delta_{k_{i_2}})f_{sc}\tau_{DS}}Q_{m_1,m_1',m_2,m_2'}^{c+}(\lambda^{UL},\lambda^{DL}) -$$
$$\left.\mathrm{sinc}(2\pi(\Delta_{k_{i_1}} + \Delta_{k_{i_2}})f_{sc}\tau_{DS})Q_{m_1,m_1',m_2,m_2'}^{s+}(\lambda^{UL},\lambda^{DL})\right\},$$

$$-\mathrm{sinc}(2\pi(\Delta_{k_{i_1}} + \Delta_{k_{i_2}})f_{sc}\tau_{DS})Q_{m_1,m_1',m_2,m_2'}^{s+}(\lambda^{UL},\lambda^{DL})\}, \quad (48)$$

$$[Q_{\mathcal{JR}}]_{n_1,n_2} = \frac{1}{2\pi\tau_{DS}}\int_0^{\tau_{DS}}\int_{-\pi}^{\pi}[\tilde{F}_{21}]_{n_1,n_2}(\theta,\tau)d\theta d\tau =$$
$$\frac{1}{2}\left\{\frac{1-\cos(2\pi(\Delta_{k_{i_1}} - \Delta_{k_{i_2}})f_{sc}\tau_{DS})}{2\pi(\Delta_{k_{i_1}} - \Delta_{k_{i_2}})f_{sc}\tau_{DS}}Q_{m_1,m_1',m_2,m_2'}^{c-}(\lambda^{UL},\lambda^{DL}) - \right.$$
$$\mathrm{sinc}(2\pi(\Delta_{k_{i_1}} - \Delta_{k_{i_2}})f_{sc}\tau_{DS})Q_{m_1,m_1',m_2,m_2'}^{s-}(\lambda^{UL},\lambda^{DL}) +$$
$$\frac{1-\cos(2\pi(\Delta_{k_{i_1}} + \Delta_{k_{i_2}})f_{sc}\tau_{DS})}{2\pi(\Delta_{k_{i_1}} + \Delta_{k_{i_2}})f_{sc}\tau_{DS}}Q_{m_1,m_1',m_2,m_2'}^{c+}(\lambda^{UL},\lambda^{DL}) -$$
$$\left.\mathrm{sinc}(2\pi(\Delta_{k_{i_1}} + \Delta_{k_{i_2}})f_{sc}\tau_{DS})Q_{m_1,m_1',m_2,m_2'}^{s+}(\lambda^{UL},\lambda^{DL})\right\},$$

$$[Q_{\mathcal{JJ}}]_{n_1,n_2} = \frac{1}{2\pi\tau_{DS}}\int_0^{\tau_{DS}}\int_{-\pi}^{\pi}[\tilde{F}_{\mathcal{JJ}}]_{n_1,n_2}(\theta,\tau)d\theta d\tau = \quad (49)$$
$$\frac{1}{2}\left\{\mathrm{sinc}(2\pi(\Delta_{k_{i_1}} - \Delta_{k_{i_2}})f_{sc}\tau_{DS})Q_{m_1,m_1',m_2,m_2'}^{c-}(\lambda^{UL},\lambda^{DL}) + \right.$$
$$\frac{1-\cos(2\pi(\Delta_{k_{i_1}} - \Delta_{k_{i_2}})f_{sc}\tau_{DS})}{2\pi(\Delta_{k_{i_1}} + \Delta_{k_{i_2}})f_{sc}\tau_{DS}}Q_{m_1,m_1',m_2,m_2'}^{s-}(\lambda^{UL},\lambda^{DL}) -$$
$$\mathrm{sinc}(2\pi(\Delta_{k_{i_1}} + \Delta_{k_{i_2}})f_{sc}\tau_{DS})Q_{m_1,m_1',m_2,m_2'}^{c+}(\lambda^{UL},\lambda^{DL}) -$$
$$\left.\frac{1-\cos(2\pi(\Delta_{k_{i_1}} + \Delta_{k_{i_2}})f_{sc}\tau_{DS})}{2\pi(\Delta_{k_{i_1}} + \Delta_{k_{i_2}})f_{sc}\tau_{DS}}Q_{m_1,m_1',m_2,m_2'}^{s+}(\lambda^{UL},\lambda^{DL})\right\}.$$

In the general case, the largest delay spread may go to infinity, i.e., $\tau_{DS}\to\infty$. Because the function $g_n(\theta,\tau)$ is normalized with $\tau_{DS}$, it is now possible to take limit of $\tau_{DS}\to\infty$ on the results obtained above. The asymptotic results for the following four terms, together with above special cases, are expressible as $$\lim_{\tau_{DS}\to+\infty}\mathrm{sinc}(2\pi(\Delta_{k_{i_1}} - \Delta_{k_{i_2}})f_{sc}\tau_{DS}) = \begin{cases} 1, & \Delta_{k_{i_1}} = \Delta_{k_{i_2}}; \\ 0, & \Delta_{k_{i_1}} \neq \Delta_{k_{i_2}} \end{cases}, \quad (50)$$

$$\lim_{\tau_{DS}\to+\infty}\mathrm{sinc}(2\pi(\Delta_{k_{i_1}} + \Delta_{k_{i_2}})f_{sc}\tau_{DS}) = \begin{cases} 1, & \Delta_{k_{i_1}} = \Delta_{k_{i_2}} = 0; \\ 0, & \text{otherwise} \end{cases}, \quad (51)$$

$$\lim_{\tau_{DS}\to+\infty}\frac{1-\cos(2\pi(\Delta_{k_{i_1}} - \Delta_{k_{i_2}})f_{sc}\tau_{DS})}{2\pi(\Delta_{k_{i_1}} - \Delta_{k_{i_2}})f_{sc}\tau_{DS}} = 0, \quad (52)$$

$$\lim_{\tau_{DS}\to+\infty}\frac{1-\cos(2\pi(\Delta_{k_{i_1}} + \Delta_{k_{i_2}})f_{sc}\tau_{DS})}{2\pi(\Delta_{k_{i_1}} + \Delta_{k_{i_2}})f_{sc}\tau_{DS}} = 0. \quad (53)$$

Then for the G matrix, when $$\Delta_{k_{i_1}} \neq \Delta_{k_{i_2}},$$

the following is known $$[G_{\Re\Re}]_{n_1,n_2} = [G_{\Re\Im}]_{n_1,n_2} = [G_{\Im\Re}]_{n_1,n_2} = [G_{\Im\Im}]_{n_1,n_2} = 0. \quad (54)$$

When $$\Delta_{k_{i_1}} = \Delta_{k_{i_2}},$$

the following is known $$[G_{\Re\Re}]_{n_1,n_2} = \begin{cases} \frac{1}{2}\mathcal{F}^{c-}_{m_1,m'_1,m_2,m'_2}(\lambda^{UL}) + \frac{1}{2}\mathcal{F}^{c+}_{m_1,m'_1,m_2,m'_2}(\lambda^{UL}), & \Delta_{k_{i_1}} = \Delta_{k_{i_2}} = 0, \\ \frac{1}{2}\mathcal{F}^{c-}_{m_1,m'_1,m_2,m'_2}(\lambda^{UL}), & \Delta_{k_{i_1}} = \Delta_{k_{i_2}} \neq 0 \end{cases} \quad (55)$$

$$[G_{\Re\Im}]_{n_1,n_2} = \begin{cases} \frac{1}{2}\mathcal{F}^{s-}_{m_1,m'_1,m_2,m'_2}(\lambda^{UL}) - \frac{1}{2}\mathcal{F}^{s+}_{m_1,m'_1,m_2,m'_2}(\lambda^{UL}), & \Delta_{k_{i_1}} = \Delta_{k_{i_2}} = 0, \\ \frac{1}{2}\mathcal{F}^{s-}_{m_1,m'_1,m_2,m'_2}(\lambda^{UL}), & \Delta_{k_{i_1}} = \Delta_{k_{i_2}} \neq 0 \end{cases} \quad (56)$$

$$[G_{\Im\Re}]_{n_1,n_2} = \begin{cases} -\frac{1}{2}\mathcal{F}^{s-}_{m_1,m'_1,m_2,m'_2}(\lambda^{UL}) + \frac{1}{2}\mathcal{F}^{s+}_{m_1,m'_1,m_2,m'_2}(\lambda^{UL}), & \Delta_{k_{i_1}} = \Delta_{k_{i_2}} = 0, \\ -\frac{1}{2}\mathcal{F}^{s-}_{m_1,m'_1,m_2,m'_2}(\lambda^{UL}), & \Delta_{k_{i_1}} = \Delta_{k_{i_2}} \neq 0 \end{cases} \quad (57)$$

$$[G_{\Im\Im}]_{n_1,n_2} = \begin{cases} \frac{1}{2}\mathcal{F}^{c-}_{m_1,m'_1,m_2,m'_2}(\lambda^{UL}) - \frac{1}{2}\mathcal{F}^{c+}_{m_1,m'_1,m_2,m'_2}(\lambda^{UL}), & \Delta_{k_{i_1}} = \Delta_{k_{i_2}} = 0, \\ \frac{1}{2}\mathcal{F}^{c-}_{m_1,m'_1,m_2,m'_2}(\lambda^{UL}), & \Delta_{k_{i_1}} = \Delta_{k_{i_2}} \neq 0 \end{cases} \quad (58)$$

From Equation (58), for cases $$\Delta_{k_{i_1}} = \Delta_{k_{i_2}} \neq 0,$$

the entries of submatrices $[G_{\Re\Re}]_{n_1,n_2}$ are the exact same as those of $[G_{\Im\Im}]_{n_1,n_2}$.

Similarly for the conversion matrix Q, when $$\Delta_{k_{i_1}} \neq \Delta_{k_{i_2}},$$

the following is known $$[Q_{\Re\Re}]_{n_1,n_2} = [Q_{\Re\Im}]_{n_1,n_2} = [Q_{\Im\Re}]_{n_1,n_2} = [Q_{\Im\Im}]_{n_1,n_2} = 0. \quad (59)$$

When $$\Delta_{k_{i_1}} = \Delta_{k_{i_2}},$$

the following is known $$[Q_{\Re\Re}]_{n_1,n_2} = \begin{cases} \frac{1}{2}\mathcal{Q}^{c-}_{m_1,m'_1,m_2,m'_2}(\lambda^{UL},\lambda^{DL}) + \\ \frac{1}{2}\mathcal{Q}^{c+}_{m_1,m'_1,m_2,m'_2}(\lambda^{UL},\lambda^{DL}), & \Delta_{k_{i_1}} = \Delta_{k_{i_2}} = 0, \\ \frac{1}{2}\mathcal{Q}^{c-}_{m_1,m'_1,m_2,m'_2}(\lambda^{UL},\lambda^{DL}), & \Delta_{k_{i_1}} = \Delta_{k_{i_2}} \neq 0 \end{cases} \quad (60)$$

$$[Q_{\Re\Im}]_{n_1,n_2} = \begin{cases} \frac{1}{2}\mathcal{Q}^{s-}_{m_1,m'_1,m_2,m'_2}(\lambda^{UL},\lambda^{DL}) - \\ \frac{1}{2}\mathcal{Q}^{s+}_{m_1,m'_1,m_2,m'_2}(\lambda^{UL},\lambda^{DL}), & \Delta_{k_{i_1}} = \Delta_{k_{i_2}} = 0, \\ \frac{1}{2}\mathcal{Q}^{s-}_{m_1,m'_1,m_2,m'_2}(\lambda^{UL},\lambda^{DL}), & \Delta_{k_{i_1}} = \Delta_{k_{i_2}} \neq 0 \end{cases} \quad (61)$$

$$[Q_{\Im\Re}]_{n_1,n_2} = \begin{cases} -\frac{1}{2}\mathcal{Q}^{s-}_{m_1,m'_1,m_2,m'_2}(\lambda^{UL},\lambda^{DL}) + \\ \frac{1}{2}\mathcal{Q}^{s+}_{m_1,m'_1,m_2,m'_2}(\lambda^{UL},\lambda^{DL}), & \Delta_{k_{i_1}} = \Delta_{k_{i_2}} = 0, \\ -\frac{1}{2}\mathcal{Q}^{s-}_{m_1,m'_1,m_2,m'_2}(\lambda^{UL},\lambda^{DL}), & \Delta_{k_{i_1}} = \Delta_{k_{i_2}} \neq 0 \end{cases} \quad (62)$$

$$[Q_{\Im\Im}]_{n_1,n_2} = \begin{cases} \frac{1}{2}\mathcal{Q}^{c-}_{m_1,m'_1,m_2,m'_2}(\lambda^{UL},\lambda^{DL}) - \\ \frac{1}{2}\mathcal{Q}^{c+}_{m_1,m'_1,m_2,m'_2}(\lambda^{UL},\lambda^{DL}), & \Delta_{k_{i_1}} = \Delta_{k_{i_2}} = 0, \\ \frac{1}{2}\mathcal{Q}^{c-}_{m_1,m'_1,m_2,m'_2}(\lambda^{UL},\lambda^{DL}), & \Delta_{k_{i_1}} = \Delta_{k_{i_2}} \neq 0 \end{cases} \quad (63)$$

From Equations (54) and (59), it is seen that the off-diagonal submatrices in the estimation and conversion matrices are all zero now. The advantage of this result is that the power angle delay spectrum can be estimated independently for each frequency lag. For example for $$\Delta_{k_{i_1}} = \Delta_{k_{i_2}} = 0,$$

number delay is exactly the same as the estimated power angle delay as the delay information is absent in $R_0^{UL}$, with $\Delta_{k_i}=0$. As the dimension increases, the computation complexity increases exponentially. With the frequency lag independent estimation and conversion in the asymptotic results, the complexity increases only linearly on the frequency lags for HiDi spatial-frequency covariance. The complexity is then very low for the high dimensional data processing. However, because the estimation and conversion are independent over different frequency lags, the estimation of $$R_{\Delta_{k_i}}$$

on one $\Delta_{k_i}$ does not help the estimation on the other frequency.

Figure 7A:
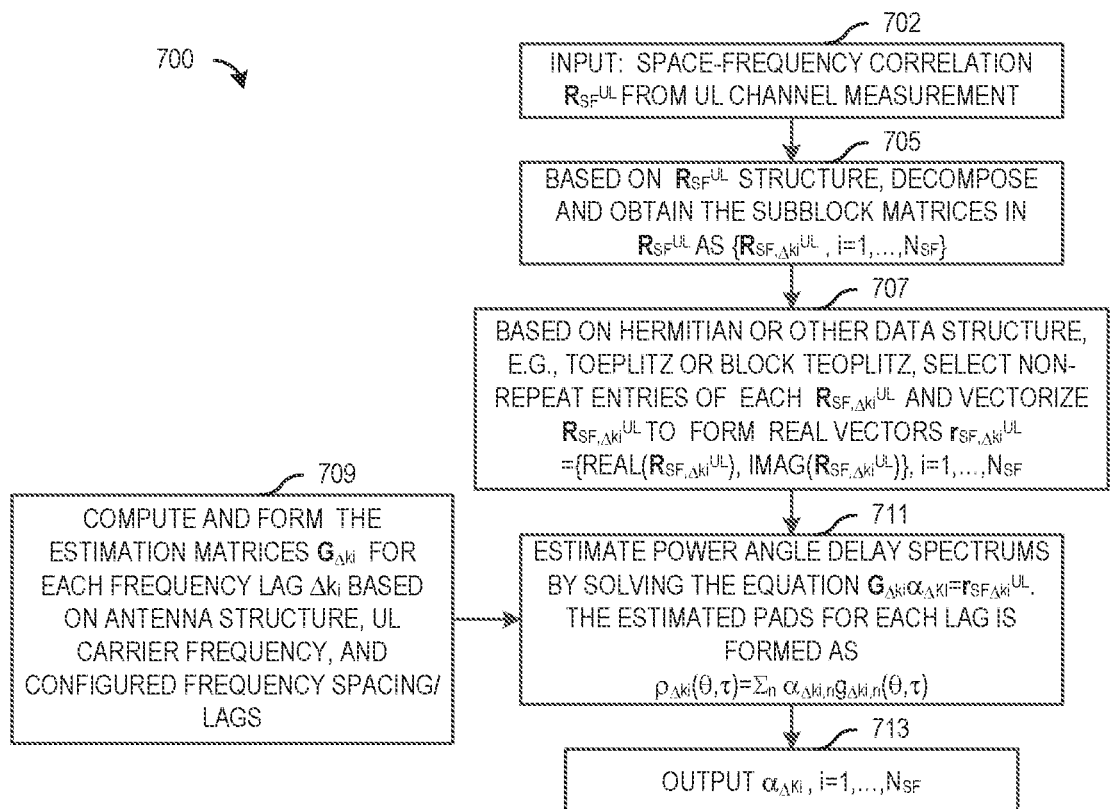
FIG. 7A illustrates a flow diagram of example operations occurring in a device estimating the PADS for the uplink with asymptotic solutions according to example embodiments presented herein.

FIG. 7A illustrates a flow diagram of example operations 700 occurring in a device estimating the PADS for the uplink with asymptotic solutions. Operations 700 may be indicative of operations occurring in a device as the device estimates the PADS for the uplink with asymptotic solutions. Based on the asymptotic solutions, the estimation PADS can be performed independently for each frequency lag with the covariance submatrices $R_{\Delta k_i}^{UL}$ in $R_{SF}^{UL}$.

operations 700 may be an example implementation of block 507 of FIG. 5. Although the discussion focuses on uplink and downlink, the example embodiments are operable for any two frequency bands. In such a situation, the uplink would be a first frequency band and the downlink would be a second frequency band.

Input to operations 700 may include the spatial-frequency covariance $R_{SF}^{UL}$, which may be determined in accordance with measurements of the uplink (block 702). Operations 700 begin with the device obtaining the subblock matrices of the spatial-frequency covariance $R_{SF}^{UL}$ (block 705). The device may decompose the spatial-frequency covariance RD to obtain the subblock matrices, which are denoted $R_{SF,\Delta ki}^{UL}$ for example. The device selects non-repeating entries of $R_{SF,\Delta ki}^{UL}$ and vectorizing $R_{SF,\Delta ki}^{UL}$ to form real vectors $r_{SF,\Delta ki}^{UL}$ (block 707). The selection may be based on hermitian or other data structure, such as Toeplitz or block Teoplitz structures. As an example, the real vectors $r_{SF,\Delta ki}^{UL}$ is expressible as $$r_{SF,\Delta ki}^{UL} = \{\Re\{\{R_{SF,\Delta ki}^{UL}\}, \Im\{R_{SF,\Delta ki}^{UL}\}\},$$
$$i=1, \ldots, N_{SF}.$$

The device forms an estimation matrices $G_{\Delta ki}$ (block 709). The estimation matrices $G_{\Delta ki}$ may be formed for each frequency lag and may be formed in accordance with parameters of the communication system, including the antenna structure (such as aperture, spacing, polarization, etc.), carrier frequency of the uplink, configured frequency spacings or lags, and so on). As an example, estimation matrices $G_{\Delta ki}$ may be formed as shown in Equation (30).

The device estimates the PADS (block 711). The estimation of the PADS may be performed in accordance with the real vectors $r_{SF,\Delta ki}^{UL}$ and the estimation matrices $G_{\Delta ki}$, and may include solving the equation $G_{\Delta k_i}\alpha_{\Delta ki} = r_{SF,\Delta k_i}^{UL}$ and obtain the PADS in a form of equation $\hat{p}_{\Delta ki}(\theta, \tau) = \Sigma_n \alpha_{\Delta ki,n} g_{\Delta ki,n}(\theta, \tau)$, for example. The device outputs the estimation outputs $\alpha_{\Delta ki} = 1, \ldots, N_{SF}$ (block 713). The device outputs the weights $\alpha_{\Delta ki}$ of the estimated PADS, for example.

Figure 7B:
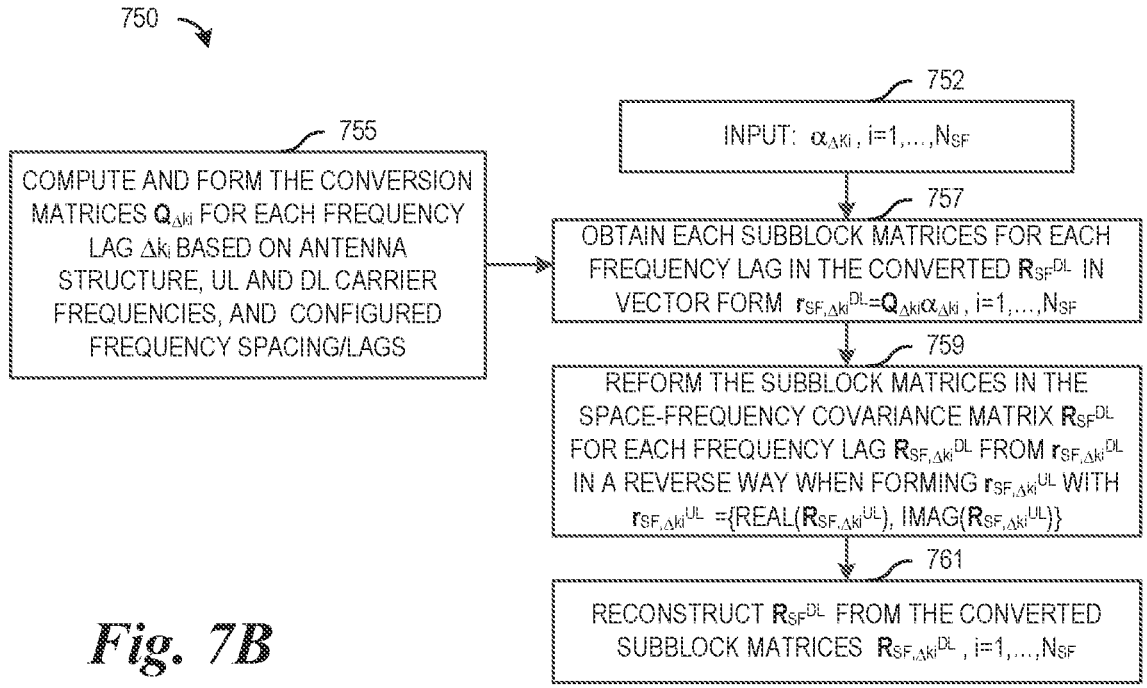
FIG. 7B illustrates a flow diagram of example operations occurring in a device converting the spatial-frequency covariance for the uplink $R_{SF}^{UL}$ to the spatial-frequency covariance for the downlink $R_{SF}^{DL}$, with asymptotic solutions according to example embodiments presented herein.

FIG. 7B illustrates a flow diagram of example operations 750 occurring in a device converting the spatial-frequency covariance for the uplink $R_{SF}^{UL}$ to the spatial-frequency covariance for the downlink $R_{SF}^{DL}$, with asymptotic solutions. Based on the asymptotic solutions, the frequency domain conversion can be performed independently for each frequency lag to obtain the covariance submatrices $R_{\Delta k_i}^{DL}$ in $R_{SL}^{DL}$.

Operations 750 may be indicative of operations occurring in a device as the device converts the spatial-frequency covariance for the uplink $R_{SF}^{UL}$ to the spatial-frequency covariance for the downlink $R_{SF}^{DL}$, with asymptotic solutions. Operations 750 may be an example implementation of blocks 509 and 511 of FIG. 5. Although the discussion focuses on uplink and downlink, the example embodiments are operable for any two frequency bands. In such a situation, the uplink would be a first frequency band and the downlink would be a second frequency band.

Input to operations 750 may include the estimation outputs $\alpha_{\Delta ki} = 1, \ldots, N_{SF}$, such as produced by a device performing block 713 of FIG. 7A (block 752). Operations 750 begin with the device forming conversion matrices $Q_{\Delta ki}$ (block 755). The conversion matrices may be formed for each frequency lag in accordance with parameters of the communication system, including the antenna structure (such as aperture, spacing, polarization, etc.), carrier frequency of the uplink and the downlink, configured frequency spacings or lags, and so on). As an example, the conversion matrices $Q_{\Delta ki}$ may be formed as shown in Equation (42) and Equations (60)-(63).

The device obtains the subblock matrices of the vectorized form of the spatial-frequency covariance for the downlink $r_{SF,\Delta ki}^{DL}$ (block 757). The vectorized form of the spatial-frequency covariance being obtained by multiplying the estimation outputs $\alpha_{\Delta ki}$ (provided as input to operations 750) and the conversion matrices $Q_{\Delta ki}$ formed in block 755, and may be expressible as $r_{SF,\Delta ki}^{DL} = Q_{\Delta ki}\alpha_{\Delta ki}$ for example. The device reforms the subblock matrices of the spatial-frequency covariance matrix for each frequency lag $R_{SF,\Delta ki}^{DL}$ (block 759). The $R_{SF,\Delta ki}^{DL}$ may be reformed from the vectorized form of the spatial-frequency covariance for the downlink $r_{SF,\Delta ki}^{DL}$. The $R_{SF,\Delta ki}^{DL}$ may be formed in a reverse manner from forming the spatial-frequency covariance for the uplink $r_{SF}^{DL}$ with $r_{SF,\Delta ki}^{UL} = \{\Re\{\{R_{SF,\Delta ki}^{UL}\}, \Im\{R_{SF,\Delta ki}^{UL}\}\}$, such as in block 707 of FIG. 7A, for example. The device reconstructs the spatial-frequency covariance in the downlink (block 761). The spatial-frequency covariance in the downlink $R_{SF}^{DL}$ may be reconstructed from the converted subblock matrices $R_{SF,\Delta ki}^{DL}$, $i=1, \ldots, N_{SF}$, for example.

According to an example embodiment, conversions of spatial-frequency covariance for multi-panel antenna arrays are provided. In addition to the conversion in the frequency domain (i.e., estimate the spatial-frequency covariance in one carrier frequency and convert the spatial-frequency covariance to another carrier frequency), the example embodiments presented herein are operable for conversions in the spatial domain. In a first embodiment, two antenna panels serve different frequency bands. In such an embodiment, the related antenna locations in a first antenna panel may not be the same as the antenna locations in a second antenna panel.

Figures 8A, 8B:
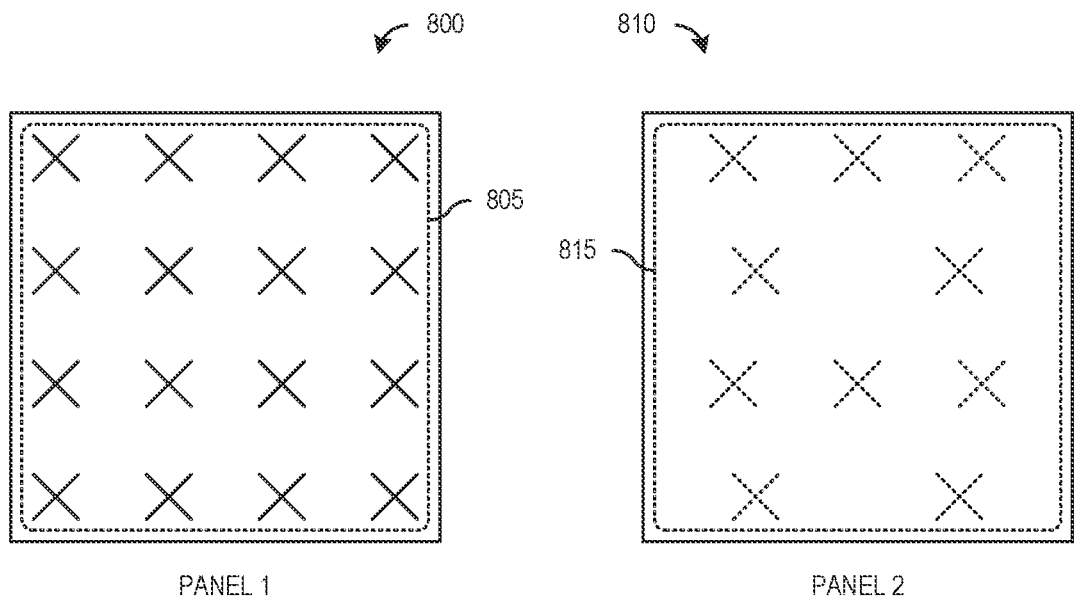
FIGS. 8A and 8B illustrate antenna panels with the antenna panels serving different frequency bands according to example embodiments presented herein.
Figure 8C:
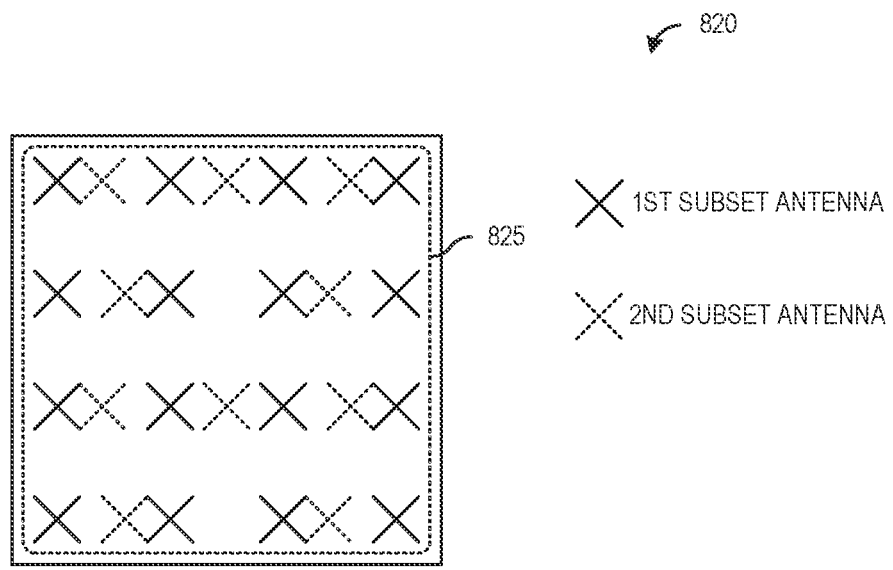
FIG. 8C illustrate a third antenna panel serving two different frequency bands according to example embodiments presented herein.

FIGS. 8A and 8B illustrate antenna panels with the antenna panels serving different frequency bands. A first antenna panel 800 (shown in FIG. 8A) includes antennas 805 that serve a first frequency band and a second antenna panel 810 (shown in FIG. 8B) includes antennas 815 that serve a second frequency band. First antenna panel 800 and second antenna panel 810 have different antenna placements. FIG. 8C illustrate a third antenna panel 820 serving two different frequency bands. Third antenna panel 820 includes a plurality of antennas 825. Plurality of antennas 825 comprise a first subset of antennas (shown as solid X's) and a second subset of antennas (shown as dashed X's), where the first subset of antennas serves a third frequency band and the second subset of antennas serves a fourth frequency band.

Figure 9A:
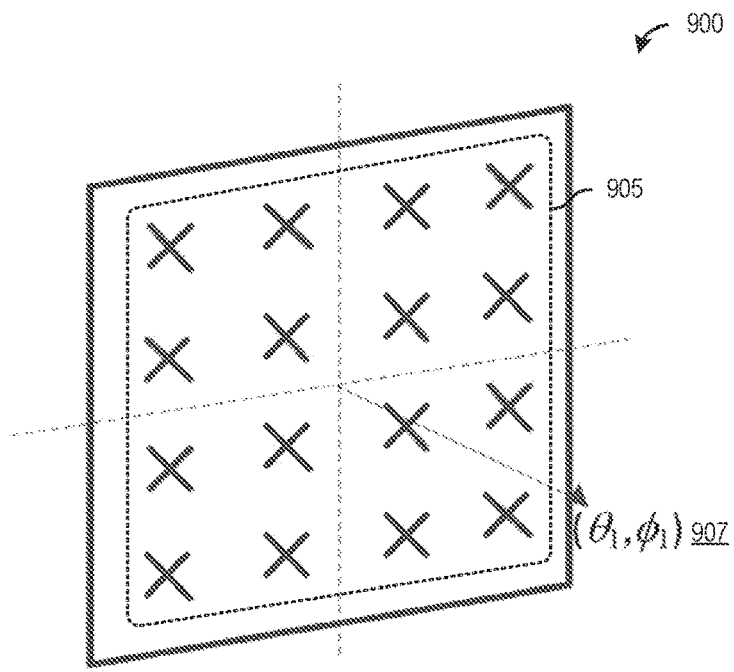
FIGS. 9A and 9B illustrate antenna panels with different steering directions according to example embodiments presented herein.
Figure 9B:
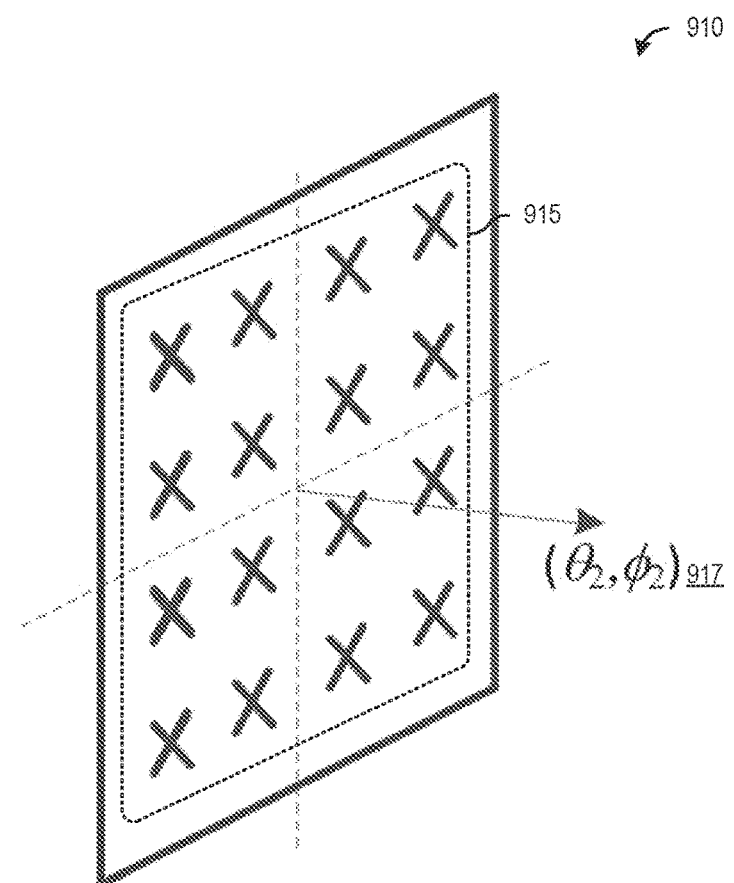

In the second scenario, the two antenna panels have different steering directions, i.e., facing towards the different angles. FIGS. 9A and 9B illustrate antenna panels with different steering directions. A first antenna panel 900 (shown in FIG. 9A) has antennas 905 serving a first steering direction $(\theta_1, \phi_1)$ 907, and a second antenna panel 910 (shown in FIG. 9B) antennas 915 serving a second steering direction $(\theta_2, \phi_2)$ 917.

For the discussion of either scenario, it is assumed that the far field assumption still holds for both panels so that each anenna array experiences the same physical power angle delay channel spectrum, with the difference being on the antenna array response.

In the scenario with multiple antenna arrays with different antenna locations (as depicted in FIGS. 8A-8C), the estimation of the PADS for one panel is the same as discussed previously. A difference in the process lies with the conversion. The frequency conversion and the spatial conversion are discussed together.

Figure 10:
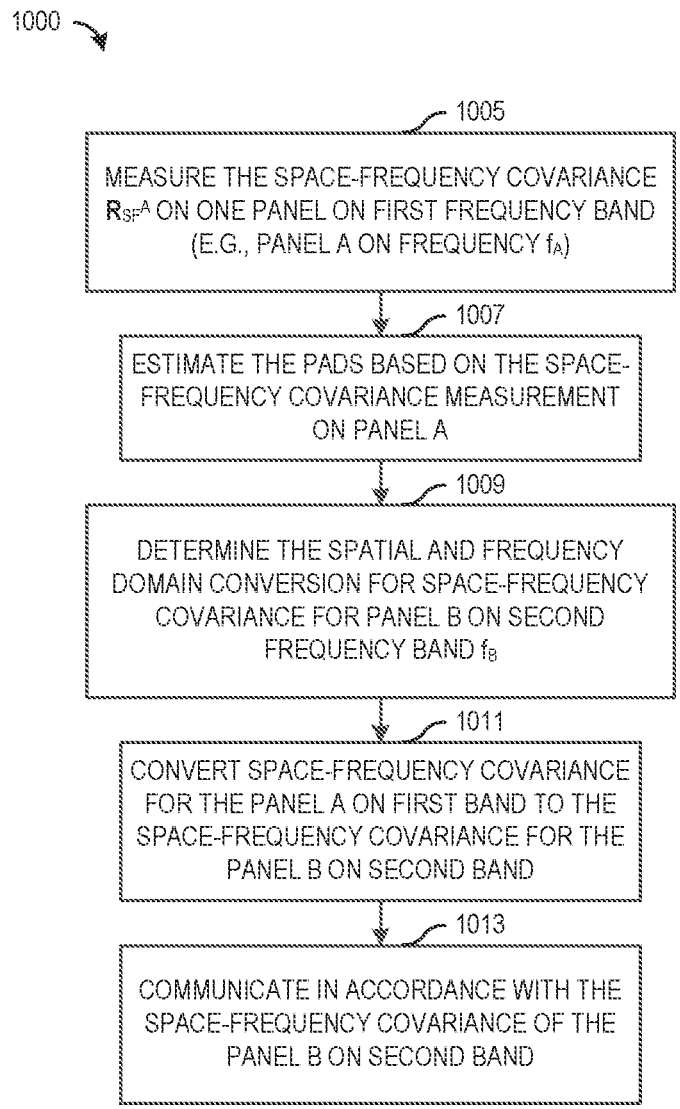
FIG. 10 illustrates a flow diagram of example operations occurring in a device converting spatial-frequency covariance where the device has two antenna panels serving different frequency bands according to example embodiments presented herein.

FIG. 10 illustrates a flow diagram of example operations moo occurring in a device converting spatial-frequency covariance where the device has two antenna panels serving different frequency bands. Operations moo may be indicative of operations occurring in a device (such as an access node, a UE, or a dedicated device configured to convert spatial-frequency covariance) as the device converts spatial-frequency covariance, where the device has two antenna panels serving different frequency bands. Although the discussion focuses on two antenna panels, the example embodiments are operable in a situation were the device has an antenna array with two subsets of antenna elements, with each subset serving a different frequency band. Therefore, the discussion of antenna panels should not be construed as being limiting to the scope of the example embodiments.

Operations moo begin with the device obtaining a spatial-frequency covariance of a first antenna panel, e.g., antenna panel A, $R_{SF}^A$ (block 1005). The device may make channel measurements and generate the spatial-frequency covariance based on transmissions occurring in a first frequency band. As an example, the device may include an implementation of process 300 of FIG. 3 to generate spatial-frequency covariance. Alternatively, the device may receive channel measurements or frequency domain channel estimates from a communicating device and the device generates the spatial-frequency covariance based on the channel measurements or the frequency domain channel estimates. As an example, the device may include an implementation of process 300 of FIG. 3 to generate spatial-frequency covariance from the received channel measurements or the frequency domain channel estimates.

The device estimates the PADS for the antenna panel A in the first frequency band (block 1007). The estimated PADS for the antenna panel A may be determined in accordance with the spatial-frequency covariance of the first antenna panel A in the first frequency band. In an embodiment, a technique based on a projection onto the Hilbert space is utilized to estimate the PADS. As an example the device may include an implementation of process 600 in FIG. 6A to estimate PADS based on whole $R_{SF}^A$, or an implementation of process 650 in FIG. 6B to estimate PADS for each frequency lag with the subblock matrices in $R_{SF,\Delta k_i}^A$ in $R_{SF}^A$ for each frequency lag.

The device determines a domain conversion for the spatial-frequency covariance (block 1009). The domain conversion converts the space and frequency domains of the spatial-frequency covariance of the first antenna panel A in the first frequency domain to spatial-frequency covariance of a second antenna panel B in a second frequency domain. In addition to determining the domain conversion, the device may also determine if single domain conversion or joint domain conversion is being performed. As an example, single domain conversion involves only spatial domain conversion, while joint domain conversion involves both spatial and frequency domain conversion. The device converts the spatial-frequency covariance of the first antenna panel A in the first frequency band to spaital-frequency covariance of the second antenna panel B in the second frequency band (block mu). The device may convert the spatial-frequency covariance of the first antenna panel A in the first frequency band to the spatial-frequency covariance of the second antenna panel B in the second frequency band by reforming the spatial-frequency covariance of the second antenna panel B in the second frequency band from the vectorized spatial-frequency covariance of the first antenna panel A in the first frequency band. As an example, the reforming of the spatial-frequency covariance of the second antenna panel B in the second frequency band may proceed in a manner that is in reverse of the way that the vectorized spatial-frequency covariance of the first antenna panel A in the first frequency band is formed. The device communicates in accordance with the spatial-frequency covariance of the second antenna panel B in the second frequency band (block 1013). As an example, the device uses the spatial-frequency covariance of the second antenna panel B in the second frequency band to perform training and facilitate downlink transmissions to other devices.

Figure 11A:
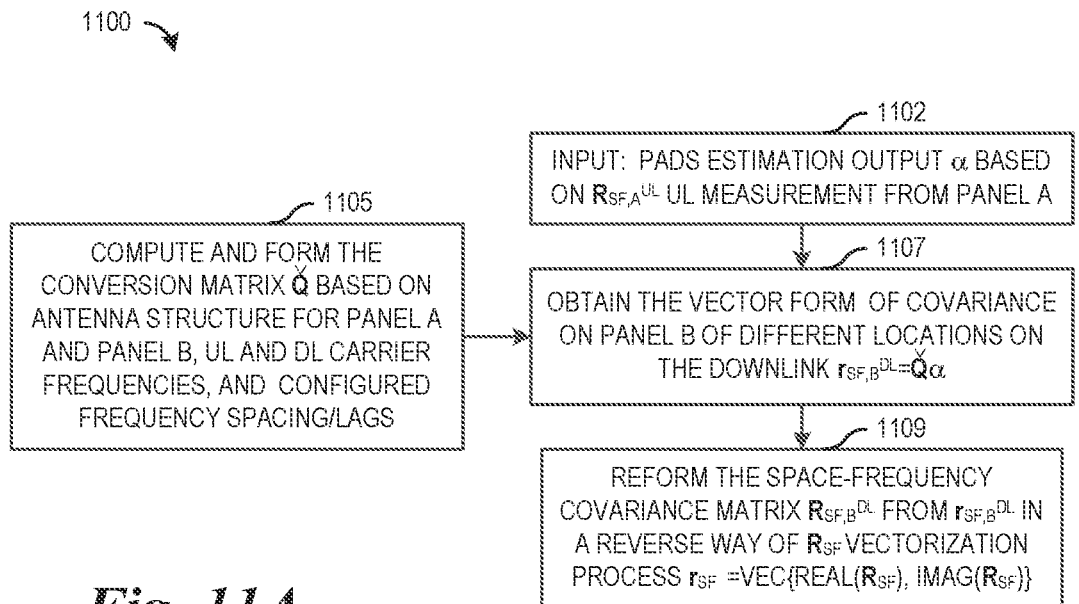
FIG. 11A illustrates a flow diagram of example operations occurring in a device converting spatial-frequency covariance in the spatial and frequency domains for two antenna panels with different locations according to example embodiments presented herein.

FIG. 11A illustrates a flow diagram of example operations 1100 occurring in a device converting spatial-frequency covariance in the spatial and frequency domains for two antenna panels at different locations. Operations 1100 may be indicative of operations occurring in a device (such as an access node, a UE, or a dedicated device configured to convert spatial-frequency covariance) as the device converts spatial-frequency covariance, where the device has two antenna panels located at different locations. Operations 1100 may be also indicative of operations occurring in two devices as a processor in central unit that connects the two devices or a processor in one device that connect the other device. Although the discussion focuses on two antenna panels, the example embodiments are operable in a situation were the device has an antenna array with two subsets of antenna elements, with each subset serving a different frequency band. Therefore, the discussion of antenna panels should not be construed as being limiting to the scope of the example embodiments.

Input to operations 1100 may include the PADS estimation output α for the first antenna panel A, where the PADS estimation output may be based on the $R_{SF,A}^{UL}$, from measurements made on the first antenna panel A in the first frequency band (block 1102). Operations 1100 begin with the device forming a conversion matrix $\tilde{Q}$ (block 1105). The conversion matrix may be formed in accordance with the antenna structure of the first antenna panel A and a second antenna panel B (such as aperture, spacing, polarization, antenna element spacing, etc.), carrier frequencies of the first antenna band and the second antenna band, configured frequency spacings or lags, and so on).

The device obtains the vectorized form of the spatial-frequency covariance of the second antenna panel B in the second frequency band $r_{SF,B}^{UL}$ (block 1107). The vectorized form of the spatial-frequency covariance being obtained by multiplying the PADS estimation output α (provided as input to operations 1100) and the conversion matrix $\tilde{Q}$ formed in block 1105, and may be expressible as $r_{SF,B}^{DL} = \tilde{Q} \alpha$, for example. The device reforms the spatial-frequency covariance matrix $R_{SF,B}^{DL}$ (block 1109). The $R_{SF,B}^{DL}$ may be reformed from the vectorized form of the spatial-frequency covariance of the second antenna panel B in the second frequency band $r_{SF,B}^{DL}$. The $r_{SF,B}^{DL}$ may be formed in a reverse manner from forming the spatial-frequency covariance for the first antenna panel A in the first frequency band $r_{SF,A}^{UL}$ with $r_{SF,A}^{UL}=\text{Vec}\{\Re\{R_{SF,A}^{UL}\}, \Im\{R_{SF,A}^{UL}\}\}$, for example.

Figure 11B:
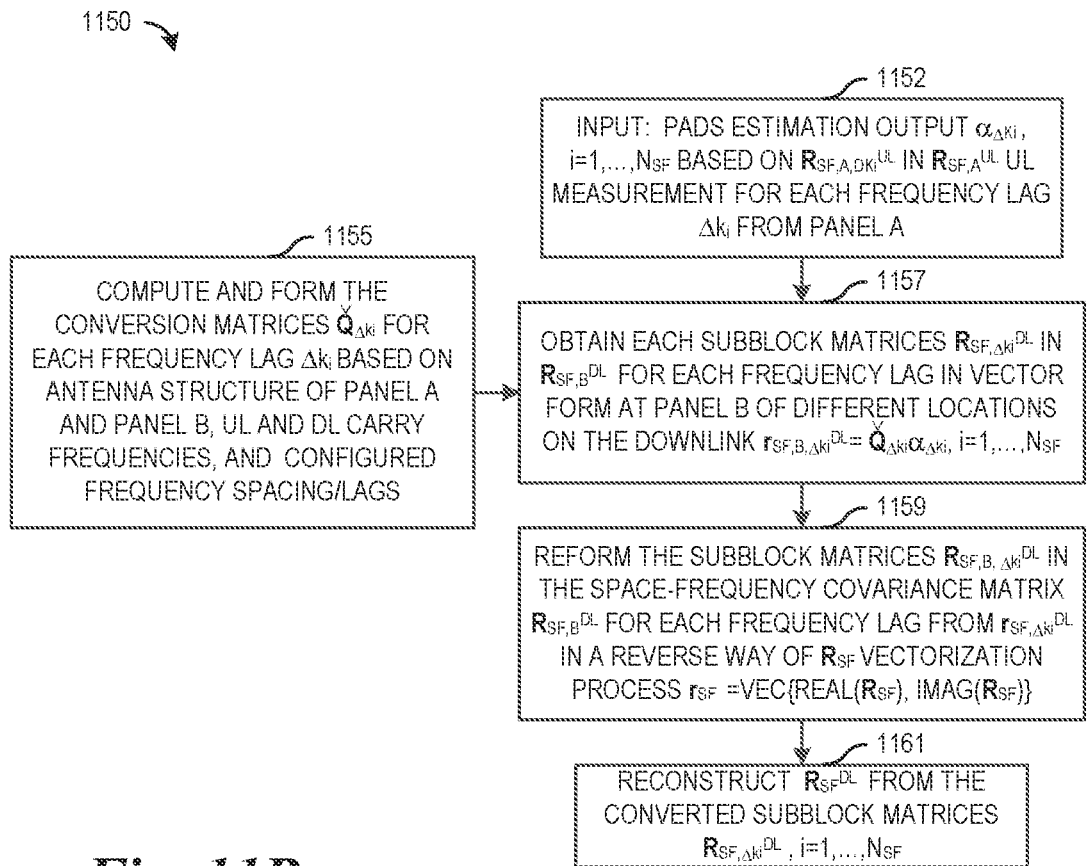
FIG. 11B illustrates a flow diagram of example operations occurring in a device converting spatial-frequency covariance in the spatial and frequency domains for two antenna panels with different locations, with asymptotic solutions, according to example embodiments presented herein.

FIG. 11B illustrates a flow diagram of example operations 1150 occurring in a device converting spatial-frequency covariance in the spatial and frequency domains for two antenna panels with different locations, with asymptotic solutions. Operations 1150 may be indicative of operations occurring in a device (such as an access node, a UE, or a dedicated device configured to convert spatial-frequency covariance) as the device converts spatial-frequency covariance, with asymptotic solutions, where the device has two antenna panels located at different locations. Although the discussion focuses on two antenna panels, the example embodiments are operable in a situation were the device has an antenna array with two subsets of antenna elements, with each subset serving a different frequency band. Therefore, the discussion of antenna panels should not be construed as being limiting to the scope of the example embodiments.

Input to operations 1150 may include the PADS estimation outputs $\alpha_{\Delta ki}=1, \ldots, N_{SF}$ (block 1152). Operations 1150 begin with the device forming conversion matrices $\tilde{Q}_{\Delta ki}$ (block 1155). The conversion matrices may be formed for each frequency lag in accordance with parameters of the communication system, including the antenna structure (such as aperture, antenna element spacing, polarization, etc.), carrier frequency of the first frequency band and the second frequency band, configured frequency spacings or lags, and so on).

The device obtains the subblock matrices of the vectorized form of the spatial-frequency covariance of the second antenna panel B in the second frequency band $r_{SF,B,\Delta ki}^{DL}$ (block 1157). The vectorized form of the spatial-frequency covariance may be obtained for different locations, such as at the different antenna element locations. The vectorized form of the spatial-frequency covariance being obtained by multiplying the PADS estimation output $\alpha$ (provided as input to operations 1150) and the conversion matrix $\tilde{Q}_{\Delta ki}$ formed in block 1155, and may be expressible as $r_{SF,B,\Delta ki}^{DL}=\tilde{Q}_{\Delta ki}\alpha_{\Delta ki}$, for example. The device reforms the subblock matrices of the spatial-frequency covariance matrix $R_{SF,B,\Delta ki}^{DL}$ (block 1159). The $R_{SF,B,\Delta ki}^{DL}$ may be reformed from the vectorized form of the spatial-frequency covariance of the second antenna panel B in the second frequency band $r_{SF,B,\Delta ki}^{DL}$. The $R_{SF,B,\Delta ki}^{DL}$ may be formed in a reverse manner from forming the spatial-frequency covariance for the first antenna panel A in the first frequency band $r_{SF}$ with $r_{SF}=\text{Vec}\{\Re\{\{R_{SF}\},\Im\{R_{SF}\}\}$, for example. The device reconstructs the spatial-frequency covariance of the second antenna panel B in the second frequency band $R_{SF}^{DL}$ (block 1161). The spatial-frequency covariance of the second antenna panel B in the second frequency band $R_{SF}^{DL}$ may be reconstructed from the subblock matrices $R_{SF,B,\Delta ki}^{DL}$, for example.

Let $u_m^A$, $m=1, \ldots, M_A$ be the locations of antennas for one panel, e.g., antenna panel A, from which the channel is measured and the spatial-frequency covariance is obtained, and $u_m^B$, $m=1, \ldots, M_B$ be the locations of antennas for a second panel, e.g., antenna panel B, for the covariance conversion. Furthermore, let $g_n^{UL,A}(\theta, \tau)$ be an entry of the vectorized real and imaginary components of the matrix $$ca^{UL,A}(\theta)a^{UL,A}(\theta)^H e^{-j2\pi\Delta k_i f_{sc}\tau}$$

and $g_n^{DL,B}(\theta, \tau)$ as an entry of the vectorized real and imaginary components of the matrix $$ca^{DL,B}(\theta)a^{DL,B}(\theta)^H e^{-j2\pi\Delta k_i f_{sc}\tau}$$

with the index of the one-one mapping expressible as $n= \mathcal{M}(m, m', i, I_{R/I})$.

Given the location of $u_m^A$, it is possible to compute $\varphi_{m,m'}(\theta)$ with $u_m^A$ as $\varphi_{m,m'}^A(\theta)=k(\theta)^T u_m^A - k(\theta)^T u_{m'}^A$. The estimation matrix G may be determined using Equations (32) to (37) for a given $\tau_{DS}$ or using Equations (54) to (58) for asymptotic delay spread.

The covariance for antenna panel B on a frequency associated with antenna panel B being expressible as $$\hat{r}_n^{DL,B} = \langle \hat{\rho}, g_n^{DL,B}\rangle = \sum_{n'=1}^{N'} \alpha_{n'}\langle g_{n'}^{UL,A}, g_n^{DL,B}\rangle, \quad (64)$$

where the inner products, $\langle g_{n'}^{ULA}, g_n^{DL,B}\rangle$, form the conversion matrix $\tilde{Q}$ for the two antenna panels with different antenna locations. Similarly as before, with separation of real and imaginary parts, the conversion matrix $\tilde{Q}$ can be rewritten into 4 subblock matrices expressible as $$\tilde{Q} = \begin{bmatrix} \tilde{Q}_{\Re\Re} & \tilde{Q}_{\Re\Im} \\ \tilde{Q}_{\Im\Re} & \tilde{Q}_{\Im\Im} \end{bmatrix}. \quad (65)$$

Denoting $\varphi_{m,m'}^B(\theta)=k(\theta)^T u_m^B - k(\theta)^T u_{m'}^B$ for antenna panel B, the conversion matrix Q are expressible as $$\tilde{Q}_{m_1,m_1',m_2,m_2'}^{c-}(\lambda_1, \lambda_2) = \frac{1}{2\pi}\int_{-\pi}^{\pi}\cos\left(\frac{2\pi}{\lambda_1}\varphi_{m_1,m_1'}^A(\theta) - \frac{2\pi}{\lambda_2}\varphi_{m_2,m_2'}^B(\theta)\right)d\theta, \quad (66)$$

$$\tilde{Q}_{m_1,m_1',m_2,m_2'}^{s-}(\lambda_1, \lambda_2) = \frac{1}{2\pi}\int_{-\pi}^{\pi}\sin\left(\frac{2\pi}{\lambda_1}\varphi_{m_1,m_1'}^A(\theta) - \frac{2\pi}{\lambda_2}\varphi_{m_2,m_2'}^B(\theta)\right)d\theta,$$

$$\tilde{Q}_{m_1,m_1',m_2,m_2'}^{c+}(\lambda_1, \lambda_2) = \frac{1}{2\pi}\int_{-\pi}^{\pi}\cos\left(\frac{2\pi}{\lambda_1}\varphi_{m_1,m_1'}^A(\theta) + \frac{2\pi}{\lambda_2}\varphi_{m_2,m_2'}^B(\theta)\right)d\theta,$$

$$\tilde{Q}_{m_1,m_1',m_2,m_2'}^{s+}(\lambda_1, \lambda_2) = \frac{1}{2\pi}\int_{-\pi}^{\pi}\sin\left(\frac{2\pi}{\lambda_1}\varphi_{m_1,m_1'}^A(\theta) - \frac{2\pi}{\lambda_2}\varphi_{m_2,m_2'}^B(\theta)\right)d\theta.$$

Because the integral of the inner product can be separated on spatial and delay domains, the integral on the delay main for $\tilde{Q}$ matrix remains the same as that for Q matrix itself. The results share the same structure except that the spatial domain integrals result in the $\tilde{Q}$ functions as in Equation (66). The conversion matrix $\tilde{Q}$ for a given finite $\tau_{DS}$ is obtained with its entries $\langle g_n^{ULA}, g_n^{DL,B}\rangle$ in the same forms as that of Q as in Equations (44), and (47) to (49) but with all $Q$ functions in Equation (45) replaced with the corresponding $\tilde{Q}$ functions in Equation (66), and the asymptotic expressions with the entries of the conversion matrix in the forms of Equations (59) to (63) but replacing $Q$ functions in Equation (45) with the corresponding $\tilde{Q}$ functions in Equation (66).

Figure 12A:
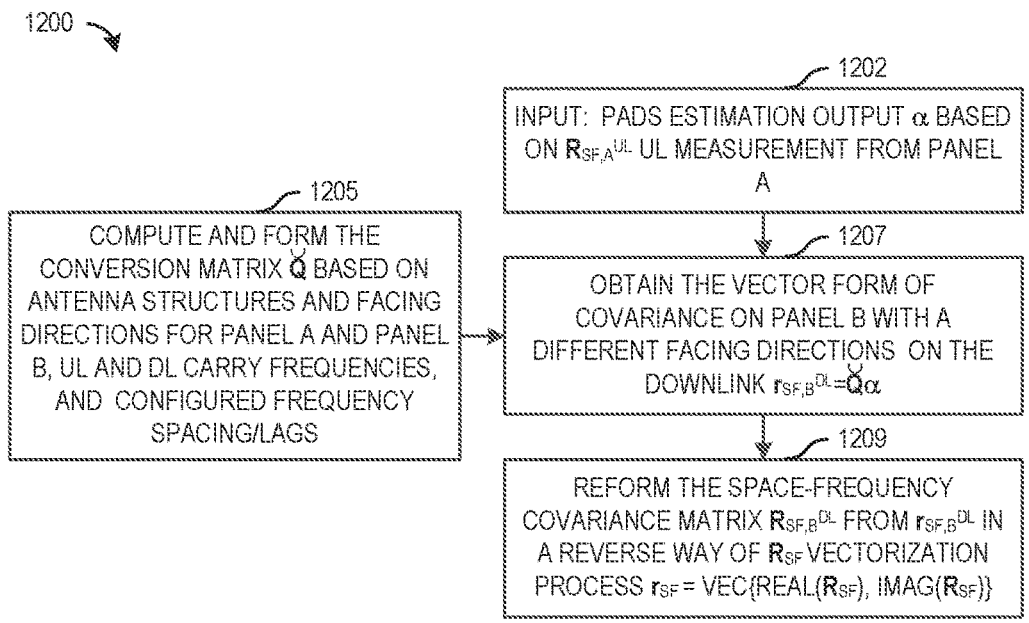
FIG. 12A illustrates a flow diagram of example operations occurring in a device converting spatial-frequency covariance in the spatial and frequency domains for two antenna panels with different steering directions according to example embodiments presented herein.

FIG. 12A illustrates a flow diagram of example operations 1200 occurring in a device converting spatial-frequency covariance in the spatial and frequency domains for two antenna panels with different steering directions. Operations

1200 may be indicative of operations occurring in a device (such as an access node, a UE, or a dedicated device configured to convert spatial-frequency covariance) as the device converts spatial-frequency covariance, where the device has two antenna panels with different steering directions. Although the discussion focuses on two antenna panels, the example embodiments are operable in a situation were the device has an antenna array with two subsets of antenna elements, with each subset serving a different frequency band. Therefore, the discussion of antenna panels should not be construed as being limiting to the scope of the example embodiments.

Input to operations 1200 may include the PADS estimation output $\alpha$ for the first antenna panel A, where the PADS estimation output may be based on the $R_{SF,A}^{UL}$ from measurements made on the first antenna panel A in the first frequency band (block 1202). Operations 1200 begin with the device forming a conversion matrix $\breve{Q}$ (block 1205). The conversion matrix may be formed in accordance with the antenna structure of the first antenna panel A and a second antenna panel B (such as aperture, spacing, polarization, antenna element spacing, etc.), carrier frequencies of the first antenna band and the second antenna band, configured frequency spacings or lags, and so on).

The device obtains the vectorized form of the spatial-frequency covariance of the second antenna panel B in the second frequency band $r_{SF,B}^{DL}$ (block 1207). The vectorized form of the spatial-frequency covariance being obtained by multiplying the PADS estimation output $\alpha$ (provided as input to operations 1200) and the conversion matrix $\breve{Q}$ formed in block 1105, and may be expressible as $r_{SF,B}^{DL} = \breve{Q}\alpha$, for example. The device reforms the spatial-frequency covariance matrix $R_{SF,B}^{DL}$ (block 1209). The $R_{SF,B}^{DL}$ may be reformed from the vectorized form of the spatial-frequency covariance of the second antenna panel B in the second frequency band $r_{SF,B}^{DL}$. The $R_{SF,B}^{DL}$ may be formed in a reverse manner from forming the spatial-frequency covariance for the first antenna panel A in the first frequency band $r_{SF,A}^{UL}$ with $r_{SF,A}^{UL}=\text{vec}\{\Re\{\{R_{SF,A}^{UL}\}, \Im\{R_{SF,A}^{UL}\}\}$, for example.

Figure 12B:
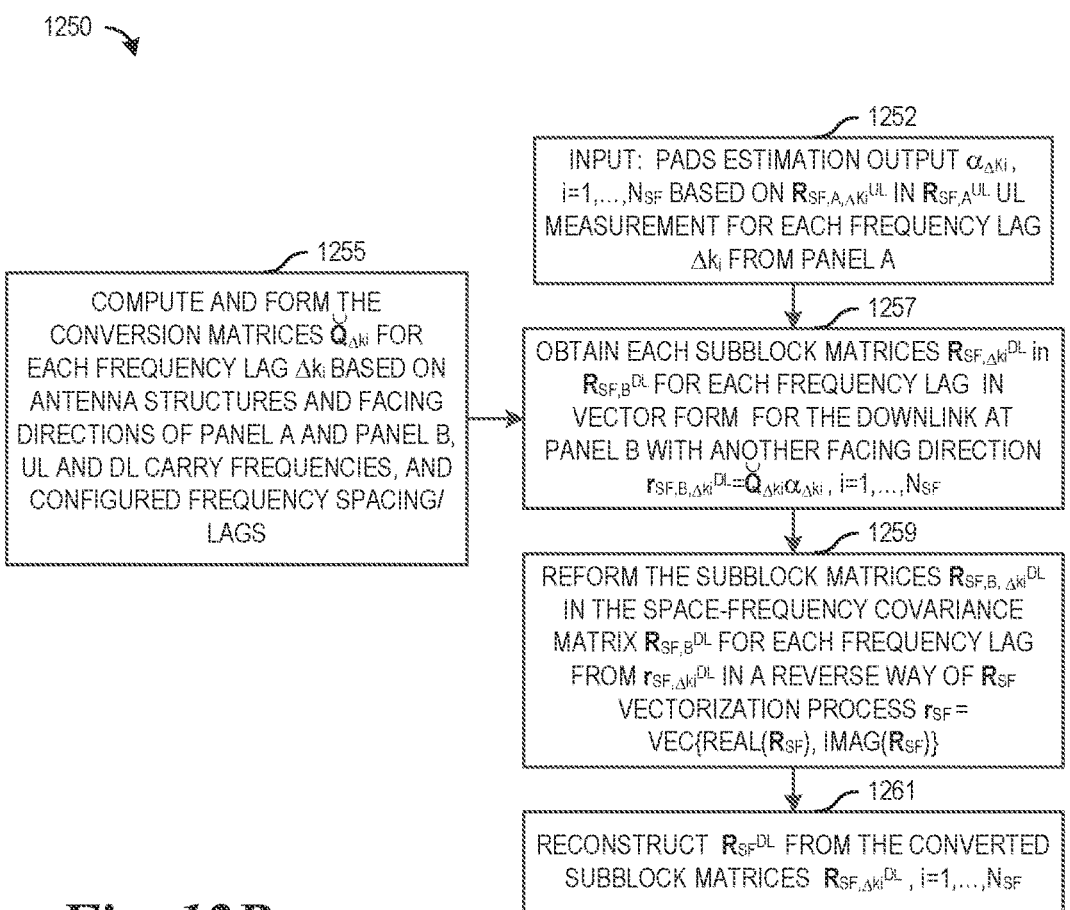
FIG. 12B illustrates a flow diagram of example operations occurring in a device converting spatial-frequency covariance in the spatial and frequency domains for two antenna panels with different steering directions, with asymptotic solutions, according to example embodiments presented herein.

FIG. 12B illustrates a flow diagram of example operations occurring in a device converting spatial-frequency covariance in the spatial and frequency domains for two antenna panels with different steering directions, with asymptotic solutions. Operations 1250 may be indicative of operations occurring in a device (such as an access node, a UE, or a dedicated device configured to convert spatial-frequency covariance) as the device converts spatial-frequency covariance, with asymptotic solutions, where the device has two antenna panels with different steering directions. Although the discussion focuses on two antenna panels, the example embodiments are operable in a situation were the device has an antenna array with two subsets of antenna elements, with each subset serving a different frequency band. Therefore, the discussion of antenna panels should not be construed as being limiting to the scope of the example embodiments.

Input to operations 1250 may include the PADS estimation outputs $\alpha_{\Delta ki}=1, \ldots, N_{SF}$ (block 1252). Operations 1250 begin with the device forming conversion matrices $\breve{Q}_{\Delta ki}$ (block 1255). The conversion matrices may be formed for each frequency lag in accordance with parameters of the communication system, including the antenna structure (such as aperture, antenna element spacing, polarization, etc.), carrier frequency of the first frequency band and the second frequency band, configured frequency spacings or lags, and so on.

The device obtains the subblock matrices of the vectorized form of the spatial-frequency covariance of the second antenna panel B in the second frequency band $r_{SF,B,\Delta ki}^{DL}$ (block 1257). The vectorized form of the spatial-frequency covariance may be obtained for different locations, such as at the different antenna element locations. The vectorized form of the spatial-frequency covariance being obtained by multiplying the PADS estimation output $\alpha$ (provided as input to operations 1250) and the conversion matrix $\breve{Q}_{\Delta ki}$ formed in block 1155, and may be expressible as $r_{SF,B,\Delta ki}^{DL} = \breve{Q}_{\Delta ki}\alpha_{\Delta ki}$, for example. The device reforms the subblock matrices of the spatial-frequency covariance matrix $R_{SF,B,\Delta k_i}^{DL}$ (block 1259). The $R_{SF,B,\Delta k_i}^{DL}$ may be reformed from the vectorized form of the spatial-frequency covariance of the second antenna panel B in the second frequency band $r_{SF,B,\Delta k_i}^{DL}$. The $R_{SF,B,\Delta k_i}^{UL}$ may be formed in a reverse manner from forming the spatial-frequency covariance for the first antenna panel A in the first frequency band $R_{SF}^{DL}$ with $r_{SF}^{UL}=\text{Vec}\{\Re\{\{R_{SF}^{UL}\}, \Im\{R_{SF}^{UL}\}\}$, for example. The device reconstructs the spatial-frequency covariance of the second antenna panel B in the second frequency band $R_{SF}^{DL}$ (block 1261). The spatial-frequency covariance of the second antenna panel B in the second frequency band $R_{SF}^{DL}$ may be reconstructed from the subblock matrices $R_{SF,B,\Delta k_i}^{DL}$, for example.

In the scenario with antenna arrays with different steering directions, it is assumed that the steering directions of two co-located antenna arrays have an angle difference $\theta_\Delta$. It is assumed that the related locations of the antenna elements are the same for the two antenna panels, i.e., $\{u_m\}$. The steering angle of the antenna array can be translated into the location coordinates. Therefore, if the locations of the antenna elements in two antenna arrays are placed in a global coordinate reference system, the information of antenna steering direction is contained in the location of the antenna elements. Hence, the results presented above may be applied directly to obtaining the conversion for the two panels with different steering direction. However, because the only difference is angle, a more efficient solution may be provided, particularly, when it is subsequently applied to a regular array (e.g., a uniform linear array (ULA)).

Because the PADS is estimated based on one antenna array, the estimation procedure will be the same as discussed previously. The conversion, however, has to take into account the difference of the antenna steering direction. Given the estimated power angle delay spectrum estimate $\hat{\rho}(\theta, \tau)$ from one panel, the spatial-frequency covariance matrix on the other panel and a different band can be obtained as $$r_n^{DL,B} = \qquad (67)$$

$$\langle \hat{\rho}(\theta, \tau), g_n(\theta + \theta_\Delta, \tau) \rangle = \sum\nolimits_{n'=1}^{N'} \alpha_{n'} \langle g_{n'}^{UL,A}(\theta, \tau), g_n^{DL,B}(\theta + \theta_\Delta, \tau) \rangle,$$

where the inner products, $\langle g_{n'}^{ULA}(\theta, \tau), g_n^{DL,B}(\theta+\theta_\Delta,\tau) \rangle$, form the conversion matrix $\breve{Q}$ for the scenario. Again, with separation of the real and imaginary parts, the conversion matrix $\breve{Q}$ may be rewritten into four subblock matrices expressible as $$\breve{Q} = \begin{bmatrix} \breve{Q}_{\Re\Re} & \breve{Q}_{\Re\Im} \\ \breve{Q}_{\Im\Re} & \breve{Q}_{\Im\Im} \end{bmatrix}. \quad (68)$$

Let $$\breve{Q}^{c-}_{m_1,m'_1,m_2,m'_2}(\lambda_1, \lambda_2, \theta_\Delta) = \quad (69)$$

$$\frac{1}{2\pi}\int_{-\pi}^{\pi}\cos\left(\frac{2\pi}{\lambda_1}\varphi^A_{m_1,m'_1}(\theta) - \frac{2\pi}{\lambda_2}\varphi^B_{m_2,m'_2}(\theta+\theta_\Delta)\right)d\theta,$$

$$\breve{Q}^{s-}_{m_1,m'_1,m_2,m'_2}(\lambda_1, \lambda_2, \theta_\Delta) = \frac{1}{2\pi}\int_{-\pi}^{\pi}\sin\left(\frac{2\pi}{\lambda_1}\varphi^A_{m_1,m'_1}(\theta) - \frac{2\pi}{\lambda_2}\varphi^B_{m_2,m'_2}(\theta+\theta_\Delta)\right)d\theta,$$

$$\breve{Q}^{c+}_{m_1,m'_1,m_2,m'_2}(\lambda_1, \lambda_2, \theta_\Delta) = \frac{1}{2\pi}\int_{-\pi}^{\pi}\cos\left(\frac{2\pi}{\lambda_1}\varphi^A_{m_1,m'_1}(\theta) + \frac{2\pi}{\lambda_2}\varphi^B_{m_2,m'_2}(\theta+\theta_\Delta)\right)d\theta,$$

$$\breve{Q}^{s+}_{m_1,m'_1,m_2,m'_2}(\lambda_1, \lambda_2, \theta_\Delta) = \frac{1}{2\pi}\int_{-\pi}^{\pi}\sin\left(\frac{2\pi}{\lambda_1}\varphi^A_{m_1,m'_1}(\theta) + \frac{2\pi}{\lambda_2}\varphi^B_{m_2,m'_2}(\theta+\theta_\Delta)\right)d\theta.$$

The conversion matrix $\breve{Q}$ for a given finite $\tau_{DS}$ with the resulting entries $\langle g_n'^{ULA}(\theta, \tau), g_n'^{DL,B}(\theta+\theta_\Delta, \tau) \rangle$ in the same forms as that of Q as in Equations (44), and (47) to (49) but replacing all Q functions in Equation (45) with the corresponding $\breve{Q}$ functions in Equation (68), and the asymptotic expressions with the entries in the same forms as in Equations (59) to (63) but replacing Q functions in Equation (45) with $\breve{Q}$ functions in Equation (66).

The spatial-frequency conversion for general antenna array configurations are presented above. The results involve complex integrals based on antennas as in the F, $Q$, $\breve{Q}$, and $\breve{Q}$ functions.

According to an example embodiment, spatial-frequency conversion for ULAs are provided. ULAs are commonly used in massive MIMO communication systems. The ULAs have an equal antenna spacing d. Explicit solutions are provided.

With ULAs, the antenna response $\alpha(\theta)$ is a beam vector and is expressible as $$a(\theta) = \left[1, e^{-j\frac{2\pi d}{\lambda}\sin\theta}, \ldots, e^{-j\frac{2\pi d}{\lambda}(M-1)\sin\theta}\right]^T. \quad (70)$$

It is easily seen that for ULAs, $R_0$ is Toeplitz Hermitian and $$\{R_{\Delta_{k_i}}\}$$

are Toeplitz matrices. Therefore, for $R_0$, only the first column is needed and the conversion for the first column is obtained. There are total 2M−1 real entries after the separation of real and imaginary values of the complex entries. For $$R_{\Delta_{k_i}}$$

with $\Delta k_i \neq 0$, there are 2(2M−1) independent real values for each $\Delta_{k_i}$. So the total number of independent entries is $(N_{SF}-1)(4M-2)+2M-1$. Because for each entry there is a function $g_n(\theta, \tau)$, the number of independent functions is then $N'=(N_{SF}-1)(4M-2)+2M-1$.

The estimation matrix G and the conversion matrix Q for ULA may be determined as follows. First, $\varphi_{m,m'}(\theta)=(m-m')\sin(\theta)$. In order to compute the F and $Q$ functions, due to symmetric antenna structure, the angle region for the integrals in the inner product can be reduced to $$\left[-\frac{\pi}{2}, \frac{\pi}{2}\right].$$

The normalization factor is then $1/\pi$. The F functions for ULA is expressible as $$\mathcal{F}^{c-}_{m_1,m'_1,m_2,m'_2}(\lambda) = \frac{1}{\pi}\int_{-\frac{\pi}{2}}^{\frac{\pi}{2}}\cos\left(\frac{2\pi d}{\lambda}((m_1-m'_1)-(m_2-m'_2))\sin(\theta)\right)d\theta = \quad (71)$$

$$J_0\left(\frac{2\pi d}{\lambda}((m_1-m'_1)-(m_2-m'_2))\right),$$

$$\mathcal{F}^{s-}_{m_1,m'_1,m_2,m'_2}(\lambda) = \frac{1}{\pi}\int_{-\frac{\pi}{2}}^{\frac{\pi}{2}}\sin\left(\frac{2\pi}{\lambda}((m_1-m'_1)-(m_2-m'_2))\sin(\theta)\right)d\theta = 0,$$

$$\mathcal{F}^{c+}_{m_1,m'_1,m_2,m'_2}(\lambda) = \frac{1}{\pi}\int_{-\frac{\pi}{2}}^{\frac{\pi}{2}}\cos\left(\frac{2\pi d}{\lambda}((m_1-m'_1)+(m_2-m'_2))\sin(\theta)\right)d\theta =$$

$$J_0\left(\frac{2\pi d}{\lambda}((m_1-m'_1)+(m_2-m'_2))\right),$$

$$\mathcal{F}^{s+}_{m_1,m'_1,m_2,m'_2}(\lambda) = \frac{1}{\pi}\int_{-\frac{\pi}{2}}^{\frac{\pi}{2}}\sin\left(\frac{2\pi}{\lambda}((m_1-m'_1)+(m_2-m'_2))\sin(\theta)\right)d\theta = 0.$$

The four submatrices of the G matrix are expressible as $$[G_{\Re\Re}]_{n_1,n_2} = \frac{1}{2}\Big\{\text{sinc}\big(2\pi(\Delta_{k_{i_1}} - \Delta_{k_{i_2}})f_{sc}\tau_{DS}\big)J_0\Big(\frac{2\pi d}{\lambda^{UL}}((m_1-m'_1) -$$

$$(m_2-m'_2))\Big) + \text{sinc}\big(2\pi(\Delta_{k_{i_1}} + \Delta_{k_{i_2}})f_{sc}\tau_{DS}\big)J_0\Big(\frac{2\pi d}{\lambda^{UL}}((m_1-m'_1) +$$

$$(m_2-m'_2))\Big)\Big\},$$

$$[G_{\Re\Im}]_{n_1,n_2} = \frac{1}{2}\Big\{-\frac{1-\cos(2\pi(\Delta_{k_{i_1}} - \Delta_{k_{i_2}})f_{sc}\tau_{DS})}{2\pi(\Delta_{k_{i_1}} - \Delta_{k_{i_2}})f_{sc}\tau_{DS}}J_0\Big(\frac{2\pi d}{\lambda^{UL}}((m_1-m'_1) -$$

$$(m_2-m'_2))\Big)\frac{1-\cos(2\pi(\Delta_{k_{i_1}} + \Delta_{k_{i_2}})f_{sc}\tau_{DS})}{2\pi(\Delta_{k_{i_1}} + \Delta_{k_{i_2}})f_{sc}\tau_{DS}}J_0\Big(\frac{2\pi d}{\lambda^{UL}}((m_1-m'_1) +$$

$$(m_2-m'_2))\Big)\Big\},$$

$$[G_{\Im\Re}]_{n_1,n_2} = \frac{1}{2}\Big\{\frac{1-\cos(2\pi(\Delta_{k_{i_1}} - \Delta_{k_{i_2}})f_{sc}\tau_{DS})}{2\pi(\Delta_{k_{i_1}} - \Delta_{k_{i_2}})f_{sc}\tau_{DS}}J_0\Big(\frac{2\pi d}{\lambda^{UL}}((m_1 -$$

$$m'_1) - (m_2-m'_2))\Big)\frac{1-\cos(2\pi(\Delta_{k_{i_1}} + \Delta_{k_{i_2}})f_{sc}\tau_{DS})}{2\pi(\Delta_{k_{i_1}} + \Delta_{k_{i_2}})f_{sc}\tau_{DS}}J_0\Big(\frac{2\pi d}{\lambda^{UL}}((m_1 -$$

$$m'_1) + (m_2-m'_2))\Big)\Big\},$$

$$[G_{\Im\Im}]_{n_1,n_2} = \frac{1}{2}\Big\{\text{sinc}\big(2\pi(\Delta_{k_{i_1}} - \Delta_{k_{i_2}})f_{sc}\tau_{DS}\big)J_0\Big(\frac{2\pi d}{\lambda^{UL}}((m_1-m'_1) -$$

$$(m_2-m'_2))\Big) - \text{sinc}\big(2\pi(\Delta_{k_{i_1}} + \Delta_{k_{i_2}})f_{sc}\tau_{DS}\big)J_0\Big(\frac{2\pi d}{\lambda^{UL}}((m_1-m'_1) +$$

$$(m_2-m'_2))\Big)\Big\}.$$

Similarly, the $Q$ functions as obtain in Equation (45) are expressible as $$Q^{c-}_{m_1,m'_1,m_2,m'_2}(\lambda_1,\lambda_2) = J_0\left(\frac{2\pi d}{\lambda_1}(m_1-m'_1) - \frac{2\pi d}{\lambda_2}(m_2-m'_2)\right), \quad (72)$$

$$Q^{s-}_{m_1,m'_1,m_2,m'_2}(\lambda_1,\lambda_2) = 0,$$

$$Q^{c+}_{m_1,m'_1,m_2,m'_2}(\lambda_1,\lambda_2) = J_0\left(\frac{2\pi d}{\lambda_1}(m_1-m'_1) + \frac{2\pi d}{\lambda_2}(m_2-m'_2)\right)$$

$$Q^{s+}_{m_1,m'_1,m_2,m'_2}(\lambda_1,\lambda_2) = 0.$$

Consequently, the submatrices for Q are expressible as $$[Q_{\Re\Re}]_{n_1,n_2} = \frac{1}{2}\left\{\operatorname{sinc}(2\pi(\Delta_{k_{i_1}}-\Delta_{k_{i_2}})f_{sc}\tau_{DS})J_0\left(\frac{2\pi d}{\lambda^{UL}}\left((m_1-m'_1)-\frac{2\pi d}{\lambda^{DL}}(m_2-m'_2)\right)\right) + \operatorname{sinc}(2\pi(\Delta_{k_{i_1}}+\Delta_{k_{i_2}})f_{sc}\tau_{DS})J_0\left(\frac{2\pi d}{\lambda^{UL}}(m_1-m'_1)+\frac{2\pi d}{\lambda^{DL}}(m_2-m'_2)\right)\right\}, \quad (73)$$

$$[Q_{\Re\Im}]_{n_1,n_2} = \frac{1}{2}\left\{-\frac{1-\cos(2\pi(\Delta_{k_{i_1}}-\Delta_{k_{i_2}})f_{sc}\tau_{DS})}{2\pi(\Delta_{k_{i_1}}-\Delta_{k_{i_2}})f_{sc}\tau_{DS}}J_0\left(\frac{2\pi d}{\lambda^{UL}}(m_1-m'_1)-\frac{2\pi d}{\lambda^{DL}}(m_2-m'_2)\right) + \frac{1-\cos(2\pi(\Delta_{k_{i_1}}+\Delta_{k_{i_2}})f_{sc}\tau_{DS})}{2\pi(\Delta_{k_{i_1}}+\Delta_{k_{i_2}})f_{sc}\tau_{DS}}J_0\left(\frac{2\pi d}{\lambda^{UL}}(m_1-m'_1)+\frac{2\pi d}{\lambda^{DL}}(m_2-m'_2)\right)\right\},$$

$$[Q_{\Im\Re}]_{n_1,n_2} = \frac{1}{2}\left\{\frac{1-\cos(2\pi(\Delta_{k_{i_1}}-\Delta_{k_{i_2}})f_{sc}\tau_{DS})}{2\pi(\Delta_{k_{i_1}}-\Delta_{k_{i_2}})f_{sc}\tau_{DS}}J_0\left(\frac{2\pi d}{\lambda^{UL}}(m_1-m'_1)-\frac{2\pi d}{\lambda^{DL}}(m_2-m'_2)\right) + \frac{1-\cos(2\pi(\Delta_{k_{i_1}}+\Delta_{k_{i_2}})f_{sc}\tau_{DS})}{2\pi(\Delta_{k_{i_1}}+\Delta_{k_{i_2}})f_{sc}\tau_{DS}}J_0\left(\frac{2\pi d}{\lambda^{UL}}(m_1-m'_1)+\frac{2\pi d}{\lambda^{DL}}(m_2-m'_2)\right)\right\},$$

$$[Q_{\Im\Im}]_{n_1,n_2} = \frac{1}{2}\left\{\operatorname{sinc}(2\pi(\Delta_{k_{i_1}}-\Delta_{k_{i_2}})f_{sc}\tau_{DS})J_0\left(\frac{2\pi d}{\lambda^{UL}}(m_1-m'_1)-\frac{2\pi d}{\lambda^{DL}}(m_2-m'_2)\right) - \operatorname{sinc}(2\pi(\Delta_{k_{i_1}}+\Delta_{k_{i_2}})f_{sc}\tau_{DS})J_0\left(\frac{2\pi d}{\lambda^{UL}}(m_1-m'_1)+\frac{2\pi d}{\lambda^{DL}}(m_2-m'_2)\right)\right\}.$$

For the G and Q submatrices, the results for some special cases when $$\Delta_{k_{i_1}} = \Delta_{k_{i_2}},$$

as described in Equations (38) to (41) can be applied, which simplify the matrices significantly.

The asymptotic expressions for a communication system with ULA considering $\tau_{DS}$ going to infinity are determined. By applying asymptotic results in Equations (50) to (53), there zeros for all the submatrices in both G and Q when $$\Delta_{k_{i_1}} \neq \Delta_{k_{i_2}}$$

as in Equations (54) and (59). For the cases when $$\Delta_{k_{i_1}} = \Delta_{k_{i_2}},$$

the G submatrices are expressible as $$[G_{\Re\Re}]_{n_1,n_2} = \begin{cases} \frac{1}{2}J_0\left(\frac{2\pi d}{\lambda^{UL}}((m_1-m'_1)-(m_2-m'_2))\right) + \\ \frac{1}{2}J_0\left(\frac{2\pi d}{\lambda^{UL}}((m_1-m'_1)+(m_2-m'_2))\right), & \Delta_{k_{i_1}}=\Delta_{k_{i_2}}=0, \\ \frac{1}{2}J_0\left(\frac{2\pi d}{\lambda^{UL}}((m_1-m'_1)-(m_2-m'_2))\right), & \Delta_{k_{i_1}}=\Delta_{k_{i_2}}\neq 0 \end{cases}$$

$$[G_{\Re\Im}]_{n_1,n_2} = 0,$$

$$[G_{\Im\Re}]_{n_1,n_2} = 0,$$

$$[G_{\Im\Im}]_{n_1,n_2} = \begin{cases} \frac{1}{2}J_0\left(\frac{2\pi d}{\lambda^{UL}}((m_1-m'_1)-(m_2-m'_2))\right) - \\ \frac{1}{2}J_0\left(\frac{2\pi d}{\lambda^{UL}}((m_1-m'_1)+(m_2-m'_2))\right), & \Delta_{k_{i_1}}=\Delta_{k_{i_2}}=0, \\ \frac{1}{2}J_0\left(\frac{2\pi d}{\lambda^{UL}}((m_1-m'_1)-(m_2-m'_2))\right), & \Delta_{k_{i_1}}=\Delta_{k_{i_2}}\neq 0, \end{cases}$$

and the Q submatrices are expressible as $$[Q_{\Re\Re}]_{n_1,n_2} = \qquad (74)$$

$$\begin{cases} \frac{1}{2}J_0\left(\frac{2\pi d}{\lambda^{UL}}(m_1-m'_1)-\frac{2\pi d}{\lambda^{DL}}(m_2-m'_2)\right) + \\ \frac{1}{2}J_0\left(\frac{2\pi d}{\lambda^{UL}}(m_1-m'_1)+\frac{2\pi d}{\lambda^{DL}}(m_2-m'_2)\right), & \Delta_{k_{i_1}}=\Delta_{k_{i_2}}=0 \\ \frac{1}{2}J_0\left(\frac{2\pi d}{\lambda^{UL}}(m_1-m'_1)-\frac{2\pi d}{\lambda^{DL}}(m_2-m'_2)\right), & \Delta_{k_{i_1}}=\Delta_{k_{i_2}}\neq 0 \end{cases}$$

$$[Q_{\Re\Im}]_{n_1,n_2} = 0,$$

$$[Q_{\Im\Re}]_{n_1,n_2} = 0,$$

$$[Q_{\Im\Im}]_{n_1,n_2} =$$

$$\begin{cases} \frac{1}{2}J_0\left(\frac{2\pi d}{\lambda^{UL}}(m_1-m'_1)-\frac{2\pi d}{\lambda^{DL}}(m_2-m'_2)\right) - \\ \frac{1}{2}J_0\left(\frac{2\pi d}{\lambda^{UL}}(m_1-m'_1)+\frac{2\pi d}{\lambda^{DL}}(m_2-m'_2)\right), & \Delta_{k_{i_1}}=\Delta_{k_{i_2}}=0 \\ \frac{1}{2}J_0\left(\frac{2\pi d}{\lambda^{UL}}(m_1-m'_1)-\frac{2\pi d}{\lambda^{DL}}(m_2-m'_2)\right), & \Delta_{k_{i_1}}=\Delta_{k_{i_2}}\neq 0 \end{cases}$$

Figure 13A:
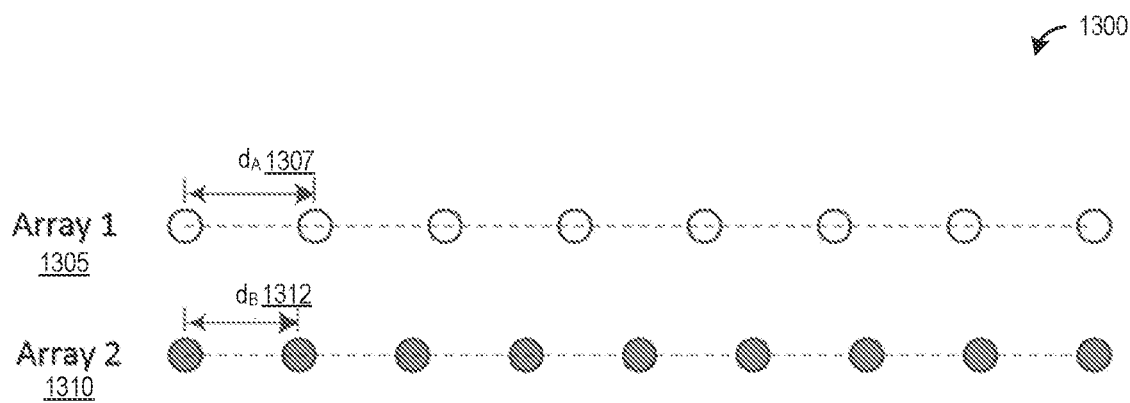
FIG. 13A illustrates a diagram of two ULA antenna arrays with different antenna spacings according to example embodiments presented herein.
Figure 13B:
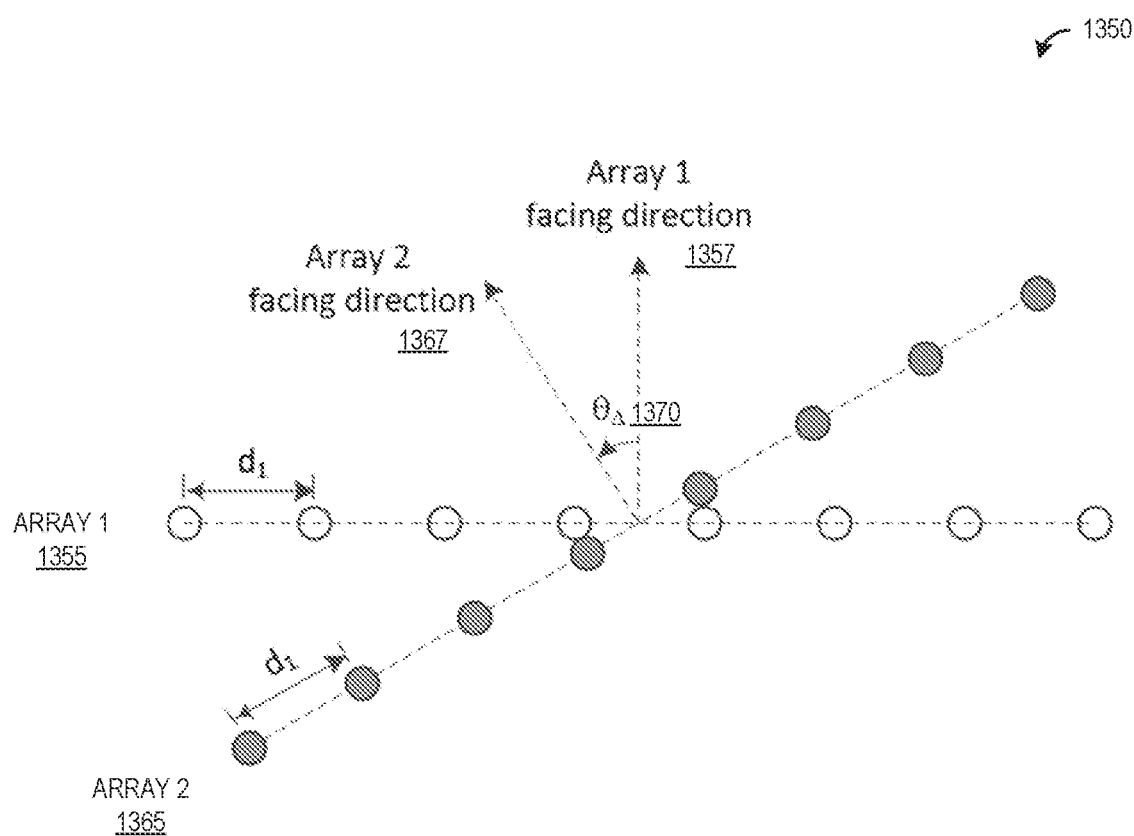
FIG. 13B illustrates a diagram of two ULA antenna arrays with different steering directions according to example embodiments presented herein.

FIG. 13A illustrates a diagram 1300 of two ULA antenna arrays with different antenna spacings. As shown in FIG. 13A, a first antenna array 1305 has an antenna spacing of dA 1307, while a second antenna array 1310 has an antenna spacing of dB 1312. FIG. 13B illustrates a diagram 1350 of two ULA antenna arrays with different steering directions. As shown in FIG. 13B, a first antenna array 1355 has a first facing direction 1357 and a second antenna array 1365 has a second facing direction 1367. The two antenna arrays have a facing direction difference of $\theta_A$ 1370.

In the situation where the communication system has two ULAs with different antenna spacings $d_A$ and $d_B$, the following are known $$\varphi_{m,m'}{}^A(\theta) = (m-m')d_A \sin(\theta)$$

$$\varphi_{m,m'}{}^B(\theta) = (m-m')d_B \sin(\theta). \qquad (75)$$

As discussed previously, the PADS for one antenna panel is determined using the techniques presented herein, and for the ULA, the G matrix specified in Equation (74) is used.

In order to obtain the conversion matrix for both spatial and frequency domains, the $\tilde{Q}$ functions from Equation (66) for ULA are expressible as $$\breve{Q}_{m_1,m_1',m_2,m_2'}^{c-}(\lambda_1,\lambda_2) = J_0\left(\frac{2\pi d_A}{\lambda_1}(m_1-m_1') - \frac{2\pi d_B}{\lambda_2}(m_2-m_2')\right), \quad (76)$$

$$\breve{Q}_{m_1,m_1',m_2,m_2'}^{s-}(\lambda_1,\lambda_2) = 0,$$

$$\breve{Q}_{m_1,m_1',m_2,m_2'}^{c+}(\lambda_1,\lambda_2) = J_0\left(\frac{2\pi d_B}{\lambda_1}(m_1-m_1') + \frac{2\pi d_B}{\lambda_2}(m_2-m_2')\right)$$

$$\breve{Q}_{m_1,m_1',m_2,m_2'}^{s+}(\lambda_1,\lambda_2) = 0.$$

The $\breve{Q}$ submatrices are expressible as $$[\breve{Q}_{\Re\Re}]_{n_1,n_2} = \qquad (77)$$

$$\frac{1}{2}\left\{\operatorname{sinc}\left(2\pi\left(\Delta_{k_{i_1}} - \Delta_{k_{i_2}}\right)f_{sc}\tau_{DS}\right)J_0\left(\frac{2\pi d_A}{\lambda^{UL}}(m_1-m_1') - \frac{2\pi d_B}{\lambda^{DL}}(m_2-m_2')\right) + \right.$$
$$\left. \operatorname{sinc}\left(2\pi\left(\Delta_{k_{i_1}} + \Delta_{k_{i_2}}\right)f_{sc}\tau_{DS}\right)J_0\left(\frac{2\pi d_A}{\lambda^{UL}}(m_1-m_1') + \frac{2\pi d_B}{\lambda^{DL}}(m_2-m_2')\right)\right\},$$

$$[\breve{Q}_{\Re\Im}]_{n_1,n_2} = \frac{1}{2}\left\{-\frac{1-\cos\left(2\pi\left(\Delta_{k_{i_1}} - \Delta_{k_{i_2}}\right)f_{sc}\tau_{DS}\right)}{2\pi\left(\Delta_{k_{i_1}} - \Delta_{k_{i_2}}\right)f_{sc}\tau_{DS}}\right.$$

$$J_0\left(\frac{2\pi d_A}{\lambda^{UL}}(m_1-m_1') - \frac{2\pi d_B}{\lambda^{DL}}(m_2-m_2')\right) +$$

$$\left.\frac{1-\cos\left(2\pi\left(\Delta_{k_{i_1}} + \Delta_{k_{i_2}}\right)f_{sc}\tau_{DS}\right)}{2\pi\left(\Delta_{k_{i_1}} + \Delta_{k_{i_2}}\right)f_{sc}\tau_{DS}}\right.$$

$$\left.J_0\left(\frac{2\pi d_A}{\lambda^{UL}}(m_1-m_1') + \frac{2\pi d_B}{\lambda^{DL}}(m_2-m_2')\right)\right\},$$

$$[\breve{Q}_{\Im\Re}]_{n_1,n_2} = \frac{1}{2}\left\{\frac{1-\cos\left(2\pi\left(\Delta_{k_{i_1}} - \Delta_{k_{i_2}}\right)f_{sc}\tau_{DS}\right)}{2\pi\left(\Delta_{k_{i_1}} - \Delta_{k_{i_2}}\right)f_{sc}\tau_{DS}}\right.$$

$$J_0\left(\frac{2\pi d_A}{\lambda^{UL}}(m_1-m_1') - \frac{2\pi d_B}{\lambda^{DL}}(m_2-m_2')\right) +$$

$$\left.\frac{1-\cos\left(2\pi\left(\Delta_{k_{i_1}} + \Delta_{k_{i_2}}\right)f_{sc}\tau_{DS}\right)}{2\pi\left(\Delta_{k_{i_1}} + \Delta_{k_{i_2}}\right)f_{sc}\tau_{DS}}\right.$$

$$\left.J_0\left(\frac{2\pi d_A}{\lambda^{UL}}(m_1-m_1') + \frac{2\pi d_B}{\lambda^{DL}}(m_2-m_2')\right)\right\},$$

$$[\breve{Q}_{\Im\Im}]_{n_1,n_2} = \frac{1}{2}\left\{\operatorname{sinc}\left(2\pi\left(\Delta_{k_{i_1}} - \Delta_{k_{i_2}}\right)f_{sc}\tau_{DS}\right)\right.$$

$$J_0\left(\frac{2\pi d_A}{\lambda^{UL}}(m_1-m_1') - \frac{2\pi d_B}{\lambda^{DL}}(m_2-m_2')\right) -$$

$$\left.\operatorname{sinc}\left(2\pi\left(\Delta_{k_{i_1}} + \Delta_{k_{i_2}}\right)f_{sc}\tau_{DS}\right)J_0\left(\frac{2\pi d_A}{\lambda^{UL}}(m_1-m_1') + \frac{2\pi d_B}{\lambda^{DL}}(m_2-m_2')\right)\right\}.$$

Considering the case where $\tau_{DS} \to \infty$, the asymptotic results for the $\breve{Q}$ submatrices for $$\Delta_{k_{i_1}} = \Delta_{k_{i_2}}$$

are expressible as $$[\breve{Q}_{\Re\Re}]_{n_1,n_2} = \qquad (78)$$

$$\begin{cases} \frac{1}{2}J_0\left(\frac{2\pi d_A}{\lambda^{UL}}(m_1-m_1') - \frac{2\pi d_B}{\lambda^{DL}}(m_2-m_2')\right) + \\ \frac{1}{2}J_0\left(\frac{2\pi d_A}{\lambda^{UL}}(m_1-m_1') + \frac{2\pi d_B}{\lambda^{DL}}(m_2-m_2')\right), & \Delta_{k_{i_1}} = \Delta_{k_{i_2}} = 0 \\ \frac{1}{2}J_0\left(\frac{2\pi d_A}{\lambda^{UL}}(m_1-m_1') - \frac{2\pi d_B}{\lambda^{DL}}(m_2-m_2')\right) & \Delta_{k_{i_1}} = \Delta_{k_{i_2}} \neq 0 \end{cases}$$

$$[\breve{Q}_{\Re\Im}]_{n_1,n_2} = 0,$$

$$[\breve{Q}_{\Im\Re}]_{n_1,n_2} = 0,$$

$$[\breve{Q}_{\Im\Im}]_{n_1,n_2} =$$

$$\begin{cases} \frac{1}{2}J_0\left(\frac{2\pi d_A}{\lambda^{UL}}(m_1-m_1') - \frac{2\pi d_B}{\lambda^{DL}}(m_2-m_2')\right) - \\ \frac{1}{2}J_0\left(\frac{2\pi d_A}{\lambda^{UL}}(m_1-m_1') + \frac{2\pi d_B}{\lambda^{DL}}(m_2-m_2')\right), & \Delta_{k_{i_1}} = \Delta_{k_{i_2}} = 0 \\ \frac{1}{2}J_0\left(\frac{2\pi d_A}{\lambda^{UL}}(m_1-m_1') - \frac{2\pi d_B}{\lambda^{DL}}(m_2-m_2')\right) & \Delta_{k_{i_1}} = \Delta_{k_{i_2}} \neq 0 \end{cases}.$$

In the situation where the communication system has two ULAs with different steering directions, the facing direction difference $\theta_\Delta$ represents the angular difference in the steering directions. As previously discussed, the PADS remains the same. In order to obtain the conversion matrix $\breve{Q}$, the $\breve{Q}$ functions are determined as follows, and the function $\varphi_{m,m'}(\theta)$ of two antenna panels are as provided in Equation (75).

First, denote $$\breve{B}_{1,m_1,m_1'} = \frac{2\pi d_A}{\lambda_1}(m_1-m_1'), \text{ and} \qquad (79)$$

$$\breve{B}_{2,m_2,m_2'} = \frac{2\pi d_B}{\lambda_2}(m_2-m_2'), \text{ and}$$

$$C_{m_1,m_1',m_2,m_2'}^{-}(\lambda_1,\lambda_2,\theta_\Delta) = \qquad (80)$$

$$\sqrt{\breve{B}_{1,m_1,m_1'}^2 + \breve{B}_{2,m_2,m_2'}^2 - 2\breve{B}_{1,m_1,m_1'}\breve{B}_{1,m_1,m_1'}\cos(\theta_\Delta)},$$

$$C_{m_1,m_1',m_2,m_2'}^{-}(\lambda_1,\lambda_2,\theta_\Delta) =$$

$$\sqrt{\breve{B}_{1,m_1,m_1'}^2 + \breve{B}_{2,m_2,m_2'}^2 + 2\breve{B}_{1,m_1,m_1'}\breve{B}_{1,m_1,m_1'}\cos(\theta_\Delta)},$$

$$\psi_{m_1,m_1',m_2,m_2'}^{-}(\lambda_1,\lambda_2,\theta_\Delta) = \tan^{-1}\left(\frac{-\breve{B}_{2,m_2,m_2'}\sin(\theta_\Delta)}{\breve{B}_{1,m_1,m_1'} - \breve{B}_{2,m_2,m_2'}\cos(\theta_\Delta)}\right)$$

$$\psi_{m_1,m_1',m_2,m_2'}^{+}(\lambda_1,\lambda_2,\theta_\Delta) = \tan^{-1}\left(\frac{\breve{B}_{2,m_2,m_2'}\sin(\theta_\Delta)}{\breve{B}_{1,m_1,m_1'} + \breve{B}_{2,m_2,m_2'}\cos(\theta_\Delta)}\right).$$

Additionally, the H (c, φ) function is defined as $$H(c,\varphi) \triangleq \frac{1}{\pi}\int_{-\frac{\pi}{2}}^{\frac{\pi}{2}}\sin(c\sin(\theta+\varphi))d\theta. \qquad (81)$$

Then, from Equation (69), with the integration range changed to $[-\pi/2, \pi/2]$, the $\breve{Q}$ functions expressible as $$\breve{Q}_{m_1,m_1',m_2,m_2'}^{c-}(\lambda_1,\lambda_2,\theta_\Delta) = J_0(C_{m_1,m_1',m_2,m_2'}^{-}(\lambda_1,\lambda_2,\theta_\Delta)),$$

$$\breve{Q}_{m_1,m_1',m_2,m_2'}^{s-}(\lambda_1,\lambda_2,\theta_\Delta) = H(C_{m_1,m_1',m_2,m_2'}^{-}(\lambda_1,\lambda_2,\theta_\Delta),\psi_{m_1,m_1',m_2,m_2'}^{-}(\lambda_1,\lambda_2,\theta_\Delta))$$

$$\breve{Q}_{m_1,m'_1,m_2,m'_2}{}^{c+}(\lambda_1,\lambda_2,\theta_\Delta) = J_0(C_{m_1,m'_1,m_2,m'_2}{}^+(\lambda_1,\lambda_2,\theta_\Delta)),$$

$$\breve{Q}_{m_1,m'_1,m_2,m'_2}{}^{s+}(\lambda_1,\lambda_2,\theta_\Delta) = H(C_{m_1,m'_1,m_2,m'_2}{}^+(\lambda_1,\lambda_2,\theta_\Delta), \psi_{m_1,m'_1,m_2,m'_2}{}^-(\lambda_1,\lambda_2,\theta_\Delta)) \qquad (82)$$

The $\breve{Q}$ submatrices are expressible as $$[\breve{Q}_{\text{ssss}}]_{n_1,n_2} = \qquad (83)$$
$$\frac{1}{2}\Bigg\{ \mathrm{sinc}\Big(2\pi\big(\Delta_{k_{i_1}} - \Delta_{k_{i_2}}\big)f_{sc}\tau_{DS}\Big) J_0\big(C^-_{m_1,m'_1,m_2,m'_2}(\lambda_1,\lambda_2,\theta_\Delta)\big) +$$
$$\frac{1 - \cos\Big(2\pi\big(\Delta_{k_{i_1}} - \Delta_{k_{i_2}}\big)f_{sc}\tau_{DS}\Big)}{2\pi\big(\Delta_{k_{i_1}} - \Delta_{k_{i_2}}\big)f_{sc}\tau_{DS}} H$$
$$\big(C^-_{m_1,m'_1,m_2,m'_2}(\lambda_1,\lambda_2,\theta_\Delta), \psi^-_{m_1,m'_1,m_2,m'_2}(\lambda_1,\lambda_2,\theta_\Delta)\big) +$$
$$\mathrm{sinc}\Big(2\pi\big(\Delta_{k_{i_1}} + \Delta_{k_{i_2}}\big)f_{sc}\tau_{DS}\Big) J_0\big(C^+_{m_1,m'_1,m_2,m'_2}(\lambda_1,\lambda_2,\theta_\Delta)\big) +$$
$$\frac{1 - \cos\Big(2\pi\big(\Delta_{k_{i_1}} + \Delta_{k_{i_2}}\big)f_{sc}\tau_{DS}\Big)}{2\pi\big(\Delta_{k_{i_1}} + \Delta_{k_{i_2}}\big)f_{sc}\tau_{DS}}$$
$$H\big(C^+_{m_1,m'_1,m_2,m'_2}(\lambda_1,\lambda_2,\theta_\Delta), \psi^+_{m_1,m'_1,m_2,m'_2}(\lambda_1,\lambda_2,\theta_\Delta)\big)\Bigg\},$$

$$[\breve{Q}_{\text{sex}}]_{n_1,n_2} =$$
$$\frac{1}{2}\Bigg\{ -\frac{1 - \cos\Big(2\pi\big(\Delta_{k_{i_1}} - \Delta_{k_{i_2}}\big)f_{sc}\tau_{DS}\Big)}{2\pi\big(\Delta_{k_{i_1}} - \Delta_{k_{i_2}}\big)f_{sc}\tau_{DS}} J_0\big(C^-_{m_1,m'_1,m_2,m'_2}(\lambda_1,\lambda_2,\theta_\Delta)\big) +$$
$$\mathrm{sinc}\Big(2\pi\big(\Delta_{k_{i_1}} - \Delta_{k_{i_2}}\big)f_{sc}\tau_{DS}\Big)$$
$$H\big(C^-_{m_1,m'_1,m_2,m'_2}(\lambda_1,\lambda_2,\theta_\Delta), \psi^-_{m_1,m'_1,m_2,m'_2}(\lambda_1,\lambda_2,\theta_\Delta)\big) +$$
$$\frac{1 - \cos\Big(2\pi\big(\Delta_{k_{i_1}} + \Delta_{k_{i_2}}\big)f_{sc}\tau_{DS}\Big)}{2\pi\big(\Delta_{k_{i_1}} + \Delta_{k_{i_2}}\big)f_{sc}\tau_{DS}} J_0\big(C^+_{m_1,m'_1,m_2,m'_2}(\lambda_1,\lambda_2,\theta_\Delta)\big),$$
$$-\mathrm{sinc}\Big(2\pi\big(\Delta_{k_{i_1}} + \Delta_{k_{i_2}}\big)f_{sc}\tau_{DS}\Big)$$
$$H\big(C^+_{m_1,m'_1,m_2,m'_2}(\lambda_1,\lambda_2,\theta_\Delta), \psi^+_{m_1,m'_1,m_2,m'_2}(\lambda_1,\lambda_2,\theta_\Delta)\big)\Bigg\}$$

$$[\breve{Q}_{\text{sxs}}]_{n_1,n_2} =$$
$$\frac{1}{2}\Bigg\{ \frac{1 - \cos\Big(2\pi\big(\Delta_{k_{i_1}} - \Delta_{k_{i_2}}\big)f_{sc}\tau_{DS}\Big)}{2\pi\big(\Delta_{k_{i_1}} - \Delta_{k_{i_2}}\big)f_{sc}\tau_{DS}} J_0\Big(\frac{2\pi d_A}{\lambda^{UL}}(m_1 - m'_1) - \frac{2\pi d_B}{\lambda^{DL}}(m_2 - m'_2)\Big) -$$
$$\mathrm{sinc}\Big(2\pi\big(\Delta_{k_{i_1}} - \Delta_{k_{i_2}}\big)f_{sc}\tau_{DS}\Big)$$
$$H\big(C^-_{m_1,m'_1,m_2,m'_2}(\lambda_1,\lambda_2,\theta_\Delta), \psi^-_{m_1,m'_1,m_2,m'_2}(\lambda_1,\lambda_2,\theta_\Delta)\big)$$

$$[\breve{Q}_{\text{sxx}}]_{n_1,n_2} =$$
$$\frac{1}{2}\Bigg\{ \mathrm{sinc}\Big(2\pi\big(\Delta_{k_{i_1}} - \Delta_{k_{i_2}}\big)f_{sc}\tau_{DS}\Big) J_0\Big(\frac{2\pi d_A}{\lambda^{UL}}(m_1 - m'_1) - \frac{2\pi d_B}{\lambda^{DL}}(m_2 - m'_2)\Big) +$$
$$\mathrm{sinc}\Big(2\pi\big(\Delta_{k_{i_1}} + \Delta_{k_{i_2}}\big)f_{sc}\tau_{DS}\Big) J_0\big(C^+_{m_1,m'_1,m_2,m'_2}(\lambda_1,\lambda_2,\theta_\Delta)\big) -$$
$$\mathrm{sinc}\Big(2\pi\big(\Delta_{k_{i_1}} + \Delta_{k_{i_2}}\big)f_{sc}\tau_{DS}\Big) J_0\Big(\frac{2\pi d_A}{\lambda^{UL}}(m_1 - m'_1) + \frac{2\pi d_B}{\lambda^{DL}}(m_2 - m'_2)\Big) +$$
$$\frac{1 - \cos\Big(2\pi\big(\Delta_{k_{i_1}} + \Delta_{k_{i_2}}\big)f_{sc}\tau_{DS}\Big)}{2\pi\big(\Delta_{k_{i_1}} + \Delta_{k_{i_2}}\big)f_{sc}\tau_{DS}}$$

$$H\big(C^+_{m_1,m'_1,m_2,m'_2}(\lambda_1,\lambda_2,\theta_\Delta), \psi^+_{m_1,m'_1,m_2,m'_2}(\lambda_1,\lambda_2,\theta_\Delta)\big)\Bigg\}.$$

In the case of infinite $\tau_{DS}$, the asymptotic results for $\breve{Q}$ matrices for $$\Delta_{k_{i_1}} = \Delta_{k_{i_2}}$$

are expressible as $$[\breve{Q}_{\text{ssss}}]_{n_1,n_2} = \begin{cases} \frac{1}{2}J_0\big(C^-_{m_1,m'_1,m_2,m'_2}\big) + \\ \frac{1}{2}J_0\big(C^+_{m_1,m'_1,m_2,m'_2}\big), & \Delta_{k_{i_1}} = \Delta_{k_{i_2}} = 0 \\ \frac{1}{2}J_0\big(C^-_{m_1,m'_1,m_2,m'_2}\big) & \Delta_{k_{i_1}} = \Delta_{k_{i_2}} \neq 0 \end{cases} \qquad (84)$$

$$[\breve{Q}_{\text{sex}}]_{n_1,n_2} = \begin{cases} \frac{1}{2}H\big(C^-_{m_1,m'_1,m_2,m'_2}, \psi^-_{m_1,m'_1,m_2,m'_2}\big) - \\ \frac{1}{2}H\big(C^+_{m_1,m'_1,m_2,m'_2}, \psi^+_{m_1,m'_1,m_2,m'_2}\big) & \Delta_{k_{i_1}} = \Delta_{k_{i_2}} = 0 \\ \frac{1}{2}H\big(C^-_{m_1,m'_1,m_2,m'_2}(\lambda_1,\lambda_2,\theta_\Delta), \\ \psi^-_{m_1,m'_1,m_2,m'_2}\big)(\lambda_1,\lambda_2,\theta_\Delta)\big) & \Delta_{k_{i_1}} = \Delta_{k_{i_2}} \neq 0 \end{cases}$$

$$[\breve{Q}_{\text{sxs}}]_{n_1,n_2} = \begin{cases} -\frac{1}{2}H\big(C^-_{m_1,m'_1,m_2,m'_2}, \psi^-_{m_1,m'_1,m_2,m'_2}\big) - \\ \frac{1}{2}H\big(C^+_{m_1,m'_1,m_2,m'_2}, \psi^+_{m_1,m'_1,m_2,m'_2}\big) & \Delta_{k_{i_1}} = \Delta_{k_{i_2}} = 0 \\ -\frac{1}{2}H\big(C^-_{m_1,m'_1,m_2,m'_2}, \psi^+_{m_1,m'_1,m_2,m'_2}\big) & \Delta_{k_{i_1}} = \Delta_{k_{i_2}} \neq 0 \end{cases}$$

$$[\breve{Q}_{\text{sxx}}]_{n_1,n_2} = \begin{cases} \frac{1}{2}J_0\big(C^-_{m_1,m'_1,m_2,m'_2}\big) - \\ \frac{1}{2}J_0\big(C^+_{m_1,m'_1,m_2,m'_2}\big), & \Delta_{k_{i_1}} = \Delta_{k_{i_2}} = 0 \\ \frac{1}{2}J_0\big(C^-_{m_1,m'_1,m_2,m'_2}\big) & \Delta_{k_{i_1}} = \Delta_{k_{i_2}} \neq 0 \end{cases}$$

where the function inputs $(\lambda_1, \lambda_2, \theta_\Delta)$ are dropped for notational simplicity.

Figure 14:
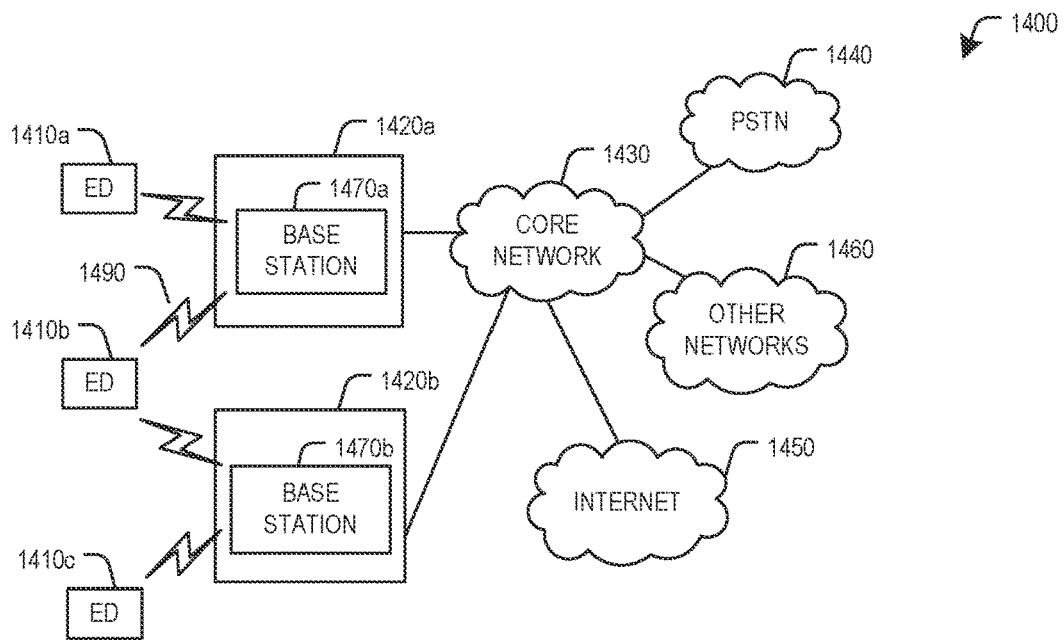
FIG. 14 illustrates an example communication system according to example embodiments presented herein.

FIG. 14 illustrates an example communication system 1400. In general, the system 1400 enables multiple wireless or wired users to transmit and receive data and other content. The system 1400 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1400 includes electronic devices (ED) 1410a-1410c, radio access networks (RANs) 1420a-1420b, a core network 1430, a public switched telephone network (PSTN) 1440, the Internet 1450, and other networks 1460. While certain numbers of these components or elements are shown in FIG. 14, any number of these components or elements may be included in the system 1400.

The EDs 1410a-1410c are configured to operate or communicate in the system 1400. For example, the EDs 1410a-1410c are configured to transmit or receive via wireless or wired communication channels. Each ED 1410a-1410c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1420a-1420b here include base stations 1470a-1470b, respectively. Each base station 1470a-1470b is configured to wirelessly interface with one or more of the EDs 1410a-1410c to enable access to the core network 143o, the PSTN 144o, the Internet 1450, or the other networks 1460. For example, the base stations 1470a-1470b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1410a-1410c are configured to interface and communicate with the Internet 1450 and may access the core network 1430, the PSTN 1440, or the other networks 1460.

In the embodiment shown in FIG. 14, the base station 1470a forms part of the RAN 1420a, which may include other base stations, elements, or devices. Also, the base station 1470b forms part of the RAN 1420b, which may include other base stations, elements, or devices. Each base station 1470a-1470b operates to transmit or receive wireless signals within a particular geographic region or area, sometimes referred to as a "cell." In some embodiments, multiple-input multiple-output (MIMO) technology may be employed having multiple transceivers for each cell.

The base stations 1470a-1470b communicate with one or more of the EDs 1410a-1410c over one or more air interfaces 1490 using wireless communication links. The air interfaces 1490 may utilize any suitable radio access technology.

It is contemplated that the system 1400 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1420a-1420b are in communication with the core network 1430 to provide the EDs 1410a-1410c with voice, data, application, Voice over Internet Protocol (VoIP), or other services. Understandably, the RANs 1420a-1420b or the core network 1430 may be in direct or indirect communication with one or more other RANs (not shown). The core network 1430 may also serve as a gateway access for other networks (such as the PSTN 1440, the Internet 1450, and the other networks 1460). In addition, some or all of the EDs 1410a-1410c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1450.

Although FIG. 14 illustrates one example of a communication system, various changes may be made to FIG. 14. For example, the communication system 1400 could include any number of EDs, base stations, networks, or other components in any suitable configuration.

Figure 15A:
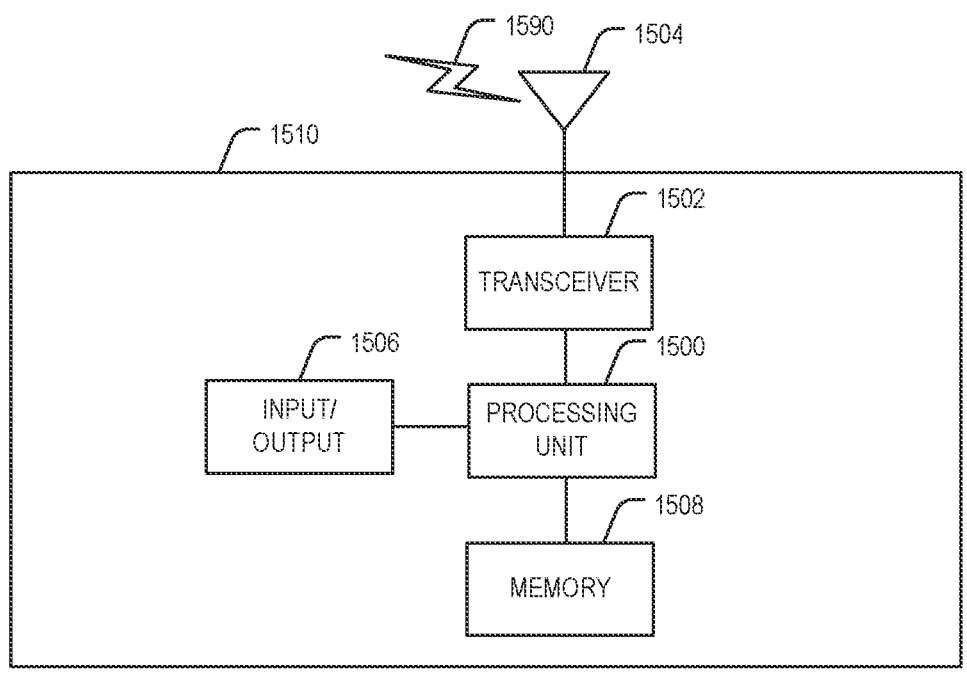
FIGS. 15A and 15B illustrate example devices that may implement the methods and teachings according to this disclosure.
Figure 15B:
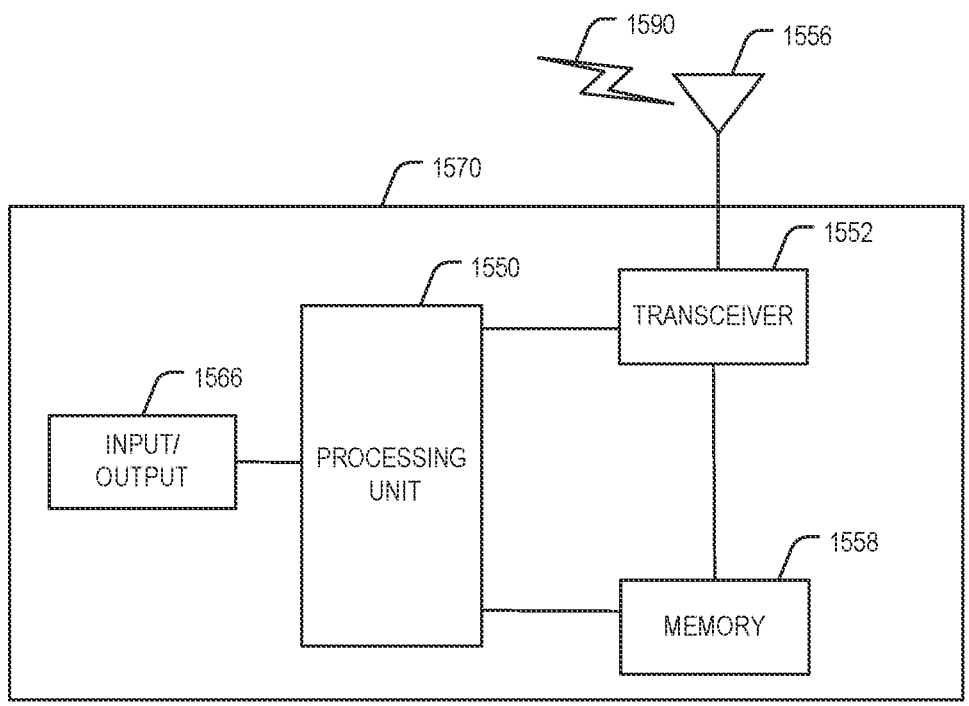

FIGS. 15A and 15B illustrate example devices that may implement the methods and teachings according to this disclosure. In particular, FIG. 15A illustrates an example ED 1510, and FIG. 15B illustrates an example base station 1570. These components could be used in the system 1400 or in any other suitable system.

As shown in FIG. 15A, the ED 1510 includes at least one processing unit 1500. The processing unit 1500 implements various processing operations of the ED 1510. For example, the processing unit 1500 could perform signal coding, data processing, power control, input/output processing, or any other functionality enabling the ED 1510 to operate in the system 1400. The processing unit 1500 also supports the methods and teachings described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit.

The ED 1510 also includes at least one transceiver 1502. The transceiver 1502 is configured to modulate data or other content for transmission by at least one antenna or NIC (Network Interface Controller) 1504. The transceiver 1502 is also configured to demodulate data or other content received by the at least one antenna 1504. Each transceiver 1502 includes any suitable structure for generating signals for wireless or wired transmission or processing signals received wirelessly or by wire. Each antenna 1504 includes any suitable structure for transmitting or receiving wireless or wired signals. One or multiple transceivers 1502 could be used in the ED 1510, and one or multiple antennas 1504 could be used in the ED 1510. Although shown as a single functional unit, a transceiver 1502 could also be implemented using at least one transmitter and at least one separate receiver.

The ED 1510 further includes one or more input/output devices 1506 or interfaces (such as a wired interface to the Internet 1450). The input/output devices 1506 facilitate interaction with a user or other devices (network communications) in the network. Each input/output device 1506 includes any suitable structure for providing information to or receiving information from a user, such as a speaker, microphone, keypad, keyboard, display, or touch screen, including network interface communications.

In addition, the ED 1510 includes at least one memory 1508. The memory 1508 stores instructions and data used, generated, or collected by the ED 1510. For example, the memory 1508 could store software or firmware instructions executed by the processing unit(s) 1500 and data used to reduce or eliminate interference in incoming signals. Each memory 1508 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 15B, the base station 1570 includes at least one processing unit 1550, at least one transceiver 1552, which includes functionality for a transmitter and a receiver, one or more antennas 1556, at least one memory 1558, and one or more input/output devices or interfaces 1566. A scheduler, which would be understood by one skilled in the art, is coupled to the processing unit 1550. The scheduler could be included within or operated separately from the base station 1570. The processing unit 1550 implements various processing operations of the base station 1570, such as signal coding, data processing, power control, input/output processing, or any other functionality. The processing unit 1550 can also support the methods and teachings described in more detail above. Each processing unit 1550 includes any suitable processing or computing device configured to perform one or more operations. Each processing unit 1550 could, for example, include a microprocessor, microcontroller, digital signal processor, field programmable gate array, or application specific integrated circuit.

Each transceiver 1552 includes any suitable structure for generating signals for wireless or wired transmission to one or more EDs or other devices. Each transceiver 1552 further includes any suitable structure for processing signals received wirelessly or by wire from one or more EDs or other devices. Although shown combined as a transceiver 1552, a transmitter and a receiver could be separate components. Each antenna 1556 includes any suitable structure for transmitting or receiving wireless or wired signals. While a common antenna 1556 is shown here as being coupled to the transceiver 1552, one or more antennas 1556 could be coupled to the transceiver(s) 1552, allowing separate antennas 1556 to be coupled to the transmitter and the receiver if equipped as separate components. Each memory 1558 includes any suitable volatile or non-volatile storage and retrieval device(s). Each input/output device 1566 facilitates interaction with a user or other devices (network communications) in the network. Each input/output device 1566 includes any suitable structure for providing information to or receiving/providing information from a user, including network interface communications.

Figure 16:
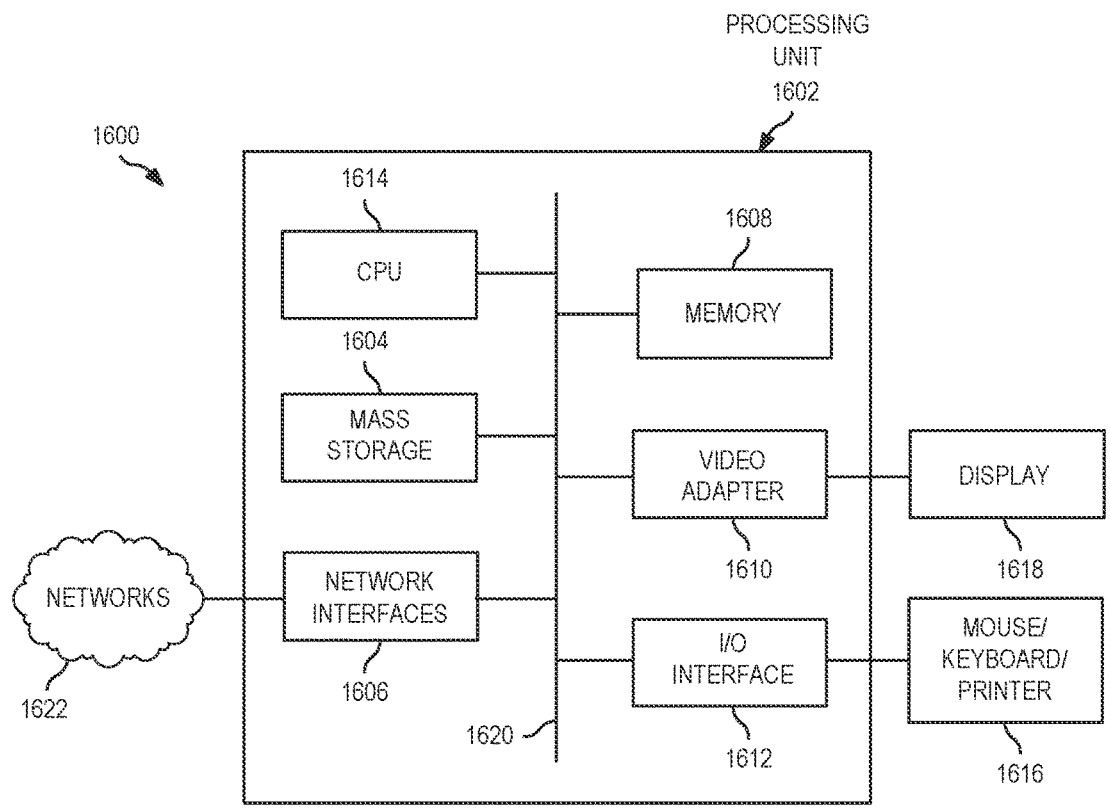
FIG. 16 is a block diagram of a computing system that may be used for implementing the devices and methods disclosed herein.

FIG. 16 is a block diagram of a computing system 1600 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 160o includes a processing unit 1602. The processing unit includes a central processing unit (CPU) 1614, memory 1608, and may further include a mass storage device 1604, a video adapter 1610, and an I/O interface 1612 connected to a bus 1620.

The bus 1620 may be one or more of any type of several bus architectures including a memory bus or memory controller, a peripheral bus, or a video bus. The CPU 1614 may comprise any type of electronic data processor. The memory 1608 may comprise any type of non-transitory system memory such as static random access memory (SRAM), dynamic random access memory (DRAM), synchronous DRAM (SDRAM), read-only memory (ROM), or a combination thereof. In an embodiment, the memory 1608 may include ROM for use at boot-up, and DRAM for program and data storage for use while executing programs.

The mass storage 1604 may comprise any type of non-transitory storage device configured to store data, programs, and other information and to make the data, programs, and other information accessible via the bus 1620. The mass storage 1604 may comprise, for example, one or more of a solid state drive, hard disk drive, a magnetic disk drive, or an optical disk drive.

The video adapter 1610 and the I/O interface 1612 provide interfaces to couple external input and output devices to the processing unit 1602. As illustrated, examples of input and output devices include a display 1618 coupled to the video adapter 1610 and a mouse, keyboard, or printer 1616 coupled to the I/O interface 1612. Other devices may be coupled to the processing unit 1602, and additional or fewer interface cards may be utilized. For example, a serial interface such as Universal Serial Bus (USB) (not shown) may be used to provide an interface for an external device.

The processing unit 1602 also includes one or more network interfaces 1606, which may comprise wired links, such as an Ethernet cable, or wireless links to access nodes or different networks. The network interfaces 1606 allow the processing unit 1602 to communicate with remote units via the networks. For example, the network interfaces 1606 may provide wireless communication via one or more transmitters/transmit antennas and one or more receivers/receive antennas. In an embodiment, the processing unit 1602 is coupled to a local-area network 1622 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a calculating unit or module, a determining unit or module, an estimating unit or module, a projecting unit or module, a reconstructing unit or module, an obtaining unit or module, a reforming unit or module, or a generating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method, the method comprising:
   calculating, by a device, first high dimensional channel characteristics of a first frequency band in accordance with measurements of the first frequency band;
   estimating, by the device, a power angle delay spectrum (PADS) in accordance with the first high dimensional channel characteristics of the first frequency band;
   determining, by the device, a domain conversion matrix for a second frequency band in accordance with the PADS; and
   generating, by the device, second high dimensional channel characteristics of the second frequency band in accordance with the domain conversion matrix and the first high dimensional channel characteristics of the first frequency band.

2. The method of claim 1, wherein the determining the domain conversion matrix comprises:
   determining the domain conversion matrix in accordance with at least one of an antenna structure of the device, a first carrier frequency of the first frequency band, a second carrier frequency of the second frequency band, and configured frequency spacing of the first and second frequency bands.

3. The method of claim 2, wherein the estimating the PADS comprises:
   estimating the PADS in accordance with the antenna structure of the first device and the first carrier frequency of the first frequency band.

4. The method of claim 3, wherein the estimating the PADS comprises:
projecting the PADS onto a subspace of a Hilbert space defined by basis functions in accordance with the antenna structure of the device and the first carrier frequency of the first frequency band.

5. The method of claim 3, wherein the estimating the PADS comprises:
generating a set of weights of a set of basis functions defined in accordance with the antenna structure of the device and the first carrier frequency of the first frequency band.

6. The method of claim 1, wherein the generating the second high dimensional channel characteristics of the second frequency band comprises:
obtaining, by the device, a product of the domain conversion matrix and the PADS; and
reforming, by the device, the second high dimensional channel characteristics of the second frequency band from the product.

7. The method of claim 1, wherein the determining the domain conversion matrix comprises:
determining a discrete domain conversion matrix for each configured antenna lag.

8. The method of claim 1, wherein the generating the second high dimensional channel characteristics of the second frequency band comprises:
obtaining, by the device, subblock matrices for each configured frequency lag as a product of the domain conversion matrix and the PADS;
reforming, by the device, subblocks of the second high dimensional channel characteristics of the second frequency band from the subblock matrices; and
reconstructing, by the device, the second high dimensional channel characteristics of the second frequency band from the subblocks.

9. The method of claim 1, wherein the first high dimensional channel characteristics comprises first space-frequency covariance, or wherein the second high dimensional channel characteristics comprises second space-frequency covariance.

10. The method of claim 1, wherein the first frequency band and the second frequency band are identical.

11. The method of claim 1, wherein the first frequency band and the second frequency band are different.

12. The method of claim 1, further comprising:
transmitting, by the device, uplink transmissions using the first frequency band; and
receiving, by the device, downlink transmissions using the second frequency band.

13. A device comprising:
one or more processors; and
a non-transitory memory storage comprising instructions that, when executed by the one or more processors, cause the device to:
calculate first high dimensional channel characteristics of a first frequency band in accordance with measurements of the first frequency band;
estimate a power angle delay spectrum (PADS) in accordance with the first high dimensional channel characteristics of the first frequency band;
determine a domain conversion matrix for a second frequency band in accordance with the PADS; and
generate second high dimensional channel characteristics of the second frequency band in accordance with the domain conversion matrix and the first high dimensional channel characteristics of the first frequency band.

14. The device of claim 13, wherein determination of the domain conversion matrix is in accordance with at least one of an antenna structure of the device, a first carrier frequency of the first frequency band, a second carrier frequency of the second frequency band, and configured frequency spacing of the first and second frequency bands.

15. The device of claim 14, wherein the PADS is estimated in accordance with the antenna structure of the device and the first carrier frequency of the first frequency band.

16. The device of claim 13, wherein the instructions that cause the device to generate the second high dimensional channel characteristics include instructions to cause the device to:
obtain a product of the domain conversion matrix and the PADS; and
reform the second high dimensional channel characteristics of the second frequency band from the product.

17. The device of claim 13, wherein the instructions that cause the device to determine the domain conversion matrix include instructions to cause the device to:
determine a discrete domain conversion matrix for each configured antenna lag.

18. The device of claim 13, wherein the instructions that cause the device to generate the second high dimensional channel characteristics include instructions to cause the device to:
obtain subblock matrices for each configured frequency lag as a product of the domain conversion matrix and the PADS;
reform subblocks of the second high dimensional channel characteristics of the second frequency band from the subblock matrices; and
reconstruct the second high dimensional channel characteristics of the second frequency band from the reformed subblocks.

19. The device of claim 13, wherein the first high dimensional channel characteristics comprises first space-frequency covariance, or wherein the second high dimensional channel characteristics comprises second space-frequency covariance.

20. A non-transitory computer-readable media storing computer instructions for communicating over multiple frequency bands, that when executed by one or more processors, cause the one or more processors to perform operations of:
calculating first high dimensional channel characteristics of a first frequency band in accordance with measurements of the first frequency band;
estimating a power angle delay spectrum (PADS) in accordance with the first high dimensional channel characteristics of the first frequency band;
determining a domain conversion matrix for a second frequency band in accordance with the PADS; and
generating second high dimensional channel characteristics of the second frequency band in accordance with the domain conversion matrix and the first high dimensional channel characteristics of the first frequency band.

21. The non-transitory computer-readable media of claim 20, the estimating the PADS comprising:
projecting the PADS onto a subspace of a Hilbert space defined by basis functions in accordance with an antenna structure and a first carrier frequency of the first frequency band.

22. The non-transitory computer-readable media of claim 20, the generating the second high dimensional channel characteristics of the second frequency band comprising:
- obtaining a product of the domain conversion matrix and the PADS; and
- reforming the high dimensional channel characteristics of the second frequency band from the product.

23. The non-transitory computer-readable media of claim 20, the determining the domain conversion matrix:
- determining a discrete domain conversion matrix for each configured antenna lag.

24. The non-transitory computer-readable media of claim 20, the generating the second high dimensional channel characteristics of the second frequency band comprising:
- obtaining subblock matrices for each configured frequency lag as a product of the domain conversion matrix and the PADS;
- reforming subblocks of the second high dimensional channel characteristics of the second frequency band from the subblock matrices; and
- reconstructing the second high dimensional channel characteristics of the second frequency band from the subblocks.

\* \* \* \* \*

UNITED STATES PATENT AND TRADEMARK OFFICE
CERTIFICATE OF CORRECTION

PATENT NO. : 12,218,780 B2
APPLICATION NO. : 17/866705
DATED : February 4, 2025
INVENTOR(S) : Yue et al.

Page 1 of 1

It is certified that error appears in the above-identified patent and that said Letters Patent is hereby corrected as shown below:

In the Claims

In Column 46, in Claim 3, Line 66, after "of the" delete "first".

Signed and Sealed this
Eighteenth Day of March, 2025

Coke Morgan Stewart
*Acting Director of the United States Patent and Trademark Office*